United States Patent
Bhushan et al.

(10) Patent No.: US 10,154,437 B2
(45) Date of Patent: *Dec. 11, 2018

(54) LISTEN-BEFORE-TALK RESERVATION SCHEME FOR WIRELESS COMMUNICATIONS OVER UNLICENSED SPECTRUM

(71) Applicant: QUALCOMM Incorporated, San Diego, CA (US)

(72) Inventors: Naga Bhushan, San Diego, CA (US); Durga Prasad Malladi, San Diego, CA (US); Yongbin Wei, San Diego, CA (US); Peter Gaal, San Diego, CA (US); Tao Luo, San Diego, CA (US); Tingfang Ji, San Diego, CA (US); Gavin Bernard Horn, La Jolla, CA (US); Wanshi Chen, San Diego, CA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/460,538

(22) Filed: Mar. 16, 2017

(65) Prior Publication Data
US 2017/0188323 A1    Jun. 29, 2017

Related U.S. Application Data

(63) Continuation of application No. 14/281,617, filed on May 19, 2014, now Pat. No. 9,730,105.
(Continued)

(51) Int. Cl.
*H04J 3/06* (2006.01)
*H04W 28/08* (2009.01)
(Continued)

(52) U.S. Cl.
CPC .............. *H04W 28/08* (2013.01); *H04L 1/00* (2013.01); *H04L 5/001* (2013.01); *H04L 5/0044* (2013.01);
(Continued)

(58) Field of Classification Search
None
See application file for complete search history.

(56) References Cited

U.S. PATENT DOCUMENTS

| 5,870,673 A | 2/1999 | Haartsen |
| 6,424,936 B1 | 7/2002 | Shen et al. |

(Continued)

FOREIGN PATENT DOCUMENTS

| CN | 1612496 A | 5/2005 |
| CN | 1926814 A | 3/2007 |

(Continued)

OTHER PUBLICATIONS

Cisco Public Information, "802.11ac: The Fifth Generation of Wi-Fi," Technical White Paper, Aug. 2012, pp. 1-25, downloaded from http://www.cisco.com/c/en/us/products/collateral/wireless/aironet-3600-series/white_paper_c11-713103.pdf, Cisco Systems, Inc., San Jose, CA.

(Continued)

*Primary Examiner* — Kibrom T Hailu
(74) *Attorney, Agent, or Firm* — Holland & Hart LLP

(57) ABSTRACT

Methods and apparatuses are described in which an unlicensed spectrum is used for Long Term Evolution (LTE) communications. A first method includes synchronizing clear channel assessment (CCA) slots across a plurality of base stations to determine availability of an unlicensed spectrum for transmissions in a next transmission interval. A second method includes performing a CCA during one of a plurality of CCA slots synchronized across a plurality of
(Continued)

evolved Node Bs (eNBs) to determine availability of unlicensed spectrum for transmissions in a next transmission interval.

45 Claims, 46 Drawing Sheets

Related U.S. Application Data

(60) Provisional application No. 61/825,459, filed on May 20, 2013.

(51) Int. Cl.

| | | |
|---|---|---|
| *H04W 28/02* | (2009.01) | |
| *H04W 74/08* | (2009.01) | |
| *H04W 24/02* | (2009.01) | |
| *H04W 28/16* | (2009.01) | |
| *H04W 72/04* | (2009.01) | |
| *H04W 56/00* | (2009.01) | |
| *H04W 74/04* | (2009.01) | |
| *H04W 16/14* | (2009.01) | |
| *H04W 76/02* | (2009.01) | |
| *H04L 1/00* | (2006.01) | |
| *H04L 27/26* | (2006.01) | |
| *H04L 27/00* | (2006.01) | |
| *H04W 48/10* | (2009.01) | |
| *H04W 72/08* | (2009.01) | |
| *H04W 74/00* | (2009.01) | |
| *H04L 5/14* | (2006.01) | |
| *H04L 5/00* | (2006.01) | |
| *H04W 84/12* | (2009.01) | |
| *H04W 88/06* | (2009.01) | |
| *H04W 88/08* | (2009.01) | |
| *H04J 11/00* | (2006.01) | |
| *H04W 88/02* | (2009.01) | |

(52) U.S. Cl.
CPC ............ *H04L 5/0053* (2013.01); *H04L 5/14* (2013.01); *H04L 5/1469* (2013.01); *H04L 27/0006* (2013.01); *H04L 27/2602* (2013.01); *H04W 16/14* (2013.01); *H04W 24/02* (2013.01); *H04W 28/0252* (2013.01); *H04W 28/0289* (2013.01); *H04W 28/16* (2013.01); *H04W 48/10* (2013.01); *H04W 56/002* (2013.01); *H04W 72/04* (2013.01); *H04W 72/0413* (2013.01); *H04W 72/082* (2013.01); *H04W 74/006* (2013.01); *H04W 74/04* (2013.01); *H04W 74/0808* (2013.01); *H04W 74/0816* (2013.01); *H04W 74/0833* (2013.01); *H04W 76/025* (2013.01); *H04J 11/00* (2013.01); *H04L 5/005* (2013.01); *H04W 56/001* (2013.01); *H04W 84/12* (2013.01); *H04W 88/02* (2013.01); *H04W 88/06* (2013.01); *H04W 88/08* (2013.01)

(56) References Cited

U.S. PATENT DOCUMENTS

| | | | |
|---|---|---|---|
| 6,980,810 | B1 | 12/2005 | Gerakoulis et al. |
| 7,106,707 | B1 | 9/2006 | Strutt |
| 7,200,374 | B1 | 4/2007 | Stephens |
| 7,218,623 | B1 | 5/2007 | Proctor, Jr. |
| 8,503,343 | B2* | 8/2013 | Kawakami ........ H04W 52/0216 370/311 |
| 8,711,785 | B2 | 4/2014 | Gholmieh et al. |
| 8,861,452 | B2 | 10/2014 | Barbieri et al. |
| 8,886,229 | B2 | 11/2014 | Nanda et al. |
| 9,473,981 | B2 | 10/2016 | Bhushan et al. |
| 9,516,686 | B2 | 12/2016 | Barbieri et al. |
| 9,565,593 | B2 | 2/2017 | Bhushan et al. |
| 2003/0007473 | A1 | 1/2003 | Strong et al. |
| 2003/0016647 | A1 | 1/2003 | Margon |
| 2004/0142696 | A1 | 7/2004 | Saunders et al. |
| 2004/0194142 | A1 | 9/2004 | Jiang et al. |
| 2008/0112380 | A1 | 5/2008 | Fischer et al. |
| 2008/0267079 | A1 | 10/2008 | Mhatre et al. |
| 2009/0067389 | A1 | 3/2009 | Lee et al. |
| 2009/0116424 | A1 | 5/2009 | Abeta et al. |
| 2009/0116430 | A1 | 5/2009 | Bonta et al. |
| 2009/0180451 | A1 | 7/2009 | Alpert et al. |
| 2009/0196261 | A1 | 8/2009 | Sambhwani et al. |
| 2010/0014502 | A1 | 1/2010 | Singh et al. |
| 2010/0046657 | A1* | 2/2010 | Karlsson ............... H04L 1/0606 375/267 |
| 2010/0107042 | A1* | 4/2010 | Sawai ................ H04L 27/2655 714/799 |
| 2010/0195601 | A1 | 8/2010 | Zhang |
| 2010/0199339 | A1 | 8/2010 | Kageyama |
| 2011/0090855 | A1 | 4/2011 | Kim |
| 2011/0142019 | A1 | 6/2011 | Bharghavan et al. |
| 2011/0149918 | A1 | 6/2011 | Gong et al. |
| 2011/0176632 | A1 | 7/2011 | Jeong et al. |
| 2011/0222398 | A1 | 9/2011 | Ribeiro et al. |
| 2011/0261708 | A1 | 10/2011 | Grandhi et al. |
| 2011/0280200 | A1 | 11/2011 | Fuchs et al. |
| 2012/0039252 | A1 | 2/2012 | Damnjanovic et al. |
| 2012/0063373 | A1 | 3/2012 | Chincholi et al. |
| 2012/0063429 | A1 | 3/2012 | Yang et al. |
| 2012/0113831 | A1 | 5/2012 | Pelletier et al. |
| 2012/0120892 | A1 | 5/2012 | Freda et al. |
| 2012/0184327 | A1 | 7/2012 | Love et al. |
| 2012/0213108 | A1 | 8/2012 | Ji et al. |
| 2012/0281573 | A1 | 11/2012 | Kazmi et al. |
| 2012/0281593 | A1 | 11/2012 | Stewart et al. |
| 2012/0307748 | A1 | 12/2012 | Cheng et al. |
| 2013/0023286 | A1 | 1/2013 | Soma et al. |
| 2013/0094375 | A1 | 4/2013 | Liu et al. |
| 2013/0107856 | A1 | 5/2013 | Naden et al. |
| 2013/0114427 | A1 | 5/2013 | Maattanen et al. |
| 2013/0165134 | A1 | 6/2013 | Touag et al. |
| 2013/0182630 | A1 | 7/2013 | Yamamoto |
| 2013/0272263 | A1 | 10/2013 | Pi et al. |
| 2013/0294356 | A1 | 11/2013 | Bala et al. |
| 2013/0315152 | A1* | 11/2013 | Ratasuk ............... H04W 76/14 370/329 |
| 2014/0029539 | A1 | 1/2014 | Choi et al. |
| 2014/0140314 | A1 | 5/2014 | Wei et al. |
| 2014/0169487 | A1 | 6/2014 | Liu et al. |
| 2014/0287769 | A1 | 9/2014 | Taori et al. |
| 2014/0302856 | A1 | 10/2014 | Nory et al. |
| 2014/0335876 | A1 | 11/2014 | Ratasuk et al. |
| 2014/0341018 | A1 | 11/2014 | Bhushan et al. |
| 2014/0341024 | A1 | 11/2014 | Bhushan et al. |
| 2014/0341035 | A1 | 11/2014 | Bhushan et al. |
| 2014/0341053 | A1 | 11/2014 | Bhushan et al. |
| 2014/0341135 | A1 | 11/2014 | Bhushan et al. |
| 2014/0341207 | A1 | 11/2014 | Bhushan et al. |
| 2014/0342745 | A1 | 11/2014 | Bhushan et al. |
| 2014/0378157 | A1 | 12/2014 | Wei et al. |
| 2015/0029952 | A1 | 1/2015 | Huang |
| 2015/0036556 | A1 | 2/2015 | Imamura et al. |
| 2015/0057011 | A1 | 2/2015 | Di et al. |
| 2015/0109991 | A1 | 4/2015 | Miyazaki et al. |
| 2015/0131536 | A1 | 5/2015 | Kaur et al. |
| 2015/0131544 | A1 | 5/2015 | Behravan et al. |
| 2015/0188675 | A1 | 7/2015 | Abeysekera et al. |
| 2015/0358137 | A1 | 12/2015 | Chae et al. |
| 2016/0381567 | A1 | 12/2016 | Bhushan et al. |
| 2017/0111802 | A1 | 4/2017 | Bhushan et al. |

FOREIGN PATENT DOCUMENTS

| | | |
|---|---|---|
| CN | 1973447 A | 5/2007 |
| CN | 101072137 A | 11/2007 |
| CN | 101102298 A | 1/2008 |
| CN | 102811086 A | 12/2012 |

(56) References Cited

FOREIGN PATENT DOCUMENTS

| | | |
|---|---|---|
| CN | 103052095 A | 4/2013 |
| EP | 1441468 A1 | 7/2004 |
| EP | 1763147 A1 | 3/2007 |
| EP | 2056529 A1 | 5/2009 |
| JP | 2006352296 A | 12/2006 |
| JP | 2008060934 A | 3/2008 |
| JP | 2010193290 A | 9/2010 |
| JP | 2013504277 A | 2/2013 |
| JP | 2013511911 A | 4/2013 |
| RU | 2005121127 A | 2/2006 |
| RU | 2011124288 A | 12/2012 |
| RU | 2480911 C2 | 4/2013 |
| WO | WO-2004054280 A2 | 6/2004 |
| WO | WO-2005062651 A1 | 7/2005 |
| WO | WO-2008039872 A2 | 4/2008 |
| WO | WO-2009088873 A1 | 7/2009 |
| WO | WO-2009142816 A1 | 11/2009 |
| WO | WO-2010018942 A2 | 2/2010 |
| WO | WO-2011011557 A1 | 1/2011 |
| WO | WO-2011116017 A1 | 9/2011 |
| WO | WO-2011123625 A1 | 10/2011 |
| WO | WO-2012024346 A1 | 2/2012 |
| WO | WO-2012037236 A2 | 3/2012 |
| WO | WO-2012040520 A1 | 3/2012 |
| WO | WO-2012044708 A1 | 4/2012 |
| WO | WO-2012046645 A1 | 4/2012 |
| WO | WO-2012049533 A1 | 4/2012 |
| WO | WO-2012074343 A2 | 6/2012 |
| WO | WO-2012075343 A2 | 6/2012 |
| WO | WO-2012078565 A1 | 6/2012 |
| WO | WO-2012095038 A1 | 7/2012 |
| WO | WO-2012099939 A1 | 7/2012 |
| WO | WO-2012101481 A1 | 8/2012 |
| WO | WO-2012109195 A2 | 8/2012 |
| WO | WO-2012116022 A1 | 8/2012 |
| WO | WO-2012134567 A1 | 10/2012 |
| WO | WO-2013006988 A1 | 1/2013 |
| WO | WO-2013043617 A1 | 3/2013 |
| WO | WO-2013059999 A1 | 5/2013 |
| WO | WO-2013185835 A1 | 12/2013 |

OTHER PUBLICATIONS

3GPP Standard, "3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331 v11.2.0, (Dec. 2012), Dec. 2012, XP002729254, 26 pgs.

Beluri et al., "Mechanisms for LTE coexistence in TV White Space," 2012 IEEE International Symposium on Dynamic Spectrum Access Networks (DYSPAN), Oct. 16-19, 2012, Bellevue, WA, pp. 317-326, ISBN: 978-1-4673-4447-0, IEEE.

Huawei, "Analysis and Evaluation of UL DM RS Design for LTE-A Scenarios," 3GPP TSG RAN WG1 Meeting #59bis, Valencia, Spain, Jan. 18-22, 2010, 8 pages, R1-100262, URL: http://www.3gpp.org/ftp/tsg_ran/wg1_rl1/TSGR1_59b/Docs/, 3rd Generation Partnership Project.

Intel Corporation, "UL CoMP DM-RS Enhancements for Homogenous Networks," 3GPP TSG-RAN WG1 Meeting #67, San Francisco, U.S.A., Nov. 14-18, 2011, 6 pages, R1-113664, URL: http://www.3gpp.org/ftp/tsg_ran/wg1_rl1/TSGR1_67/Docs/, 3rd Generation Partnership Project.

ISA/EP, International Search Report and Written Opinion of the International Searching Authority, Int'l Application No. PCT/US2014/038765, dated Sep. 19, 2014, European Patent Office, Rijswijk, NL, 12 pgs.

Motorola, "Uplink Multiple Access for EUTRA", 3GPP TSG RAN1 #40bis Meeting, Beijing, China, Apr. 4-8, 2005, 11 pgs., R1-050245, URL: http://www.3gpp.org/ftp/tsg_ran/wg1_rl1/TSGR1_40bis/Docs/, 3rd Generation Partnership Project.

NTT DOCOMO, "Views on Load Balancing and Enhanced Interference Coordination for SCE," 3GPP TSG RAN WG1 Meeting #72bis, R1-131670, Chicago, US, Apr. 15-19, 2013, pp. 1-6, downloaded from http://www.3gpp.org/ftp/tsg_ran/WG1_RL1/TSGR1_72b/Docs/, 3rd Generation Partnership Project.

QUALCOMM Europe, "Considerations on OFDMA and SC-FDMA Based Uplink for E-UTRA Evaluation (PAR Aspects)," 3GPP TSG-RAN WG1 #42-bis, San Diego, CA, Oct. 10-14, 2005, 4 pgs., R1-051120, URL: http://www.3gpp.org/ftp/tsg_ran/wg1_rl1/TSGR1_42bis/Docs/, 3rd Generation Partnership Project.

Ratasuk et al., "License-Exempt LTE Deployment in Heterogeneous Network," 2012 International Symposium on Wireless Communication Systems (ISWCS), Aug. 28, 2012, pp. 246-250, ISBN: 978-1-4673-0761-1, IEEE.

Samsung, "Performance Considerations for Standalone NCT", 3GPP TSG RAN WG1 #73, R1-131957, Fukuoka, JP, May 20-24, 2013, pp. 1-4, downloaded from http://www.3gpp.org/ftp/tsg_ran/WG1_RL1/TSGR1_73/Docs/, 3rd Generation Partnership Project.

Yang et al., "Performance Analysis on a New MAC DT-CSMA," IECON 2011 37th Annual Conference on IEEE Industrial Electronics Society, Nov. 7, 2011, pp. 3522-3527, ISBN: 978-1-61284-969-0, IEEE.

U.S. Appl. No. 15/628,401, filed Jun. 20, 2017.

Intel Corporation, "Discussions on Standalone NCT," 3GPP TSG-RAN WG1 Meeting #72bis, R1-130905, Chicago, USA, Apr. 15-19, 2013, 7 pgs., 3rd Generation Partnership Project.

Motorola Mobility, "Scenarios and Evaluation of Standalone NCT," 3GPP TSG RAN WG1 Meeting #73, R1-132464, Fukuoka, Japan, May 20-24, 2013, 5 pgs., 3rd Generation Partnership Project.

Nokia Siemens Networks et al., "On Stand-Alone NCT and TDD," 3GPP TSG-RAN WG1 Meeting #73, R1-132289. Fukuoka, Japan, May 20-24, 2013, 3 pgs., 3rd Generation Partnership Project.

\* cited by examiner

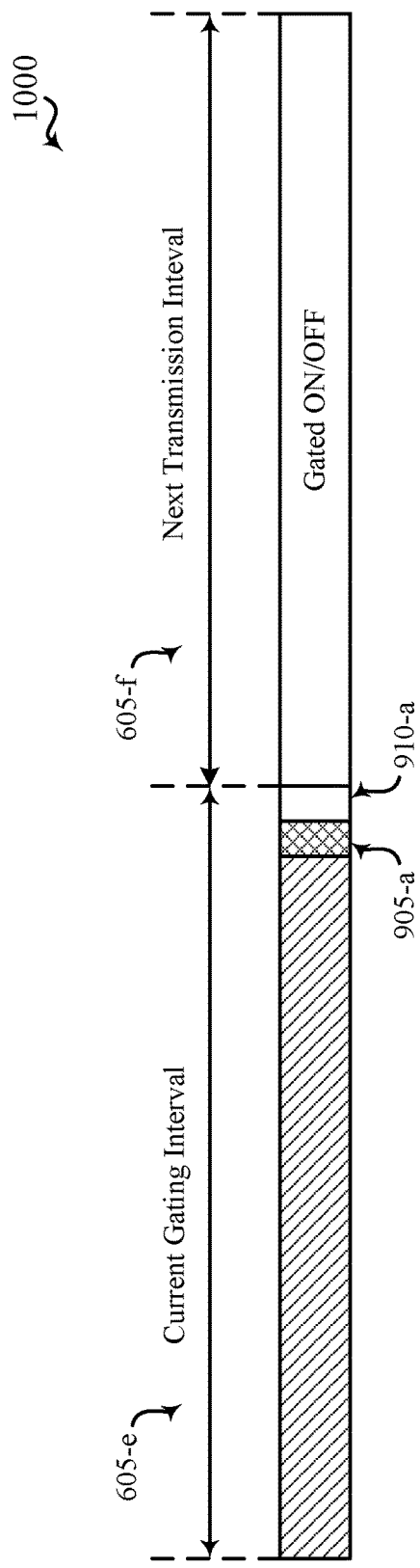
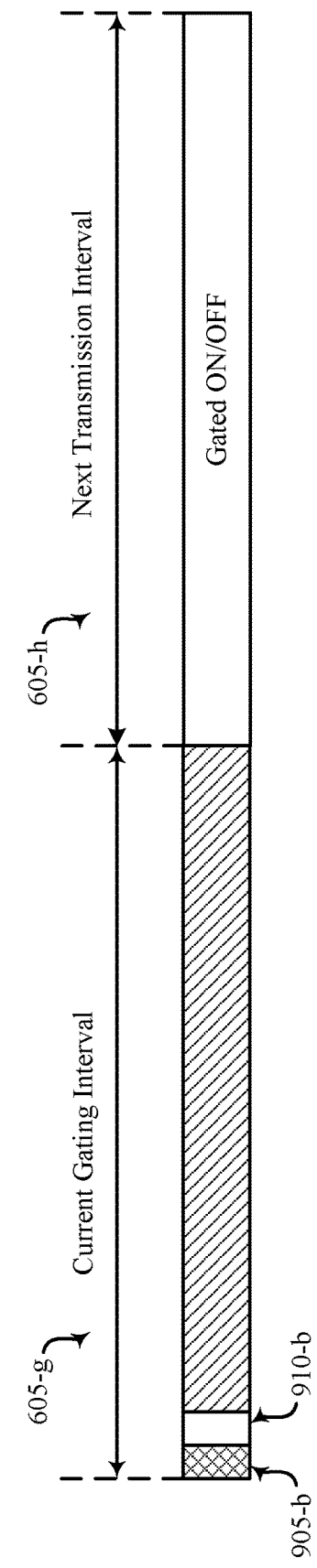
FIG. 10A
FIG. 10B

1700

Receive feedback information from a UE via a PPC uplink in a licensed spectrum, where the feedback information addresses signals transmitted to the UE via a downlink in an unlicensed spectrum
— 1705

FIG. 17A 1700-a

Transmit feedback information from a UE to an eNB via a PPC uplink in a licensed spectrum, where the feedback information addresses signals transmitted to the UE via a downlink in an unlicensed spectrum
— 1715

Broadcast beacon signals in an unlicensed spectrum at predetermined times from an eNB, where the beacon signals including downlink signals that identify the eNB and at least one associated attribute of the eNB — 1905

FIG. 19A 1900-a

Identify an eNB deployment in which downlink signals from the eNBs in the eNB deployment are synchronized and concurrently transmitted by the eNBs of the eNB deployment in an unlicensed spectrum and in a licensed spectrum — 1915

Broadcast beacon signals in the unlicensed spectrum at predetermined times from one of the eNBs in the eNB deployment, where the beacon signals that identify the eNB and the eNB deployment — 1920

FIG. 19B

LISTEN-BEFORE-TALK RESERVATION SCHEME FOR WIRELESS COMMUNICATIONS OVER UNLICENSED SPECTRUM

CROSS REFERENCES

The present Application for Patent is a Continuation of U.S. patent application Ser. No. 14/281,617 by Bhushan et al., entitled "Listen-Before-Talk Reservation Scheme for Wireless Communications Over Unlicensed Spectrum" filed May 19, 2014, which claims priority to U.S. Provisional Patent Application No. 61/825,459 by Bhushan et al., entitled "LTE-Unlicensed," filed May 20, 2013, assigned to the assignee hereof, and expressly incorporated by reference herein.

BACKGROUND

Wireless communication networks are widely deployed to provide various communication services such as voice, video, packet data, messaging, broadcast, and the like. These wireless networks may be multiple-access networks capable of supporting multiple users by sharing the available network resources.

A wireless communication network may include a number of base stations or Node-Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

As wireless communications networks become more congested, operators are beginning to look at ways to increase capacity. One approach may be to use Wireless Local Area Networks (WLANs) to offload some of the traffic and/or signaling. WLANs (or WiFi networks) are attractive because, unlike cellular networks that operate in a licensed spectrum, they generally operate in unlicensed spectrum. Moreover, a growing amount spectrum is being allocated for access without a license, making the option of offloading traffic and/or signaling to WLANs more attractive. This approach, however, may provide a partial solution to the congestion problem since WLANs tend to use spectrum less efficiently than cellular networks. Moreover, the regulations and protocols involved in WLANs are different from those for cellular networks. Therefore, unlicensed spectrum may remain a reasonable option to alleviate congestion if it can be used more efficiently and in accordance with regulatory requirements.

SUMMARY

Methods and apparatuses are described in which an unlicensed spectrum may be used for 3GPP Long Term Evolution (LTE) communications. Various deployment scenarios may be supported including a supplemental downlink mode in which LTE downlink capacity in a licensed spectrum may be offloaded to an unlicensed spectrum. A carrier aggregation mode may be used to offload both LTE downlink and uplink capacity from a licensed spectrum to an unlicensed spectrum. In a standalone mode, LTE downlink and uplink communications between a base station (e.g., an evolved Node B (eNB)) and a UE may take place in an unlicensed spectrum. Base stations as well as UEs may support one or more of these or similar modes. Orthogonal Frequency-Division Multiple Access (OFDMA) communications signals may be used for LTE downlink communications in an unlicensed spectrum, while Single-Carrier Frequency-Division Multiple Access (SC-FDMA) communications signals may be used for LTE uplink communications in an unlicensed spectrum. The use of LTE configured for an unlicensed spectrum may be referred to as LTE-Unlicensed or LTE-U.

In a first set of illustrative examples, a method for wireless communications is described. In one example, the method includes synchronizing CCA slots across multiple base stations to determine availability of an unlicensed spectrum for transmissions in a next transmission interval. In some embodiments, the transmissions include downlink transmissions. In some embodiments, the CCA slots are located in a last subframe of a current gating interval. In some embodiments, the CCA slots are located in a first subframe of a current gating interval. In some embodiments, an interval between commencement of adjacent CCA slots is approximately a duration of an Orthogonal Frequency-Division Multiplexing (OFDM) symbol.

In some embodiments, the method includes identifying one of the CCA slots in which to determine the availability of the unlicensed spectrum, where the one CCA slot is identified based at least in part on a pseudo-random selection sequence driven by a randomization seed. In some embodiments, a subset of the base stations uses the same randomization seed for their pseudo-random selection sequence generation, where the subset is associated with a deployment of base stations by a single operator.

In a second set of illustrative examples, an apparatus for wireless communications is described. In one example, the apparatus includes means for synchronizing CCA slots across multiple base stations to determine availability of an unlicensed spectrum for downlink transmissions in a next transmission interval. In some embodiments, the transmissions include downlink transmissions. In some embodiments, the CCA slots are located in a last subframe of a current gating interval. In some embodiments, the CCA slots are located in a first subframe of a current gating interval. In some embodiments, an interval between commencement of adjacent CCA slots is approximately a duration of an OFDM symbol.

In some embodiments, the apparatus includes means for identifying one of the CCA slots in which to determine the availability of unlicensed spectrum, where the one CCA slot is identified based at least in part on a pseudo-random selection sequence driven by a randomization seed. In some embodiments, a subset of the base stations uses the same randomization seed for their pseudo-random selection sequence generation, where the subset is associated with a deployment of base stations by a single operator.

In a third set of illustrative examples, another apparatus for wireless communications is described. In one example, the apparatus includes a processor, memory in electronic communication with the processor, and instructions stored in the memory. The instructions may be executable by the processor to synchronize CCA slots across multiple base stations to determine availability of an unlicensed spectrum for transmissions in a next transmission interval. In some embodiments, the transmissions include downlink transmissions. In some embodiments, the CCA slots are located in a last subframe of a current gating interval. In some embodiments, the CCA slots are located in a first subframe of a current gating interval. In some embodiments, an interval between commencement of adjacent CCA slots is approximately a duration of an OFDM symbol.

In some embodiments, the instructions are executable by the processor to identify one of the CCA slots in which to determine the availability of the unlicensed spectrum, where the one CCA slot is identified based at least in part on a pseudo-random selection sequence driven by a randomization seed. In some embodiments, a subset of the base stations uses the same randomization seed for their pseudo-random selection sequence generation, where the subset is associated with a deployment of base stations by a single operator.

In a fourth set of illustrative examples, a computer program product for communications by a wireless communications apparatus in a wireless communications system is described. In one example, the computer program product includes a non-transitory computer-readable medium storing instructions executable by a processor to cause the wireless communications apparatus to synchronize CCA slots across multiple base stations to determine availability of an unlicensed spectrum for transmissions in a next transmission interval. In some embodiments, the transmissions include downlink transmissions. In some embodiments, the CCA slots are located in a last subframe of a current gating interval. In some embodiments, the CCA slots are located in a first subframe of a current gating interval. In some embodiments, an interval between commencement of adjacent CCA slots is approximately a duration of an OFDM symbol.

In some embodiments, the instructions are executable by the processor to cause the wireless communications apparatus to identify one of the CCA slots in which to determine the availability of the unlicensed spectrum, where the one CCA slot is identified based at least in part on a pseudo-random selection sequence driven by a randomization seed. In some embodiments, a subset of the base stations uses the same randomization seed for their pseudo-random selection sequence generation, where the subset is associated with a deployment of base stations by a single operator.

In a fifth set of illustrative examples, another method for wireless communications is described. In one example, the method includes performing CCA during one of multiple CCA slots synchronized across multiple eNBs to determine availability of unlicensed spectrum for transmissions in a next transmission interval. In some embodiments, two or more of the eNBs use the same CCA slot to perform CCA during a gating interval. In some embodiments, the method includes identifying the one CCA slot based at least in part on a pseudo-random selection sequence generated from a randomization seed. In some embodiments, the method includes identifying the one CCA slot based at least in part on coordination information exchanged between at least a subset of multiple eNBs over a backhaul. In some embodiments, the method includes transmitting, when the unlicensed spectrum is determined to be available, one or more signals before the next transmission interval to reserve the unlicensed spectrum during the next transmission interval. Each of the one or more signals may start at a boundary of one of multiple CCA slots. In some embodiments, the one or more signals include at least one pilot signal for one or both of time-frequency synchronization and channel quality estimation over the unlicensed spectrum. The at least one pilot signal may be used by a UE to make channel quality measurements on different resource elements to report a channel quality to the respective one of multiple eNBs. In some embodiments, the method includes receiving at one of multiple eNBs a report of a channel quality from a respective UE in response to the one or more signals, where the report is based at least on channel quality measurements made by the UE on different resource elements using the at least one pilot signal, allocating resource elements for transmissions from the one eNB to the respective UE to provide fractional resource reuse among multiple UEs to avoid interference.

In a sixth set of illustrative examples, another apparatus for wireless communications is described. In one example, the apparatus includes means for performing CCA during one of multiple CCA slots synchronized across multiple eNBs to determine availability of unlicensed spectrum for transmissions in a next transmission interval. In some embodiments, the transmissions include downlink transmissions. In some embodiments, two or more of the eNBs use the same CCA slot to perform CCA during a gating interval. In some embodiments, the apparatus includes means for identifying the one CCA slot based at least in part on a pseudo-random selection sequence generated from a randomization seed. In some embodiments, the apparatus includes means for identifying the one CCA slot based at least in part on coordination information exchanged between at least a subset of multiple eNBs over a backhaul. In some embodiments, the apparatus includes means for transmitting, when the unlicensed spectrum is determined to be available, one or more signals before the next transmission interval to reserve the unlicensed spectrum during the next transmission interval. Each of the one or more signals may start at a boundary of one of multiple CCA slots. In some embodiments, the one or more signals include at least one pilot signal for one or both of time-frequency synchronization and channel quality estimation over the unlicensed spectrum. In some embodiments, the at least one pilot signal is used by a UE to make channel quality measurements on different resource elements to report a channel quality to the respective one of multiple eNBs. In some embodiments, the apparatus includes means for receiving at one of multiple eNBs a report of a channel quality from a respective UE in response to the one or more signals, where the report is based at least on channel quality measurements made by the UE on different resource elements using the at least one pilot signal, and means for allocating resource elements for transmissions from the one eNB to the respective UE to provide fractional resource reuse among multiple UEs to avoid interference.

In a seventh set of illustrative examples, another apparatus for wireless communications is described. In one example, the apparatus includes a processor, memory in electronic communication with the processor, and instructions stored in the memory. The instructions may be executable by the processor to perform CCA during one of multiple CCA slots synchronized across multiple eNBs to determine availability of unlicensed spectrum for transmissions in a next transmission interval. In some embodiments, the transmissions include downlink transmissions. In some embodiments, two or more of the eNBs use the same CCA slot to perform CCA during a gating interval. In some embodiments, the instructions are executable by the processor to identify the one CCA slot based at least in part on a pseudo-random selection sequence generated from a randomization seed. In some embodiments, the instructions are executable by the processor to identify the one CCA slot based at least in part on coordination information exchanged between at least a subset of multiple eNBs over a backhaul. In some embodiments, the instructions are executable by the processor to transmit, when the unlicensed spectrum is determined to be available, one or more signals before the next transmission interval to reserve the unlicensed spectrum during the next transmission interval. Each of the one or more signals may start at a boundary of one of multiple CCA slots. In some embodiments, the one or more signals include at least one pilot signal for one or both of time-frequency synchronization and channel quality estimation over the unlicensed spectrum. In some embodiments, the at least one pilot signal is used by a UE to make channel quality measurements on different resource elements to report a channel quality to the respective one of multiple eNBs. In some embodiments, the instructions are executable by the processor to receive at one of multiple eNBs a report of a channel quality from a respective UE in response to the one or more signals, where the report is based at least on channel quality measurements made by the UE on different resource elements using the at least one pilot signal, and to allocate resource elements for transmissions from the one eNB to the respective UE to provide fractional resource reuse among multiple UEs to avoid interference.

In an eighth set of illustrative examples, a computer program product for communications by a wireless communications apparatus in a wireless communications system is described. In one example, the computer program product includes a non-transitory computer-readable medium storing instructions executable by a processor to cause the wireless communications apparatus to perform CCA during one of multiple CCA slots synchronized across multiple eNBs to determine availability of unlicensed spectrum for transmissions in a next transmission interval. In some embodiments, the transmissions include downlink transmissions. In some embodiments, two or more of the eNBs use the same CCA slot to perform CCA during a gating interval. In some embodiments, the instructions are executable by the processor to cause the wireless communications apparatus to identify the one CCA slot based at least in part on a pseudo-random selection sequence generated from a randomization seed. In some embodiments, the instructions are executable by the processor to cause the wireless communications apparatus to identify the one CCA slot based at least in part on coordination information exchanged between at least a subset of multiple eNBs over a backhaul. In some embodiments, the instructions are executable by the processor to cause the wireless communications apparatus to transmit, when the unlicensed spectrum is determined to be available, one or more signals before the next transmission interval to reserve the unlicensed spectrum during the next transmission interval. Each of the one or more signals may start at a boundary of one of multiple CCA slots. In some embodiments, the one or more signals include at least one pilot signal for one or both of time-frequency synchronization and channel quality estimation over the unlicensed spectrum. In some embodiments, the at least one pilot signal is used by a UE to make channel quality measurements on different resource elements to report a channel quality to the respective one of multiple eNBs. In some embodiments, the instructions are executable by the processor to cause the wireless communications apparatus to receive at one of multiple eNBs a report of a channel quality from a respective UE in response to the one or more signals, where the report is based at least on channel quality measurements made by the UE on different resource elements using the at least one pilot signal, and to allocate resource elements for transmissions from the one eNB to the respective UE to provide fractional resource reuse among multiple UEs to avoid interference.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 10A shows a diagram that illustrates an example of gating when the channel usage assessment occurs at the end of a previous gating interval according to various embodiments;

FIG. 10B shows a diagram that illustrates an example of gating when the channel usage assessment occurs at the beginning of a previous gating interval according to various embodiments;

FIG. 17A is a flowchart of an example of a method for receiving feedback information via a Primary Component Carrier (PCC) uplink in a licensed spectrum according to various embodiments;

FIG. 17B is a flowchart of an example of a method for transmitting feedback information via a PCC uplink in a licensed spectrum according to various embodiments;

FIG. 19A is a flowchart of an example of a method for broadcasting LTE-U beacon signals in an unlicensed spectrum according to various embodiments;

FIG. 19B is a flowchart of another example of a method for broadcasting LTE-U beacon signals in an unlicensed spectrum according to various embodiments;

DETAILED DESCRIPTION

Figure 1:
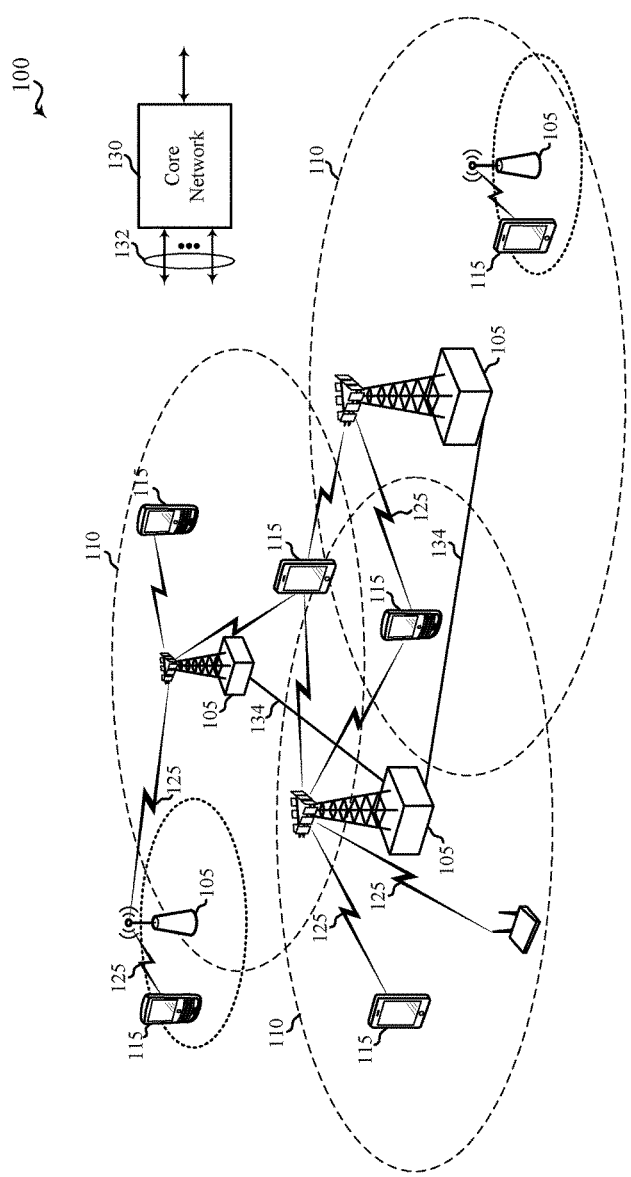
FIG. 1 shows a diagram that illustrates an example of a wireless communications system according to various embodiments.

Various systems, methods, and apparatuses are described in which unlicensed spectrum is used for LTE communications. Various deployment scenarios may be supported including a supplemental downlink mode in which LTE downlink traffic may be offloaded to an unlicensed spectrum. A carrier aggregation mode may be used to offload both LTE downlink and uplink traffic from a licensed spectrum to an unlicensed spectrum. In a standalone mode, LTE downlink and uplink communications between a base station (e.g., an eNB) and a UE may occur in an unlicensed spectrum. LTE and other base stations and UEs may support one or more of these or similar modes of operation. OFDMA communications signals may be used for LTE downlink communications in an unlicensed spectrum, while SC-FDMA communications signals may be used for LTE uplink communications in an unlicensed spectrum.

Operators have so far looked at WiFi as the primary mechanism to use unlicensed spectrum to relieve ever increasing levels of congestion in cellular networks. However, a new carrier type (NCT) based on LTE in an unlicensed spectrum (LTE-U) may be compatible with carrier-grade WiFi, making LTE-U an alternative to WiFi. LTE-U may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE-U may perform significantly better than WiFi. For example, in an all LTE-U deployment (for single or multiple operators), or when there are dense small cell LTE-U deployments, LTE-U may perform significantly better than WiFi. LTE-U may also perform better than WiFi in other scenarios, such as when LTE-U is mixed with WiFi (for single or multiple operators).

For a single service provider (SP), an LTE-U network on an unlicensed spectrum may be configured to be synchronous with an LTE network on a licensed spectrum. In some embodiments, some or all of the LTE-U networks deployed on a given channel by multiple SPs may also be configured to be synchronous across the multiple SPs. One approach to incorporate both the above features may involve using a constant timing offset between LTE and LTE-U for a given SP. In some embodiments, some or all of the LTE-U networks deployed on a given channel by multiple SPs may be configured to be asynchronous across the multiple SPs. An LTE-U network may provide unicast and/or multicast services according to the needs of the SP. Moreover, an LTE-U network may operate in a bootstrapped mode in which LTE cells act as anchor and provide relevant LTE-U cell information (e.g., radio frame timing, common channel configuration, system frame number or SFN, etc.). In this mode, there may be close interworking between LTE and LTE-U. For example, the bootstrapped mode may support the supplemental downlink and the carrier aggregation modes described above. The PHY-MAC layers of the LTE-U network may operate in a standalone mode in which the LTE-U network operates independently from an LTE network. In this case, there may be a loose interworking between LTE and LTE-U based on RLC-level aggregation with colocated LTE/LTE-U cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications. In this description, LTE-Advanced (LTE-A) communications are considered to be a subset of LTE communications, and therefore, references to LTE communications encompass LTE-A communications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 may be an LTE/LTE-A network that supports one or more LTE-U modes of operation or deployment scenarios. In other embodiments, the system 100 may support wireless communications using an unlicensed spectrum and an access technology different from LTE-U, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A/LTE-U network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum (e.g., LTE), an unlicensed spectrum (e.g., LTE-U), or both (LTE/LTE-U). Similarly, the uplink transmissions may be made using a licensed spectrum (e.g., LTE), an unlicensed spectrum (e.g., LTE-U), or both (LTE/LTE-U).

In some embodiments of the system 100, various deployment scenarios for LTE-U may be supported including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE-U deployment scenarios or modes of operation in a system such as the system 100, as well as other features and functions related to the operation of LTE-U, are provided below with reference to FIGS. 2A-32.

Figure 2A:
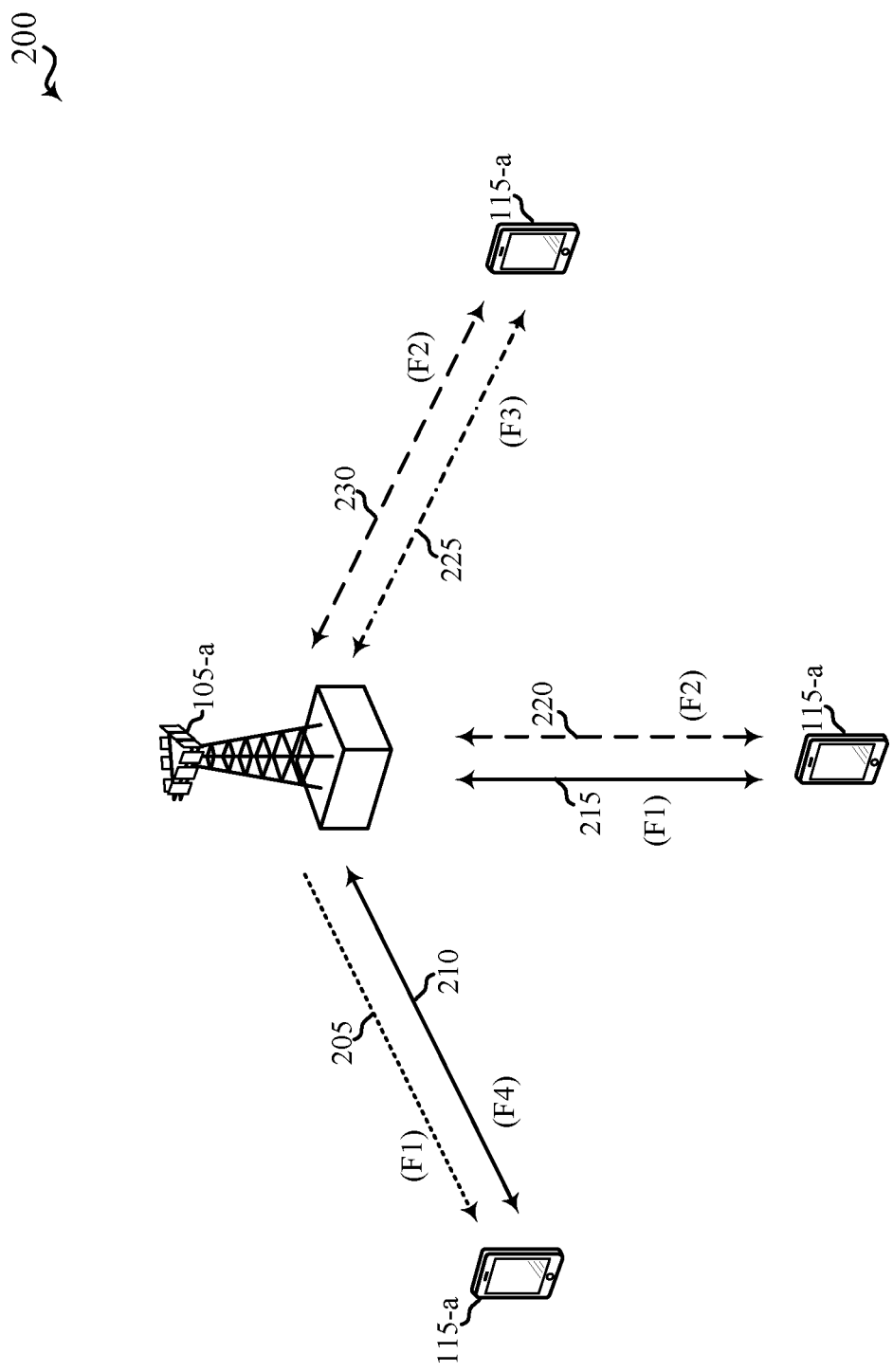
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and a carrier aggregation mode for an LTE network that supports LTE-U. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode shown in diagram 200, the base station 105-a may transmit OFDMA communications signals to a UE 115-a using a downlink 205. The downlink 205 may be associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 may be associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) or multicast services (e.g., addressed to several UEs). This scenario may occur with any service provider (e.g., a traditional mobile network operator or MNO) that uses a licensed spectrum and needs to relieve some of the traffic and/or signaling congestion in the licensed spectrum.

In one example of a carrier aggregation mode shoen in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 may be associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 may be associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode shown in diagram 200, the base station 105-a may transmit OFDMA communications signals to a UE 115-a using a bidirectional link 225 and may receive SC-FDMA communications signals from the same UE 115-a using the bidirectional link 225. The bidirectional link 215 may be associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 may be associated with the frequency F2 in the licensed spectrum. The bidirectional link 225 may provide a downlink and uplink capacity offload for the base station 105-a. This example, and those provided above, are presented for illustrative purposes and there may be other similar modes of operation or deployment scenarios that combine LTE and LTE-U for capacity offload.

As described above, the typical service provider that may benefit from the capacity offload offered by using LTE-U (LTE in an unlicensed spectrum) is a traditional MNO with LTE licensed spectrum. For these service providers, an operational configuration may include a bootstrapped mode (e.g., supplemental downlink, carrier aggregation) that uses the LTE primary component carrier (PCC) on the licensed spectrum and the LTE-U secondary component carrier (SCC) on the unlicensed spectrum.

In the supplemental downlink mode, control for LTE-U may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. In some embodiments, there may be no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE-U (e.g., bidirectional links 215 and 225). The carrier aggregation mechanisms supported when using LTE-U may fall under a hybrid frequency division duplexing-time division duplexing (FDD-TDD) carrier aggregation or a TDD-TDD carrier aggregation with different symmetry across component carriers.

Figure 2B:
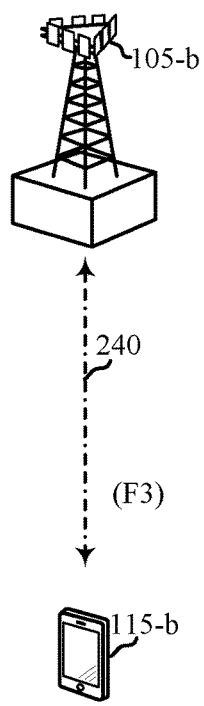
FIG. 2B shows a diagram that illustrates another example of a deployment scenario for using LTE in an unlicensed spectrum according to various embodiments.

FIG. 2B shows a diagram 200-a that illustrates an example of a standalone mode for LTE-U. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and/or the UEs 115-a of FIG. 2A.

In the example of a standalone mode shoen in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 may be associated with the frequency F3 in an unlicensed spectrum described above with reference to FIG. 2A. The standalone mode may be used in non-traditional wireless access scenarios, such as in-stadium access scenarios (e.g., unicast, multicast). The typical service provider for this mode of operation may be a stadium owner, cable company, event host, hotel, enterprise, and/or large corporation that does not have licensed spectrum. For these service providers, an operational configuration for the standalone mode may use the LTE-U PCC on the unlicensed spectrum. Moreover, LBT may be implemented on both the base station and the UE.

Figure 3:
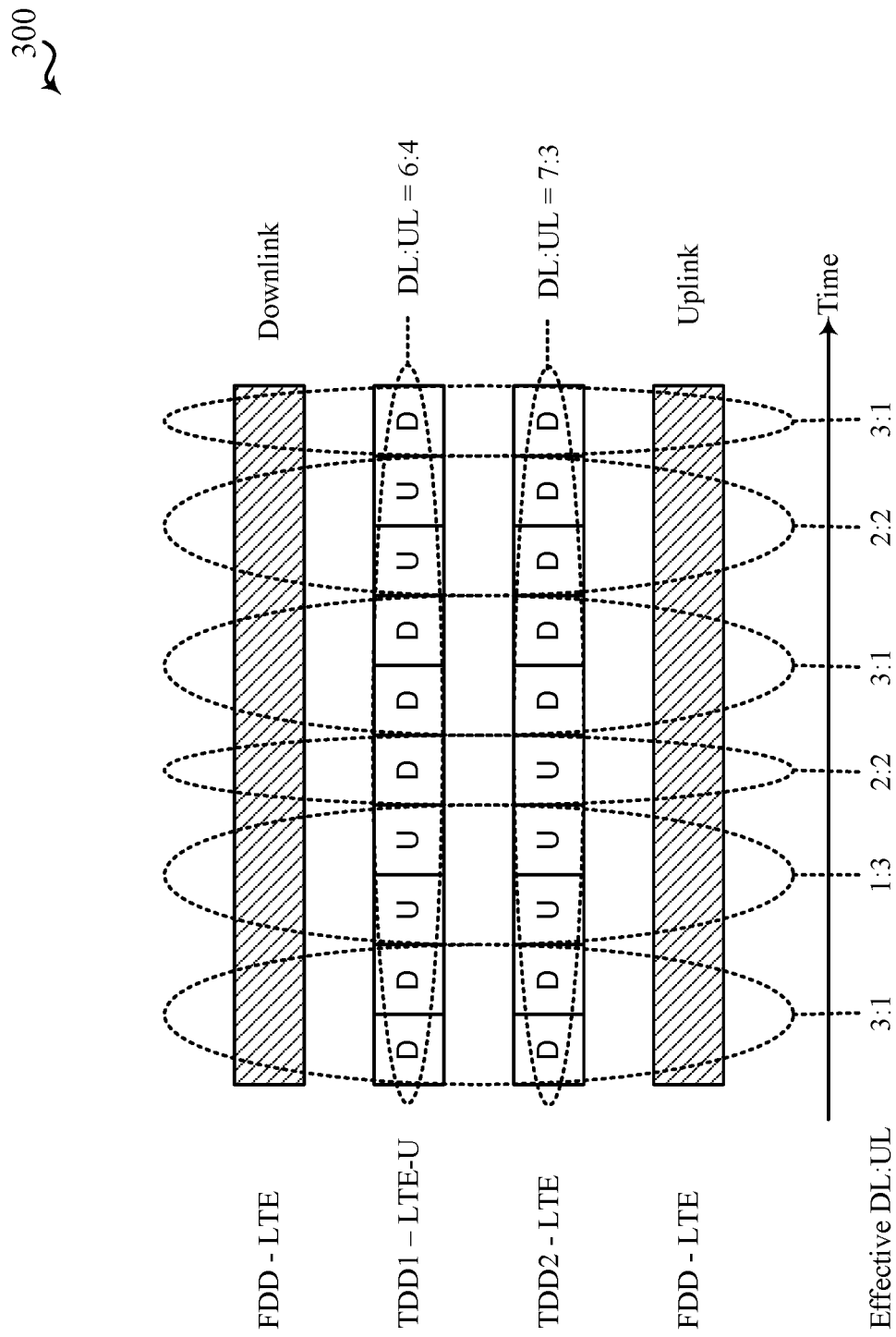
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE-U, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE and LTE-U.

Figure 4A:
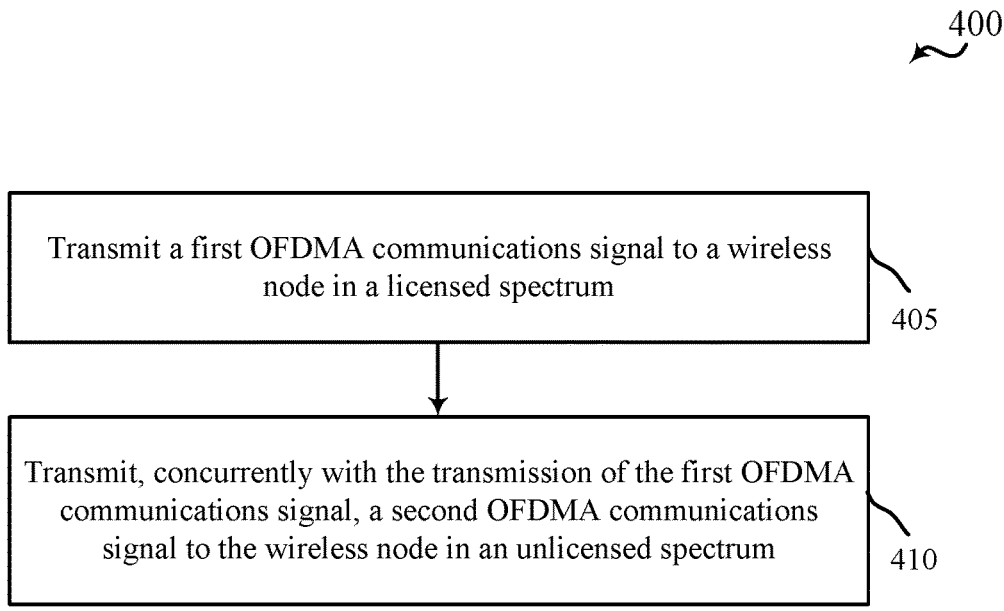
FIG. 4A is a flowchart of an example of a method for concurrent use of LTE in licensed and unlicensed spectrum in a base station according to various embodiments.

FIG. 4A shows a flowchart of a method 400 for concurrent use of LTE in licensed and unlicensed spectrum by a first wireless node (e.g., a base station or eNB) according to various embodiments. The method 400 may be implemented using, for example, the base stations or eNBs 105, 105-a, and 105-b of FIG. 1, FIG. 2A, and FIG. 2B, respectively; and/or the system 100 of FIG. 1 and the portions of system 200 and/or 200-a of FIG. 2A and FIG. 2B. In one implementation, one of the base stations or eNBs 105 may execute one or more sets of codes to control the functional elements of the base stations or eNB 105 to perform the functions described below.

At block 405, a first OFDMA communications signal may be transmitted to a second wireless node (e.g., UE 115) in a licensed spectrum. At block 410, a second OFDMA communications signal may be transmitted to the second wireless node in an unlicensed spectrum concurrently with the transmission of the first OFDMA communications signal. In some embodiments, the first and second OFDMA communications signals may be transmitted from at least one base station or eNB.

In some embodiments of the method 400, the transmission of the second OFDMA communications signal in the unlicensed spectrum may be time-synchronized with the transmission of the first OFDMA communications signal in the licensed spectrum, with a fixed offset between a frame structure of the first OFDMA communications signal and a frame structure of the second OFDMA communications signal. In some embodiments, the fixed offset may be zero or substantially zero.

In some embodiments of the method 400, a first SC-FDMA communications signal may be may be received from the second wireless node in a licensed spectrum concurrently with the transmission of the first and second OFDMA communication signals. The first SC-FDMA communications signal received from the second wireless node in the licensed spectrum may carry signaling or other control information related to the second OFDMA communications signal transmitted in the unlicensed spectrum. The method may include receiving, concurrently with the transmission of the first and second OFDMA communications signals, a second SC-FDMA communications signal from the second wireless node in an unlicensed spectrum. The method may include receiving, concurrently with the transmission of the first and second OFDMA communications signals, a first SC-FDMA communications signal from the in a licensed spectrum and a second SC-FDMA communications signal from the UE in an unlicensed spectrum. In some embodiments, each of the first and second OFDMA communications signals may include an LTE signal.

Figure 4B:
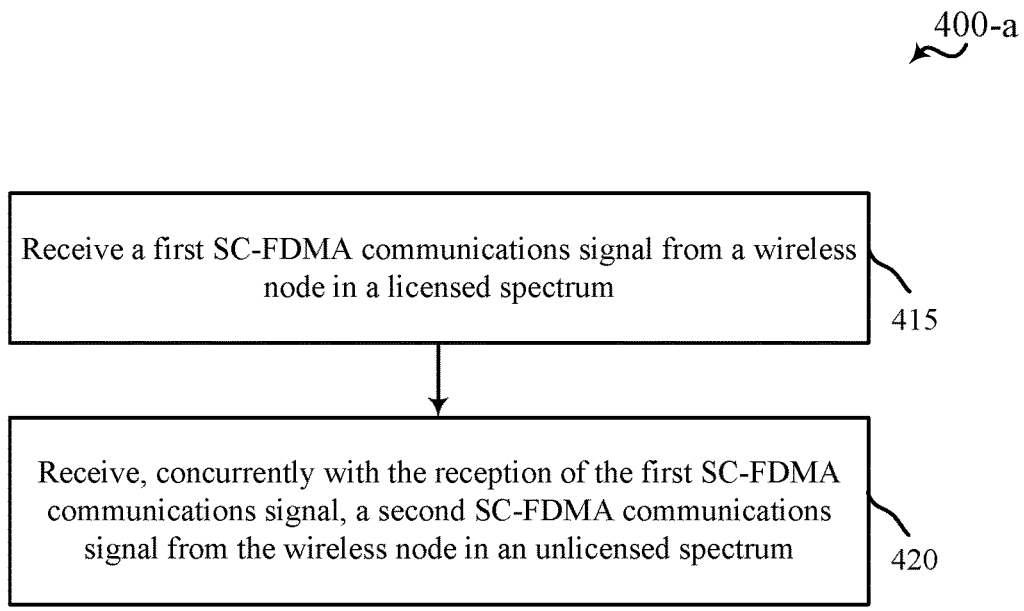
FIG. 4B is a flowchart of another example of a method for concurrent use of LTE in licensed and unlicensed spectrum in a base station according to various embodiments.

FIG. 4B shows a flowchart of a method 400-a for concurrent use of LTE in licensed and unlicensed spectrum by a first wireless node (e.g., a base station or eNB) according to various embodiments. The method 400-a, like the method 400 above, may be implemented using, for example, the base stations or eNBs 105, 105-a, and 105-b of FIG. 1, FIG. 2A, and FIG. 2B, respectively; and/or the system 100 of FIG. 1 and the portions of the system 200 and/or 200-a of FIG. 2A and FIG. 2B. In one implementation, one of the base stations or eNBs 105 may execute one or more sets of codes to control the functional elements of the base station or eNB 105 to perform the functions described below.

At block 415, a first SC-FDMA communications signal may be received from a second wireless node (e.g., UE 115) in a licensed spectrum.

At block 420, a second SC-FDMA communications signal may be received from the second wireless node in an unlicensed spectrum concurrently with the reception of the first OFDMA communications signal. In some embodiments, the first and second SC-FDMA communications signals may be received from at least one UE. In some embodiments, each of the first and second SC-FDMA communications signals may include an LTE signal.

Figure 5A:
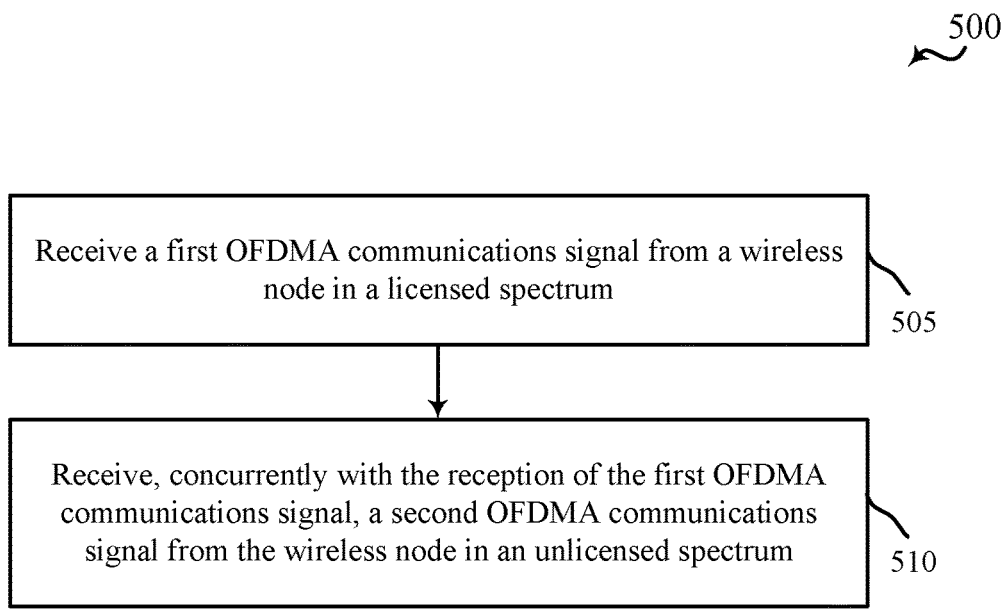
FIG. 5A is a flowchart of an example of a method for concurrent use of LTE in licensed and unlicensed spectrum in a UE according to various embodiments.

FIG. 5A shows a flowchart of a method 500 for concurrent use of LTE in licensed and unlicensed spectrum by a first wireless node (e.g., a UE) according to various embodiments. The method 500 may be implemented using, for example, the UEs 115, 115-a, and 115-b of FIG. 1, FIG. 2A, and FIG. 2B, respectively; and/or the system 100 of FIG. 1 and the portions of the system 200 and/or 200-a of FIG. 2A and FIG. 2B. In one implementation, one of the UEs 115 may execute one or more sets of codes to control the functional elements of the UE 115 to perform the functions described below.

At block 505, a first OFDMA communications signal may be received from a second wireless node (e.g., a base station or eNB 105) in a licensed spectrum.

At block 510, a second OFDMA communications signal may be received from the second wireless node in an unlicensed spectrum concurrently with the reception of the first OFDMA communications signal. In some embodiments, the first and second OFDMA communications signals may be received at a UE.

In some embodiments of the method 500, a first SC-FDMA communications signal may be transmitted to the second wireless node in a licensed spectrum concurrently with the reception of the first and second OFDMA communications signals. The first SC-FDMA communications signal received transmitted to the second wireless node in the licensed spectrum may carry signaling or other control information related to the second OFDMA signal received on the unlicensed spectrum. The method may include transmitting, concurrently with the reception of the first and second OFDMA communications signals, a second SC-FDMA communications signal to the second wireless node in an unlicensed spectrum. The method may include transmitting, concurrently with the reception of the first and second OFDMA communications signals, a first SC-FDMA communications signal to the second wireless node in a licensed spectrum and a second SC-FDMA communications signal to the second wireless node in an unlicensed spectrum. Each of the first and second OFDMA communications signals may include an LTE signal.

Figure 5B:
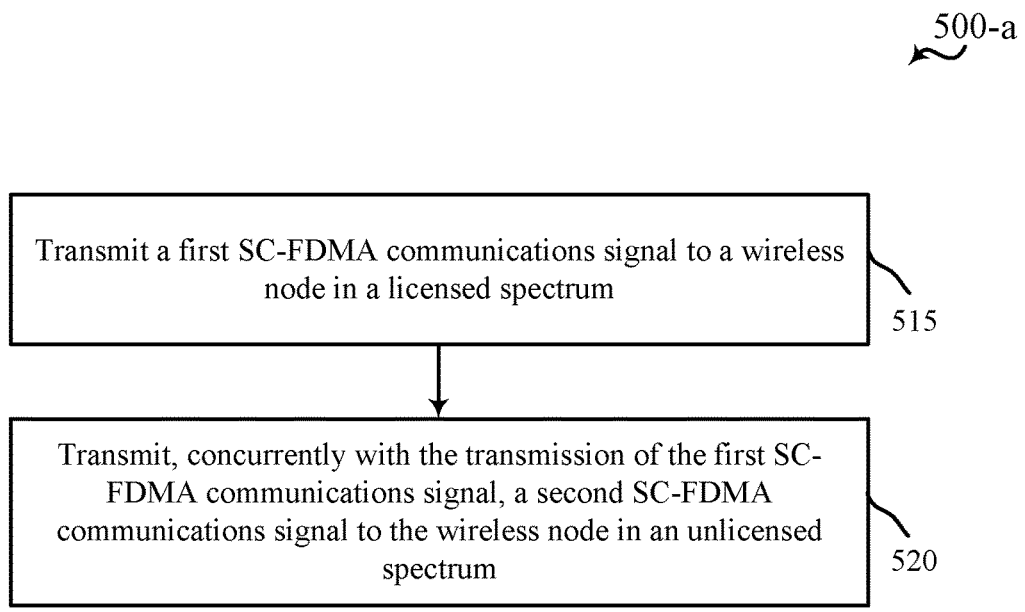
FIG. 5B is a flowchart of yet another example of a method for concurrent use of LTE in licensed and unlicensed spectrum in a UE according to various embodiments.

FIG. 5B shows a flowchart of a method 500-a for concurrent use of LTE in licensed and unlicensed spectrum by a first wireless node (e.g., a UE) according to various embodiments. The method 500-a, like the method 500 above, may be implemented using, for example, the UEs 115, 115-a, and 115-b of FIG. 1, FIG. 2A, and FIG. 2B, respectively; and/or the system 100 of FIG. 1 and the portions of the system 200 and/or 200-a of FIG. 2A and FIG. 2B. In one implementation, one of the UEs 115 may execute one or more sets of codes to control the functional elements of the UE 115 to perform the functions described below.

At block 515, a first SC-FDMA communications signal may be transmitted to a second wirelessnode (e.g., a base station or eNB 105) in a licensed spectrum.

At block 520, a second SC-FDMA communications signal may be transmitted to the second wireless node in an unlicensed spectrum concurrently with the transmission of the first SC-FDMA communications signal. In some embodiments, the first and second SC-FDMA communications signals may be transmitted from a UE. In some embodiments, each of the first and second SC-FDMA communications signals may include an LTE signal.

In some embodiments, a transmitting device such as a base station, eNB 105, UE 115 (or a transmitter of a transmitting device) may use a gating interval to gain access to a channel of the unlicensed spectrum. The gating interval may define the application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting device needs to perform a Clear Channel Assessment (CCA). The outcome of the CCA indicates to the transmitting device whether a channel of the unlicensed spectrum is available or in use. When the CCA indicates that the channel is available (e.g., "clear" for use), the gating interval may allow the transmitting device to use the channel—typically for a predefined period of time. When the CCA indicates that the channel is not available (e.g., in use or reserved), the gating interval may prevent the transmitting device from using the channel for a period of time.

In some cases, it may be useful for a transmitting device to generate a gating interval on a periodic basis and synchronize at least one boundary of the gating interval with at least one boundary of a periodic frame structure. For example, it may be useful to generate a periodic gating interval for a downlink in an unlicensed spectrum, and to synchronize at least one boundary of the periodic gating interval with at least one boundary of a periodic frame structure associated with the downlink. Examples of such synchronization are illustrated in FIGS. 6A, 6B, 6C, and 6D.

Figure 6A:
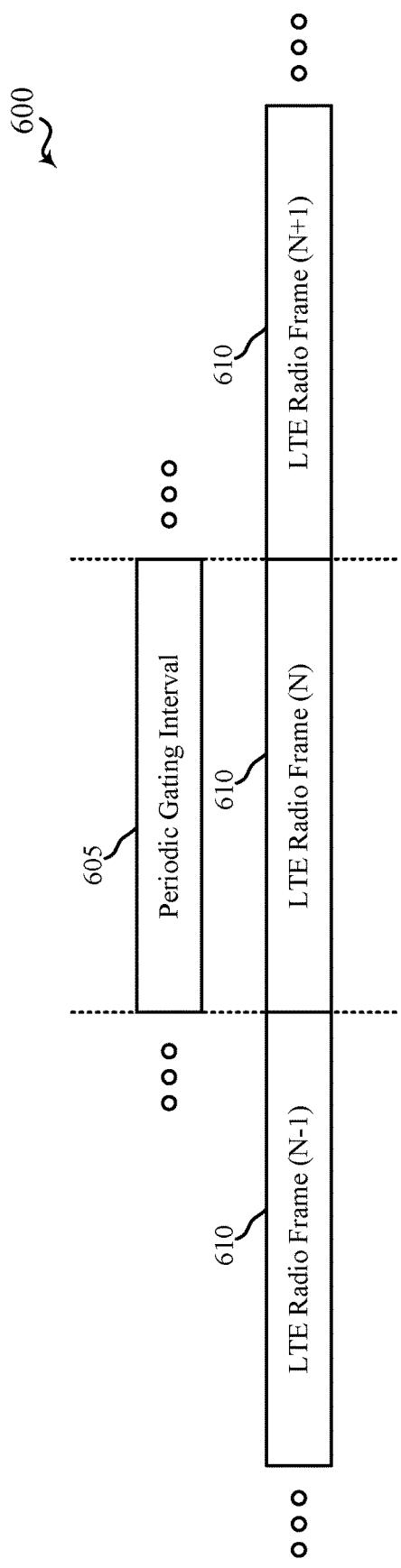
FIG. 6A shows a diagram that illustrates an example of a periodic gating structure aligned to a periodic frame structure according to various embodiments.

FIG. 6A illustrates a first example 600 of a periodic gating interval 605 for transmissions (uplink and/or downlink) in an unlicensed spectrum. The periodic gating interval 605 may be used by an eNB that supports LTE-U (LTE-U eNB). Examples of such an eNB may be the base stations 105, 105-a, and 105-b of FIG. 1, FIG. 2A, and FIG. 2B, respectively. The gating interval 605 may be used with the system 100 of FIG. 1 and with portions of the system 200 and/or 200-a shown in FIG. 2A and FIG. 2B.

By way of example, the duration of the periodic gating interval 605 is shown to be equal to (or approximately equal to) the duration of the periodic frame structure 610. In some embodiments, the periodic frame structure 610 may be associated with a primary component carrier (PCC) of a downlink. In some embodiments, "approximately equal" means the duration of the periodic gating interval 605 is within a cyclic prefix (CP) duration of the duration of the periodic frame structure 610.

At least one boundary of the periodic gating interval 605 may be synchronized with at least one boundary of the periodic frame structure 610. In some cases, the periodic gating interval 605 may have boundaries that are aligned with the frame boundaries of the periodic frame structure 610. In other cases, the periodic gating interval 605 may have boundaries that are synchronized with, but offset from, the frame boundaries of the periodic frame structure 610. For example, the boundaries of the periodic gating interval 605 may be aligned with subframe boundaries of the periodic frame structure 610, or with subframe midpoint boundaries (e.g., the midpoints of particular subframes) of the periodic frame structure 610.

In some cases, each periodic frame structure 610 may include an LTE radio frame (e.g., an LTE radio frame (N-1), an LTE radio frame (N), or an LTE radio frame (N+1)). Each LTE radio frame may have a duration of ten milliseconds, and the periodic gating interval 605 may also have a duration of ten milliseconds. In these cases, the boundaries of the periodic gating interval 605 may be synchronized with the boundaries (e.g., frame boundaries, subframe boundaries, or subframe midpoint boundaries) of one of the LTE radio frames (e.g., the LTE radio frame (N)).

Figure 6B:
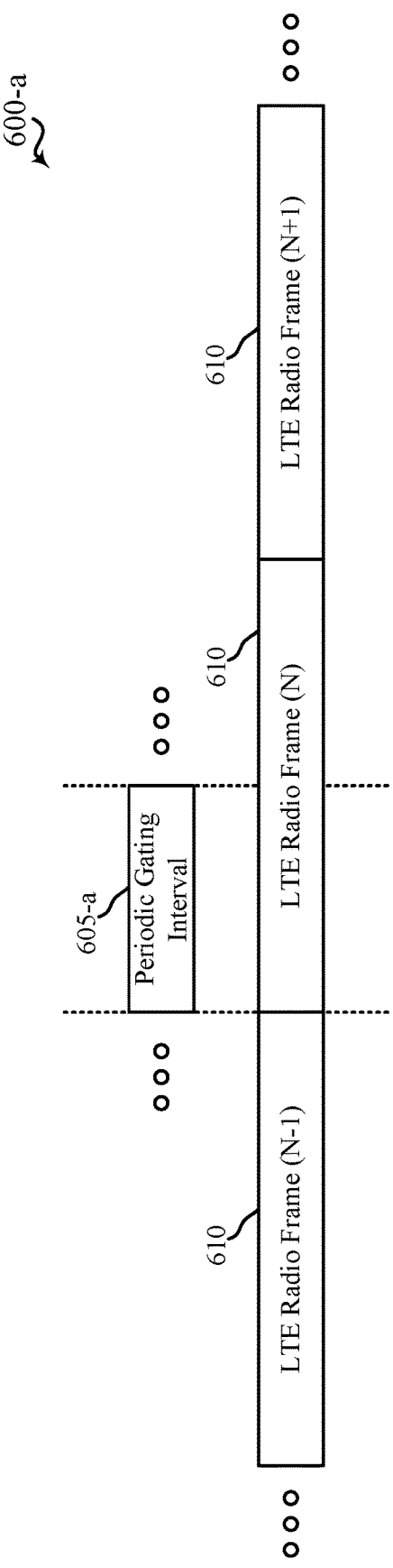
FIG. 6B shows a diagram that illustrates an example of a periodic gating structure that is half a periodic frame structure according to various embodiments.

FIG. 6B illustrates a second example 600-a of a periodic gating interval 605-a for transmissions (uplink and/or downlink) in an unlicensed spectrum. The periodic gating interval 605-a may be used by an eNB that supports LTE-U (LTE-U eNB). Examples of such an eNB may be the base stations 105, 105-a, and 105-b of FIG. 1, FIG. 2A, and FIG. 2B, respectively. The gating interval 605 may be used with the system 100 of FIG. 1 and with portions of the system 200 and/or 200-a shown in FIG. 2A and FIG. 2B.

By way of example, the duration of the periodic gating interval 605-a is shown to be a sub-multiple of (or an approximate sub-multiple of) the duration of the periodic frame structure 610. In some embodiments, an "approximate sub-multiple of" means the duration of the periodic gating interval 605-a is within a cyclic prefix (CP) duration of the duration of a sub-multiple of (e.g., half) the periodic frame structure 610.

At least one boundary of the periodic gating interval 605-a may be synchronized with at least one boundary of the periodic frame structure 610. In some cases, the periodic gating interval 605-a may have a leading or trailing boundary that is aligned with a leading or trailing frame boundary of the periodic frame structure 610. In other cases, the periodic gating interval 605-a may have boundaries that are synchronized with, but offset from, each of the frame boundaries of the periodic frame structure 610. For example, the boundaries of the periodic gating interval 605-a may be aligned with subframe boundaries of the periodic frame structure 610, or with subframe midpoint boundaries (e.g., the midpoints of particular subframes) of the periodic frame structure 610.

In some cases, each periodic frame structure 610 may include an LTE radio frame (e.g., an LTE radio frame (N-1), an LTE radio frame (N), or an LTE radio frame (N+1)). Each LTE radio frame may have a duration of ten milliseconds, and the periodic gating interval 605-a may have a duration of five milliseconds. In these cases, the boundaries of the periodic gating interval 605-a may be synchronized with the boundaries (e.g., frame boundaries, subframe boundaries, or subframe midpoint boundaries) of one of the LTE radio frames (e.g., LTE radio frame (N)). The periodic gating interval 605-a may then be repeated, for example, every periodic frame structure 610, more than once every periodic frame structure 610 (e.g., twice), or once every Nth periodic frame structure 610 (e.g., for N=2, 3, . . . ).

Figure 6C:
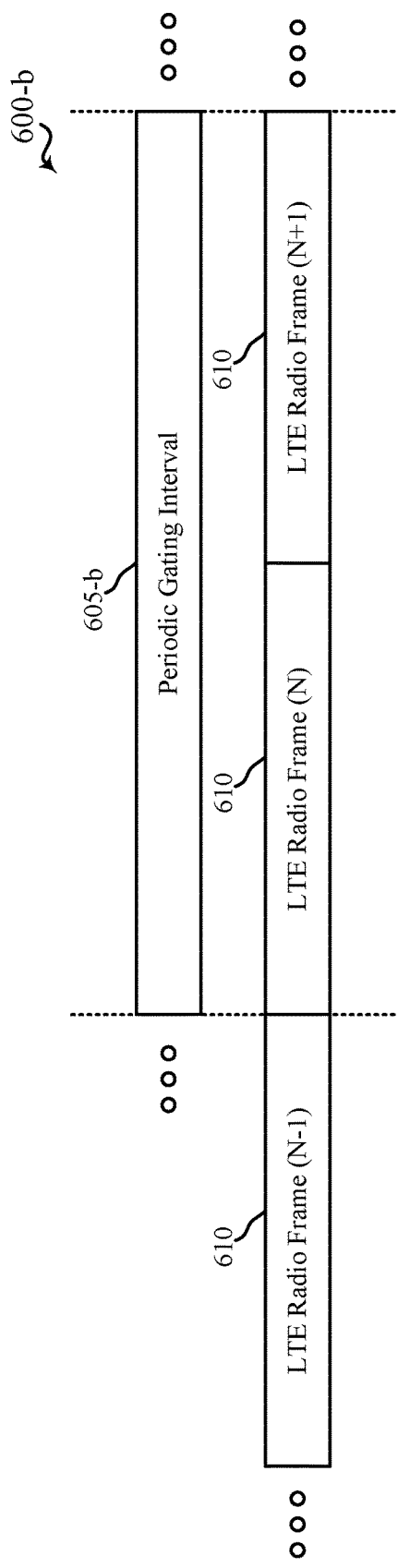
FIG. 6C shows a diagram that illustrates an example of a periodic gating structure that is twice a periodic frame structure according to various embodiments.

FIG. 6C illustrates a third example 600-b of a periodic gating interval 605-b for transmissions (uplink and/or downlink) in an unlicensed spectrum. The periodic gating interval 605-b may be used by an eNB that supports LTE-U (LTE-U eNB). Examples of such an eNB may be the base stations 105, 105-a, and 105-b of FIG. 1, FIG. 2A, and FIG. 2B, respectively. The gating interval 605 may be used with the system 100 of FIG. 1 and with portions of the system 200 and/or 200-a shown in FIG. 2A and FIG. 2B.

By way of example, the duration of the periodic gating interval 605-b is shown to be an integer multiple of (or an approximate integer multiple of) the duration of the periodic frame structure 610. In some embodiments, an "approximate integer multiple of" means the duration of the periodic gating interval 605-b is within a cyclic prefix (CP) duration of an integer multiple of (e.g., double) the duration of the periodic frame structure 610.

At least one boundary of the periodic gating interval 605-b may be synchronized with at least one boundary of the periodic frame structure 610. In some cases, the periodic gating interval 605-b may have a leading boundary and a trailing boundary that are aligned with respective leading or trailing frame boundaries of the periodic frame structure 610. In other cases, the periodic gating interval 605-b may have boundaries that are synchronized with, but offset from, the frame boundaries of the periodic frame structure 610. For example, the boundaries of the periodic gating interval 605-*b* may be aligned with subframe boundaries of the periodic frame structure 610, or with subframe midpoint boundaries (e.g., the midpoints of particular subframes) of the periodic frame structure 610.

In some cases, each periodic frame structure 610 may include an LTE radio frame (e.g., an LTE radio frame (N−1), an LTE radio frame (N), or an LTE radio frame (N+1)). Each LTE radio frame may have a duration of ten milliseconds, and the periodic gating interval 605-*b* may have a duration of twenty milliseconds. In these cases, the boundaries of the periodic gating interval 605-*b* may be synchronized with the boundaries (e.g., frame boundaries, subframe boundaries, or subframe midpoint boundaries) of one or two of the LTE radio frames (e.g., LTE radio frame (N) and LTE radio frame (N+1)).

Figure 6D:
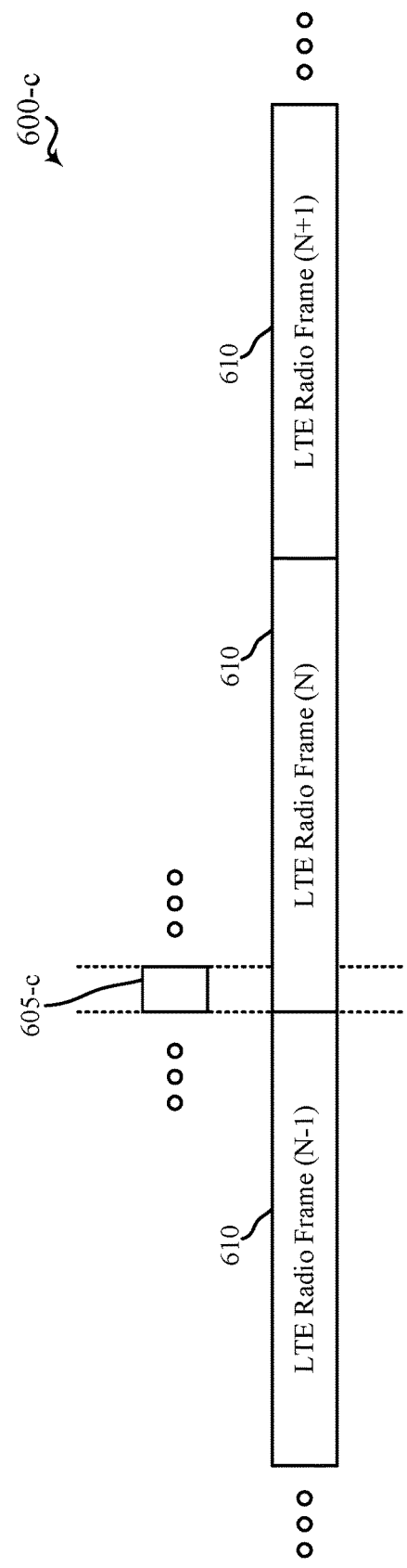
FIG. 6D shows a diagram that illustrates an example of a periodic gating structure that is smaller than a periodic frame structure according to various embodiments.

FIG. 6D illustrates a fourth example 600-*c* of a periodic gating interval 605-*c* for transmissions (uplink and/or downlink) in an unlicensed spectrum. The periodic gating interval 605-*c* may be used by an eNB that supports LTE-U (LTE-U eNB). Examples of such an eNB may be the base stations 105, 105-*a*, and 105-*b* of FIG. 1, FIG. 2A, and FIG. 2B, respectively. The gating interval 605 may be used with the system 100 of FIG. 1 and with portions of the system 200 and/or 200-*a* shown in FIG. 2A and FIG. 2B.

By way of example, the duration of the periodic gating interval 605-*c* is shown to be a sub-multiple of (or an approximate sub-multiple of) the duration of the periodic frame structure 610. The sub-multiple may be one-tenth of the duration of the periodic frame structure 610.

At least one boundary of the periodic gating interval 605-*c* may be synchronized with at least one boundary of the periodic frame structure 610. In some cases, the periodic gating interval 605-*c* may have a leading or trailing boundary that is aligned with a leading or trailing frame boundary of the periodic frame structure 610. In other cases, the periodic gating interval 605-*c* may have boundaries that are synchronized with, but offset from, each of the frame boundaries of the periodic frame structure 610. For example, the boundaries of the periodic gating interval 605-*c* may be aligned with subframe boundaries of the periodic frame structure 610, or with subframe midpoint boundaries (e.g., the midpoints of particular subframes) of the periodic frame structure 610.

In some cases, each periodic frame structure 610 may include an LTE radio frame (e.g., an LTE radio frame (N−1), an LTE radio frame (N), or an LTE radio frame (N+1)). Each LTE radio frame may have a duration of ten milliseconds, and the periodic gating interval 605-*c* may have a duration of one millisecond (e.g., the duration of one subframe). In these cases, the boundaries of the periodic gating interval 605-*c* may be synchronized with the boundaries (e.g., frame boundaries, subframe boundaries, or subframe midpoint boundaries) of one of the LTE radio frames (e.g., LTE radio frame (N)). The periodic gating interval 605-*c* may then be repeated, for example, every periodic frame structure 610, more than once every periodic frame structure 610, or once every Nth periodic frame structure 610 (e.g., for N=2, 3, . . . ).

Figure 7A:
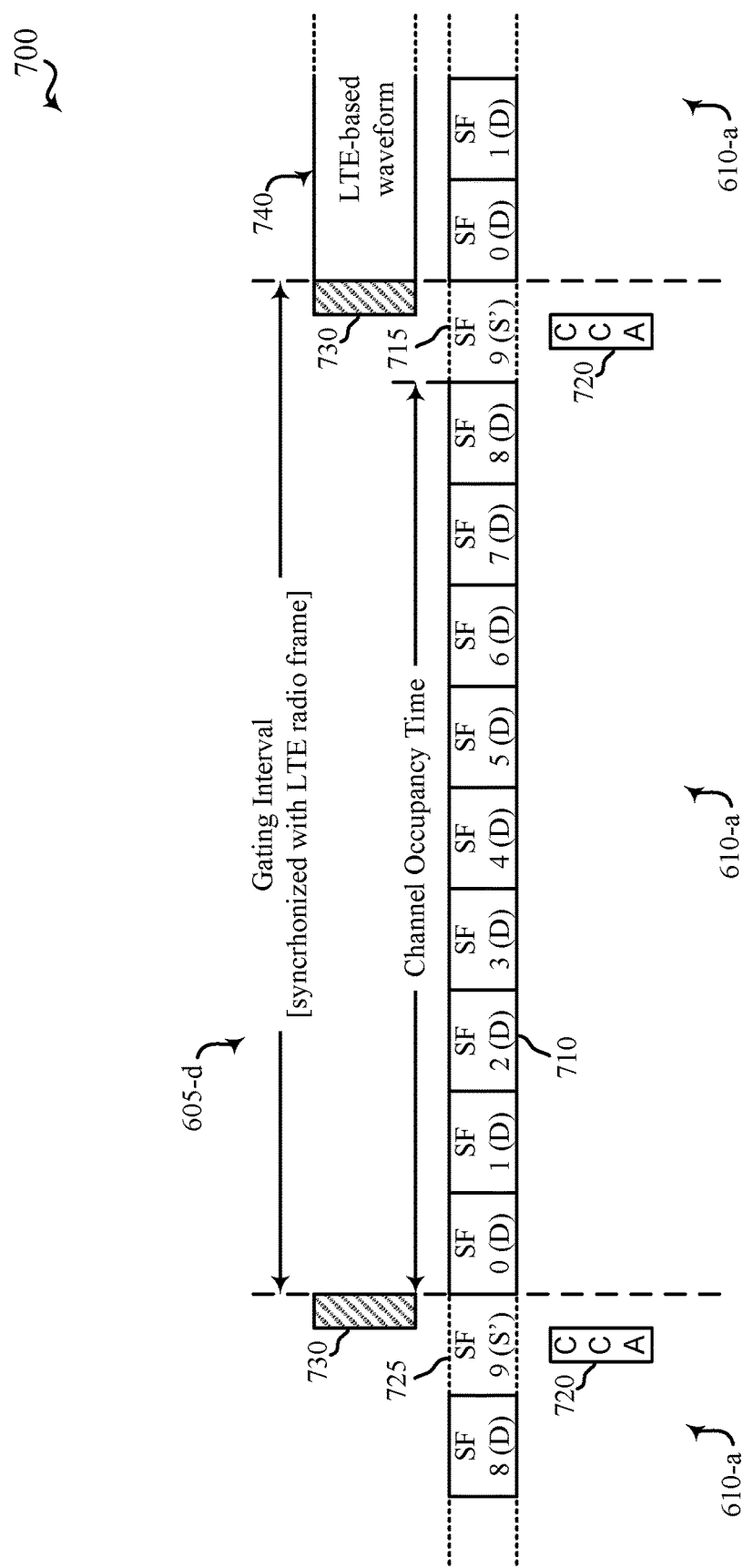
FIG. 7A shows a diagram that illustrates an example of a periodic gating structure waveform according to various embodiments.

FIG. 7A illustrates a fifth example 700 of a periodic gating interval 605-*d*-1 for transmissions (uplink and/or downlink) in an unlicensed spectrum. The periodic gating interval 605-*d*-1 may be used by an eNB that supports LTE-U (LTE-U eNB). Examples of such an eNB may be the base stations 105, 105-*a*, and 105-*b* of FIG. 1, FIG. 2A, and FIG. 2B, respectively. The gating interval 605-*d*-1 may be used with the system 100 of FIG. 1 and with portions of the system 200 and/or 200-*a* shown in FIG. 2A and FIG. 2B.

By way of example, the duration of the periodic gating interval 605-*d*-1 is shown to be equal to (or approximately equal to) the duration of a periodic frame structure 610-*a*. In some embodiments, the periodic frame structure 610-*a* may be associated with a primary component carrier (PCC) of a downlink. The boundaries of the periodic gating interval 605-*d*-1 may be synchronized with (e.g., aligned with) the boundaries of the periodic frame structure 610-*a*.

The periodic frame structure 610-*a* may include an LTE radio frame having ten subframes (e.g., SF0, SF1, . . . , SF9). Subframes SF0 through SF8 may be downlink (D) subframes 710, and subframe SF9 may be a special (S') subframe 715. The D and/or S' subframes 710 and/or 715 may collectively define a channel occupancy time of the LTE radio frame, and at least part of the S' subframe 715 may define a channel idle time. Under the current LTE standard, an LTE radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE standard, the periodic gating interval 605-*d* may abide by these requirements of the LTE standard by providing a 0.5 millisecond guard period (i.e., OFF time) as part of the S' subframe 715.

Because the S' subframe 715 has a duration of one millisecond, it may include one or more CCA slots 720 (e.g., time slots) in which the transmitting devices contending for a particular channel of an unlicensed spectrum may perform their CCAs. When a transmitting device's CCA indicates the channel is available, but the device's CCA is completed before the end of the periodic gating interval 605-*d*-1, the device may transmit one or more signals to reserve the channel until the end of the periodic gating interval 605-*d*-1. The one or more signals may in some cases include Channel Usage Pilot Signals (CUPS) or Channel Usage Beacon Signals (CUBS) 730. CUBS 730 are described in detail later in this description, but may be used for both channel synchronization and channel reservation. That is, a device that performs a CCA for the channel after another device begins to transmit CUBS on the channel may detect the energy of the CUBS 730 and determine that the channel is currently unavailable.

Following a transmitting device's successful completion of a CCA for a channel and/or the transmission of CUBS 730 over a channel, the transmitting device may use the channel for up to a predetermined period of time (e.g., one gating interval or one LTE radio frame) to transmit a waveform (e.g., an LTE-based waveform 740).

Figure 7B:
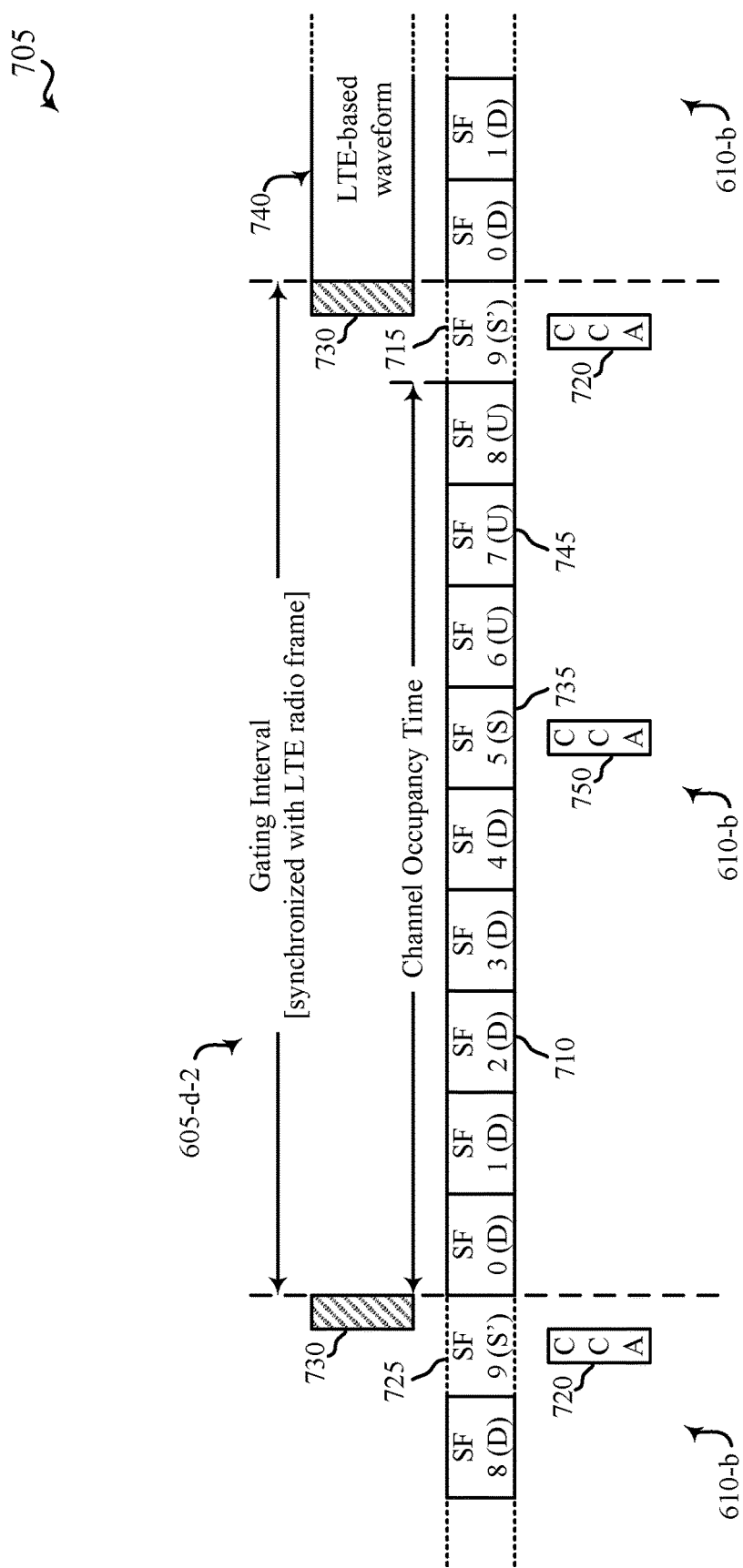
FIG. 7B shows a diagram that illustrates another example of a periodic gating structure waveform according to various embodiments.

FIG. 7B illustrates a sixth example 705 of a periodic gating interval 605-*d*-2 for transmissions (uplink and/or downlink) in an unlicensed spectrum. The periodic gating interval 605-*d*-2 may be used by an eNB or UE that supports LTE-U (LTE-U eNB or LTE-U UE). Examples of such an eNB may be the base stations 105, 105-*a*, and 105-*b* of FIG. 1, FIG. 2A, and FIG. 2B, respectively, and examples of such a UE may be the UEs 115, 115-*a*, and 115-*b* of FIG. 1. The gating interval 605-*d*-2 may be used with the system 100 of FIG. 1 and with portions of the system 200 and/or 200-*a* shown in FIG. 2A and FIG. 2B.

By way of example, the duration of the periodic gating interval 605-*d*-2 is shown to be equal to (or approximately equal to) the duration of a periodic frame structure 610-*a*. In some embodiments, the periodic frame structure 610-*a* may be associated with a primary component carrier (PCC) of a downlink. The boundaries of the periodic gating interval 605-d-2 may be synchronized with (e.g., aligned with) the boundaries of the periodic frame structure 610-a.

The periodic frame structure 610-b may include an LTE radio frame having ten subframes (e.g., SF0, SF1, . . . , SF9). Subframes SF0 through SF4 may be downlink (D) subframes 710; subframe SF5 may be a special (S) subframe 735; subframes SF6 through SF8 may be uplink (U) subframes 745; and subframe SF9 may be a special (S') subframe 715. The D, S, U, and/or S' subframes 710, 735, 745, and/or 715 may collectively define a channel occupancy time of the LTE radio frame, and at least part of the S subframe 735 and/or S' subframe 715 may define a channel idle time. Under the current LTE standard, an LTE radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE standard, the periodic gating interval 605-d-2 may abide by these requirements of the LTE standard by providing a 0.5 millisecond guard period or silence period (i.e., OFF time) as part of the S subframe 735 and/or S' subframe 715.

Because the S' subframe 715 has a duration of one millisecond, it may include one or more CCA slots 720 (e.g., time slots) in which the transmitting devices contending for a particular channel of an unlicensed spectrum may perform their CCAs. When a transmitting device's CCA indicates the channel is available, but the device's CCA is completed before the end of the periodic gating interval 605-d-2, the device may transmit one or more signals to reserve the channel until the end of the periodic gating interval 605-d-2. The one or more signals may in some cases include CUPS or CUBS 730. CUBS 730 are described in detail later in this description, but may be used for both channel synchronization and channel reservation. That is, a device that performs a CCA for the channel after another device begins to transmit CUBS on the channel may detect the energy of the CUBS 730 and determine that the channel is currently unavailable.

Following a transmitting device's successful completion of a CCA for a channel and/or the transmission of CUBS 730 over a channel, the transmitting device may use the channel for up to a predetermined period of time (e.g., one gating interval or one LTE radio frame) to transmit a waveform (e.g., an LTE-based waveform 740).

When a channel of the unlicensed spectrum is reserved, for example, by a base station or eNB for a gating interval or LTE radio frame, the base station or eNB may in some cases reserve the channel for Time Domain Multiplexing (TDM) use. In these examples, the base station or eNB may transmit data in a number of D subframes (e.g., subframes SF0 through SF4) and then allow a UE with which it is communicating to perform a CCA 750 (e.g., an uplink CCA) in an S subframe (e.g., subframe SF5). When the CCA 750 is successful, the UE may transmit data to the base station or eNB in a number of U subframes (e.g., subframes SF6 through SF8).

When a gating interval defines an application of the LBT protocol specified in ETSI (EN 301 893), the gating interval may take the form of an LBT Fixed Based Equipment (LBT-FBE) gating interval or an LBT Load Based Equipment (LBT-LBE) gating interval. An LBT-FBE gating interval may have a fixed/periodic timing and may not be directly influenced by traffic demand (e.g., its timing can be changed through reconfiguration). In contrast, an LBT-LBE gating interval may not have a fixed timing (i.e., be asynchronous) and may be largely influenced by traffic demand. FIGS. 6A, 6B, 6C, 6D, and 7 each illustrate an example of a periodic gating interval 605, which periodic gating interval 605 may be an LBT-FBE gating interval. A potential advantage of the periodic gating interval 605 described with reference to FIG. 6A is that it may preserve the ten millisecond LTE radio frame structure defined in the current LTE specification. However, when the duration of a gating interval is less than the duration of an LTE radio frame (e.g., as descried with reference to FIG. 6B or 6D), the advantages of preserving the LTE radio frame structure no longer exist and an LBT-LBE gating interval may be advantageous. A potential advantage of using an LBT-LBE gating interval is that it may retain the subframe structure of LTE PHY channels, without any symbol puncturing at the beginning or end of the gating interval. However, a potential disadvantage of using an LBT-LBE gating interval is not being able to synchronize the use of a gating interval between the different eNBs of an LTE-U operator (e.g., because each eNB uses a random back-off time for an extended CCA).

Figure 8:
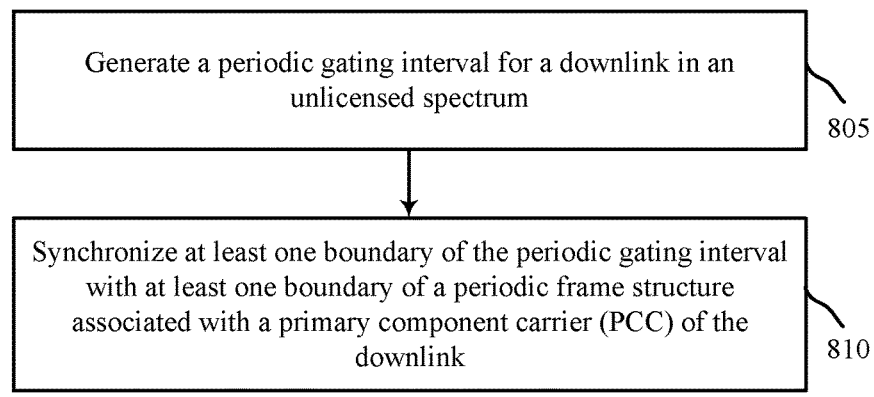
FIG. 8 is a flowchart of an example of a method for synchronizing a periodic gating structure with a periodic frame structure according to various embodiments.

FIG. 8 is a flow chart illustrating an example of a method 800 for wireless communications. For clarity, the method 800 is described below with reference to one of the eNBs 105 or UEs 115 shown in FIGS. 1, 2A, and/or 2B. In one implementation, one of the eNBs 105 or UEs 115 may execute one or more sets of codes to control the functional elements of the eNB 105 or UE 115 to perform the functions described below.

At block 805, a periodic gating interval for a downlink in an unlicensed spectrum may be generated.

At block 810, at least one boundary of the periodic gating interval may be synchronized with at least one boundary of a periodic frame structure associated with a PCC of the downlink. In some embodiments, the PCC may include a carrier in a licensed spectrum.

In some embodiments, the periodic gating interval may include an LBT frame and/or the periodic frame structure may include an LTE radio frame.

In some embodiments, the duration of the periodic gating interval may be an integer multiple of the duration of the periodic frame structure. Examples of such an embodiment are described, supra, with reference to FIGS. 6A and 6C. In other embodiments, the duration of the periodic gating interval may be a sub-multiple of the duration of the periodic frame structure. Examples of such an embodiment are described, supra, with reference to FIGS. 6B and 6D.

Thus, the method 800 may provide for wireless communications. It should be noted that the method 800 is just one implementation and that the operations of the method 800 may be rearranged or otherwise modified such that other implementations are possible.

FIGS. 9A, 9B, 9C, and 9D illustrate examples 900, 900-a, 920, 950 of how a contention-based protocol such as LBT may be implemented within an S' subframe 725-a of a gating interval, such as an S' subframe of the ten millisecond gating interval 605-d-1 or 605-d-2 described with reference to FIG. 7A or 7B. The contention-based protocol may be used with, for example, the base stations 105, 105-a, and 105-b of FIG. 1, FIG. 2A, and FIG. 2B, respectively. The contention-based protocol may be used with the system 100 of FIG. 1 and with portions of the system 200 and/or 200-a shown in FIG. 2A and FIG. 2B.

Figure 9A:
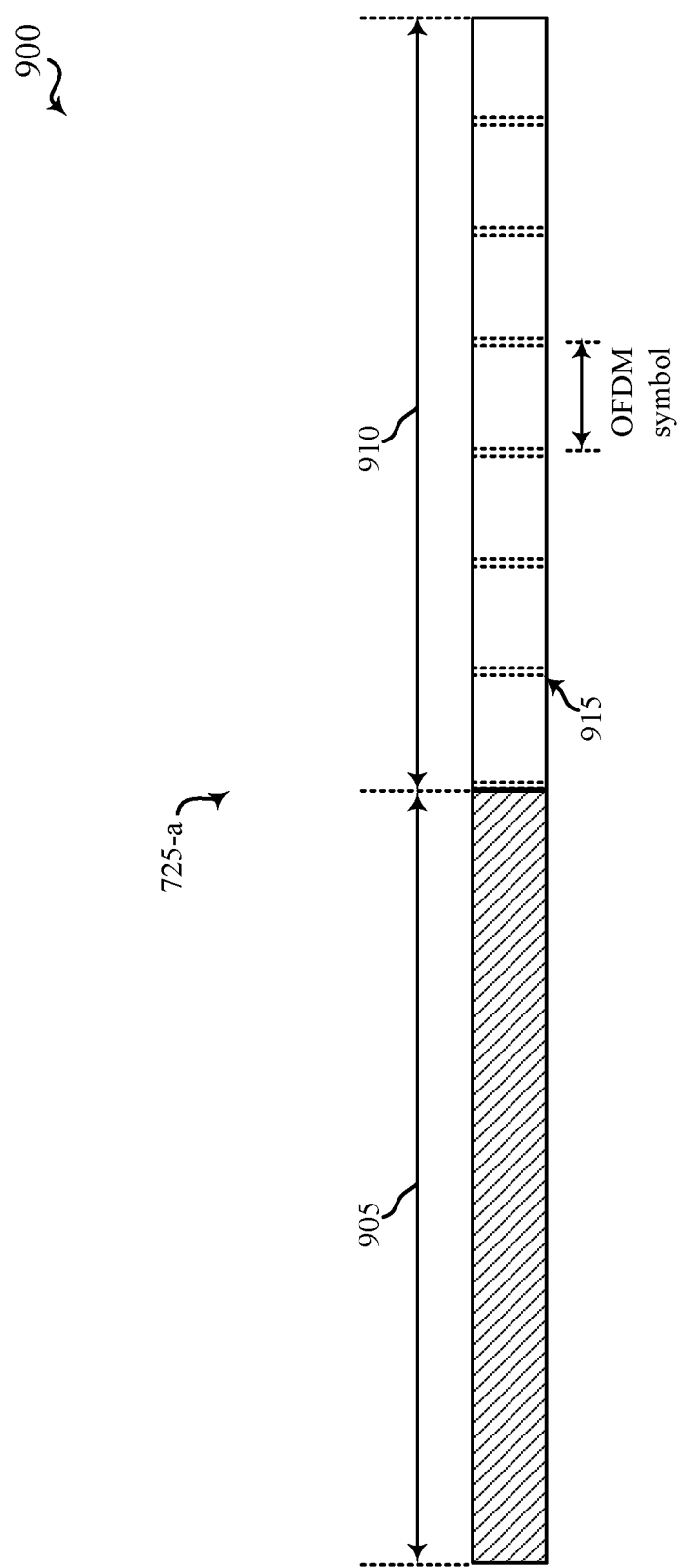
FIG. 9A shows a diagram that illustrates an example of an S' subframe in a periodic gating structure according to various embodiments.
Figure 9B:
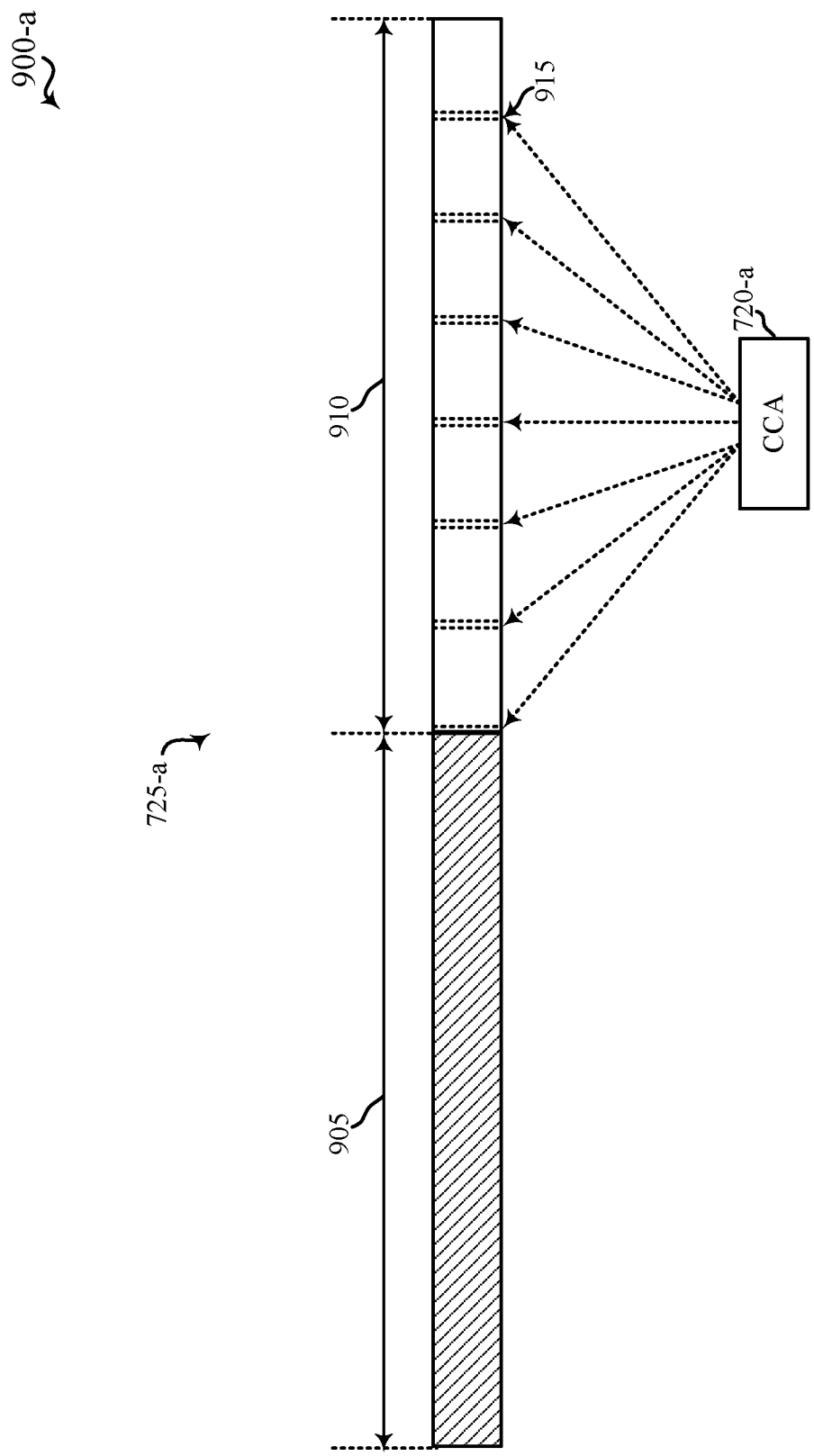
FIG. 9B shows a diagram that illustrates an example of placement options for clear channel assessment (CCA) slots in an S' subframe according to various embodiments.

Referring now to FIGS. 9A and 9B, there is shown an example 900/900-a of an S' subframe 725-a-1 having a guard period 905 and a CCA period 910. By way of example, each of the guard period 905 and the CCA period 910 may have a duration of 0.5 milliseconds and include seven OFDM symbol positions 915. As shown in FIG. 9B, each of the OFDM symbol positions 915 in the CCA period 910 may be transformed into a CCA slot 720-*a* upon an eNB selecting the OFDM symbol position 915 for performing CCA. In some cases, the same or different ones of the OFDM symbol positions 915 may be pseudo-randomly selected by ones of multiple eNBs, thereby providing a sort of CCA time dithering. The eNBs may be operated by a single LTE-U operator or different LTE-U operators. An OFDM symbol position 915 may be pseudo-randomly selected in that an eNB may be configured to select different ones of the OFDM symbol positions at different times, thereby giving each of the multiple eNBs an opportunity to select the OFDM symbol position 915 that occurs earliest in time. This may be advantageous in that the first eNB to perform a successful CCA has an opportunity to reserve a corresponding channel or channels of an unlicensed spectrum, and an eNB's pseudo-random selection of an OFDM symbol position 915 for performing CCA ensures that it has the same chance of performing a successful CCA as every other eNB. In the case of eNBs operated by a single LTE-U operator, the eNBs may in some cases be configured to select the same CCA slot 720-*a*.

Figure 9C:
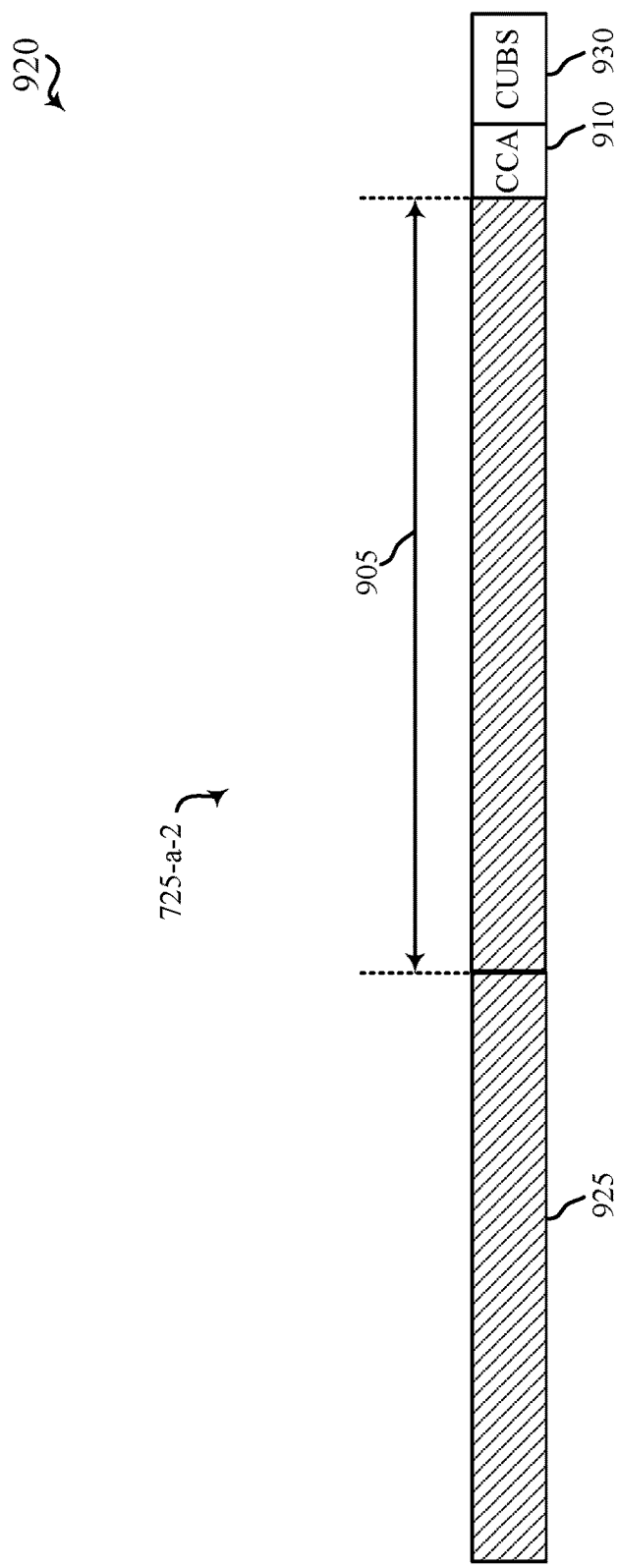
FIG. 9C shows a diagram that illustrates another example of an S' subframe in a periodic gating structure according to various embodiments.

FIG. 9C shows an example 920 of an S' subframe 725-*a*-2 having a guard period 905 and a CCA period 910. By way of example, each the guard period 905 may have a duration of 0.5 milliseconds and include seven OFDM symbol positions. The CCA period 910 may include one OFDM symbol position or a fraction of one OFDM symbol position, which may include one or more CCA slots, each having a duration less than or equal to an OFDM symbol position. The CCA period 910 may be followed by a CUBS period 930. The guard period 905 may be preceded by a shortened D subframe 925. In some examples, all of the wireless nodes (e.g., all base stations or eNBs) associated with an operator or public land mobile network (PLMN) may perform a CCA at the same time during the CCA period 910. The S' subframe 725-*a*-2 shoen in FIG. 9C may be useful in scenarios where an operator operates asynchronously with respect to other operators with which it competes for access to an unlicensed spectrum.

Figure 9D:
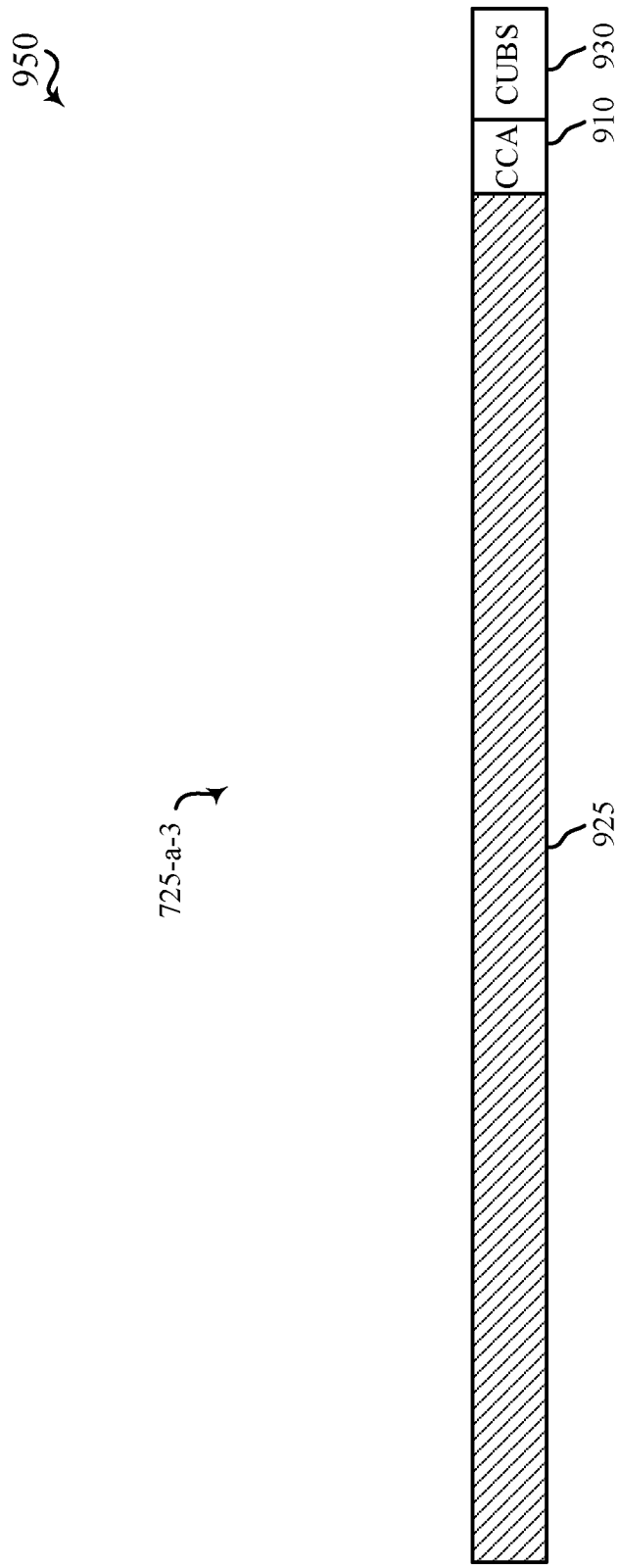
FIG. 9D shows a diagram that illustrates another example of an S' subframe in a periodic gating structure according to various embodiments.

FIG. 9D shows an example 950 of an S' subframe 725-*a*-3 having a shortened D subframe 925, a CCA period 910, and a CUBS period 930. The CCA period 910 may include one OFDM symbol position or a fraction of one OFDM symbol position, which may include one or more CCA slots, each having a duration less than or equal to an OFDM symbol position. The CCA period 910 may be followed by a CUBS period 930. In some examples, all of the wireless nodes (e.g., all base stations or eNBs) associated with an operator or public land mobile network (PLMN) may perform a CCA at the same time during the CCA period 910. The S' subframe 725-*a*-3 shown in FIG. 9D may be useful in scenarios where an operator operates asynchronously with respect to other operators with which it competes for access to an unlicensed spectrum, and where the S' subframe 725-*a*-3 is used in a TDM context, such as with the gating interval 605-*d*-2. When used in a TDM context, a silent period may provided in an S subframe of a frame of which the S' subframe 725-*a*-3 forms a part.

FIGS. 10A and 10B provide examples of how an S' subframe such as the S' subframe 725-*a* described with reference to FIG. 9A and/or 9B may be used in conjunction with a current gating interval 605. By way of example, the current gating intervals 605-*e*, 605-*g* shown in FIGS. 10A and 10B may be examples of the ten millisecond gating interval 605-*d* described with reference to FIG. 7. The use of S' subframes in conjunction with a current gating interval may be handled by, for example, the base stations 105, 105-*a*, and 105-*b* of FIG. 1, FIG. 2A, and FIG. 2B, respectively. The use of S' subframes in conjunction with a current gating interval may be handled may be the system 100 of FIG. 1 and with portions of the system 200 and/or 200-*a* shown in FIG. 2A and/or FIG. 2B.

FIG. 10A provides an example 1000 in which an S' subframe is included as a last subframe of the current gating interval 605-*e*. Thus, the guard period 905-*a* and the CCA period 910-*a* of the S' subframe occur at the end of the current gating interval 605-*e*, just prior to a trailing boundary of the current gating interval 605-*e* and the start of a next transmission interval 605-*f*. The next transmission interval 605-*f* may be gated ON or gated OFF for a downlink transmission of each of a number of transmitting devices, depending on whether a CCA performed by the transmitting device indicates that unlicensed spectrum is available or unavailable during the next transmission interval 605-*f*. In some cases, the next transmission interval 605-*f* may also be a next gating interval.

FIG. 10B provides an example 1000-*a* in which an S' subframe is included as a first subframe of the current gating interval 605-*g*. Thus, the guard period 905-*b* and the CCA period 910-*b* of the S' subframe occur at the start of the current gating interval 605-*g*, just after a leading boundary of the current gating interval 605-*g*. The next transmission interval 605-*h* may be gated ON or gated OFF for a downlink transmission of each of a number of transmitting devices, depending on whether a CCA performed by the transmitting device indicates that unlicensed spectrum is available or unavailable during the next transmission interval 605-*f*. In some cases, the next transmission interval 605-*h* may also be a next gating interval.

Figure 10C:
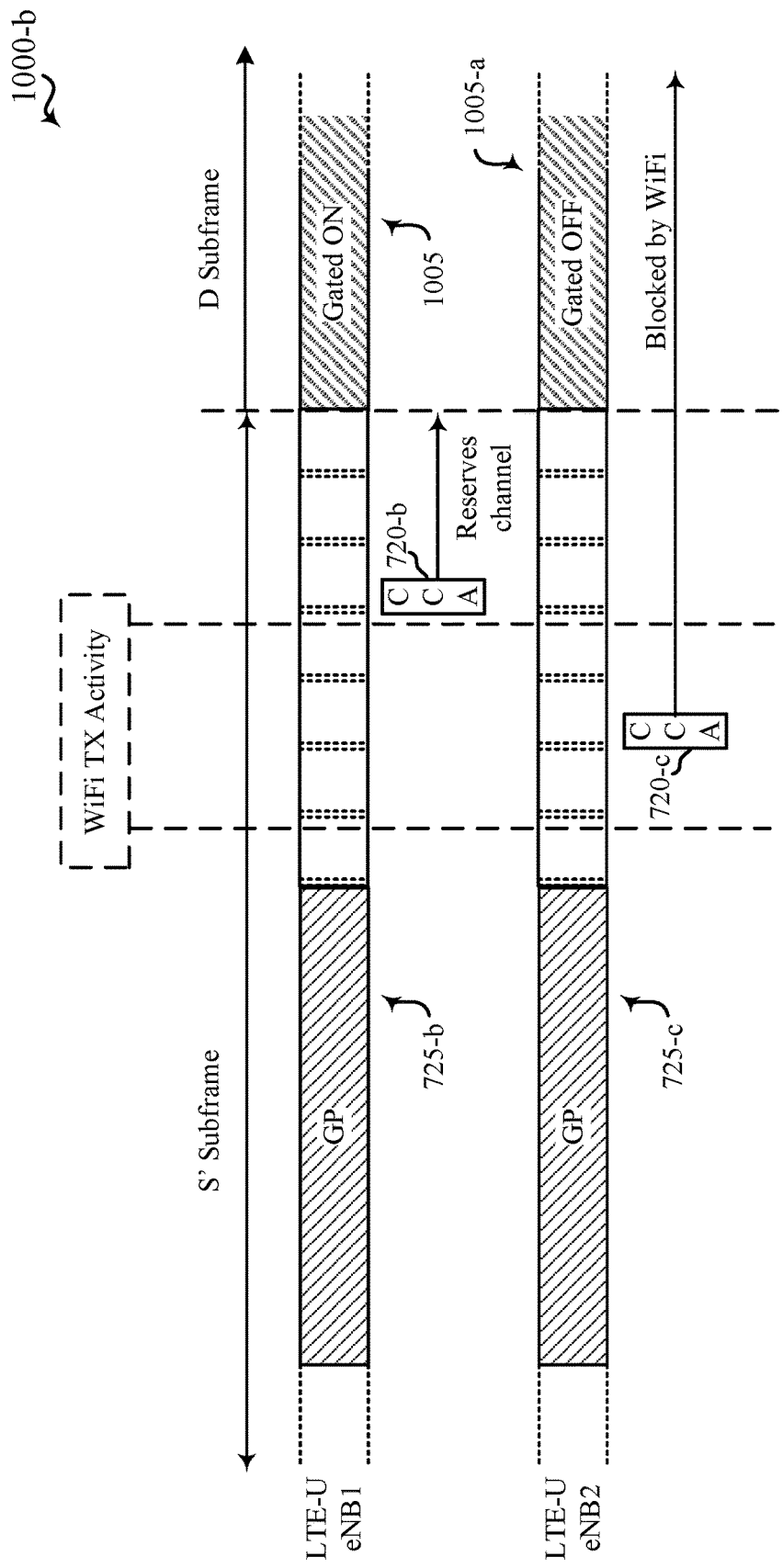
FIG. 10C shows a diagram that illustrates an example of gating in response to WiFi transmission activity according to various embodiments.

FIG. 10C provides an example 1000-*b* of how the performance of CCAs for an unlicensed spectrum (or a channel of the unlicensed spectrum) may be synchronized across multiple eNBs 105. By way of example, the multiple eNBs 105 may include an LTE-U eNB1 and an LTE-U eNB2. The performance of CCAs may be provided by, for example, the base stations 105, 105-*a*, and 105-*b* of FIG. 1, FIG. 2A, and FIG. 2B, respectively. The performance of CCAs may used in the system 100 of FIG. 1 and with portions of the system 200 and/or 200-*a* shown in FIG. 2A and/or FIG. 2B.

Because of synchronization between the eNB1 and the eNB2, an S' subframe 725-*b* within a current gating interval of the eNB1 may be synchronized with an S' subframe 725-*c* within a current gating interval of the eNB2. Also, and because of a synchronized pseudo-random CCA slot selection processes implemented by each eNB, the eNB2 may select a CCA slot 720-*c* that occurs at a different time (e.g., different OFDM symbol position) than the CCA slot 720-*b* selected by eNB1. For example, the eNB1 may select a CCA slot 720-*b* aligned with the fifth OFDM symbol position of the aligned CCA periods of the S' subframes 725-*b* and 725-*c*, and the eNB2 may select a CCA slot 720-*c* aligned with the third OFDM symbol position of the aligned CCA periods.

A next transmission interval following the synchronized S' subframes 725-*b* and 725-*c* may begin after the CCA periods of the S' subframes 725-*b* and 725-*c* and start with a D subframe, as shown. Because the CCA slot 720-*c* of the eNB2 is scheduled first in time, the eNB2 has a chance to reserve the next transmission interval before the eNB1 has a chance to reserve the next transmission interval. However, because of the pseudo-random CCA slot selection process implemented by each of eNB1 and eNB2, the eNB1 may be provided the first chance to reserve a later transmission interval (e.g., because its CCA slot may occur at an earlier time than the CCA slot of the eNB2 in a later gating interval).

By way of example, FIG. 10C shows there is WiFi transmission (Tx) activity that coincides with a portion of the aligned CCA periods of the S' subframes 725-b and 725-c. Because of the timing of the CCA slot 720-c selected by the eNB2, the eNB2 may determine as a result of performing its CCA that the unlicensed spectrum is unavailable, and may gate OFF a downlink transmission 1005-a in the unlicensed spectrum for the next transmission interval. A downlink transmission of the eNB2 may therefore be blocked as a result of the WiFi Tx activity occurring during performance of the eNB2's CCA.

During the CCA slot 720-b, the eNB1 may perform its CCA. Because of the timing of the CCA slot 720-b selected by the eNB1, the eNB1 may determine as a result of performing its CCA that the unlicensed spectrum is available (e.g., because the WiFi Tx activity does not occur during the CCA slot 720-b, and because the eNB2 was not able to reserve the next transmission interval at an earlier time). The eNB1 may therefore reserve the next transmission interval and gate ON a downlink transmission 1005 in the unlicensed spectrum for the next transmission interval. Methods for reserving the unlicensed spectrum (or a channel of the unlicensed spectrum) are described in detail later in this description.

FIGS. 9A, 9B, 10A, 10B, and 10C provide examples of how a CCA slot 720 may be selected in the context of a ten millisecond gating interval, such as the gating interval 605-d described with reference to FIG. 7. In contrast, FIGS. 10D, 10E, 10F, and 10G provide examples of how a CCA slot 720 may be selected in the context of a one or two millisecond gating interval. A gating interval of ten milliseconds may provide advantages such as a low gating interval overhead in the presence of low WiFi activity, and an ability to retain the subframe-based PHY channel design of existing LTE channels. However, it may have the disadvantage of a long channel idle time (e.g., 0.5+ milliseconds, depending on CCA delay induced by CCA dithering), which may provide a WiFi node with short contention window a transmit opportunity (e.g., a transmit opportunity during the guard period 905 described with reference to FIGS. 9A and 9B). It may also have the disadvantage of delaying a downlink transmission at least ten milliseconds when a CCA is not successful. A gating interval of, for example, one or two milliseconds may lead to a higher gating interval overhead, and may require more extensive changes to the LTE PHY channel design to support sub-millisecond transmit durations. However, a gating interval of perhaps one or two milliseconds may mitigate or eliminate the afore-mentioned disadvantages associated with a ten millisecond gating interval.

Figure 10D:
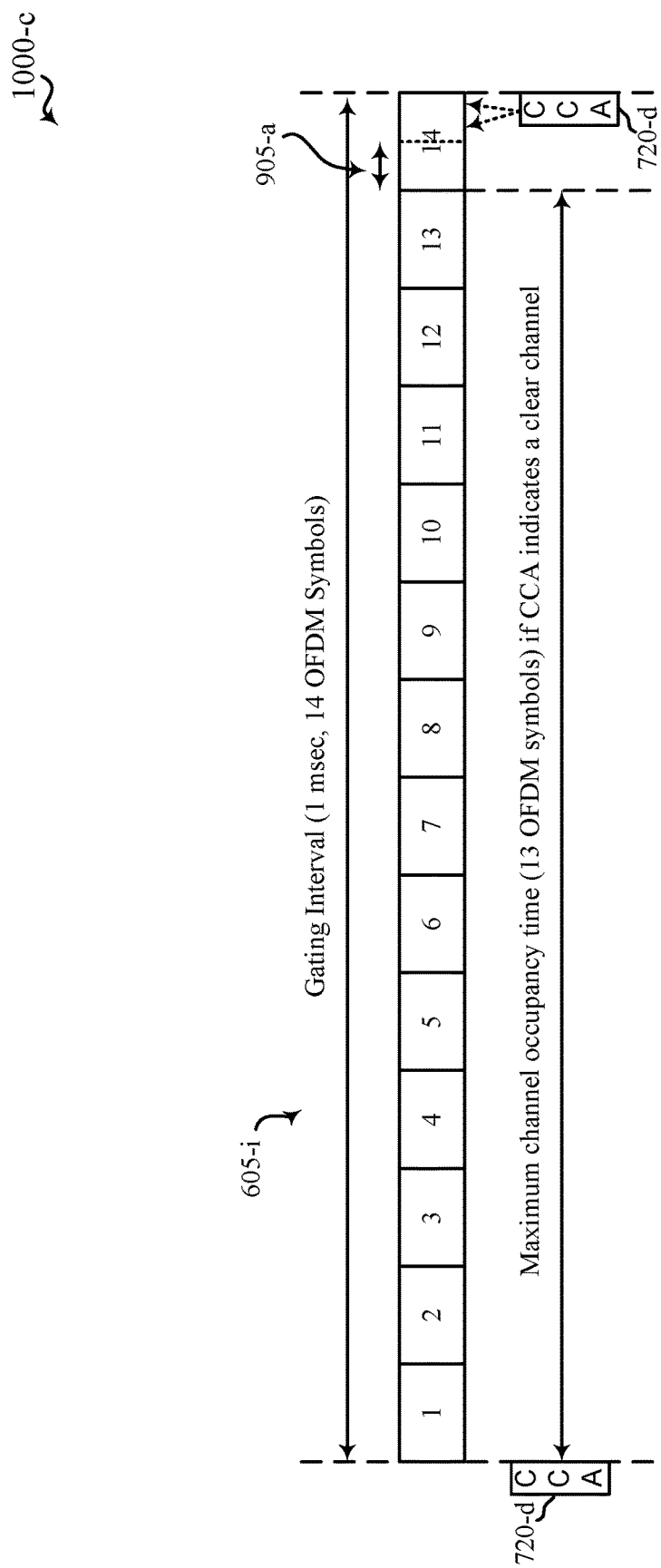
FIG. 10D shows a diagram that illustrates an example of a periodic gating structure waveform with 14 Orthogonal Frequency-Division Multiplexing (OFDM) symbols according to various embodiments.

FIG. 10D provides an example 1000-c of a one millisecond gating interval 605-i. A one millisecond gating interval may be used by the base stations 105, 105-a, and 105-b of FIG. 1, FIG. 2A, and FIG. 2B, respectively. The one millisecond gating interval may used in the system 100 of FIG. 1 and with portions of the system 200 and/or 200-a shown in FIG. 2A and/or FIG. 2B.

The current LTE specification requires a channel occupancy time (ON time) one millisecond, and a channel idle time≥five percent of the channel occupancy time. Thus, the current LTE specification dictates a minimum gating interval duration of 1.05 milliseconds. However, if the LTE specification could be relaxed to require a minimum channel occupancy time of perhaps 0.95 milliseconds, then a one millisecond gating interval would be possible.

As shown in FIG. 10D, a gating interval 605-i of one millisecond may include 14 OFDM symbols (or symbol positions). When a successful CCA is performed during a CCA slot 720-d preceding the gating interval 605-i, a downlink transmission may occur during the first 13 OFDM symbols of the gating interval 605-i. Such a downlink transmission may have a duration (or channel occupancy time) of 929 microseconds. In accord with the current LTE standard, a channel occupancy time of 929 microseconds would require a channel idle time 905-a of 48 microseconds, which is less than the 71.4 microsecond duration of one OFDM symbol. As a result, the channel idle time 905-a of 48 microseconds, as well as one or more CCA slots 720-d, may be provided during the 14$^{th}$ OFDM symbol position. In some cases, two CCA slots 720-d having a total duration of 20 microseconds may be provided during the 14$^{th}$ OFDM symbol position, thereby enabling some amount of CCA randomization (dithering). Of note, each CCA slot 720-d in the example 1000-c has a duration of less than one OFDM symbol.

Figure 10E:
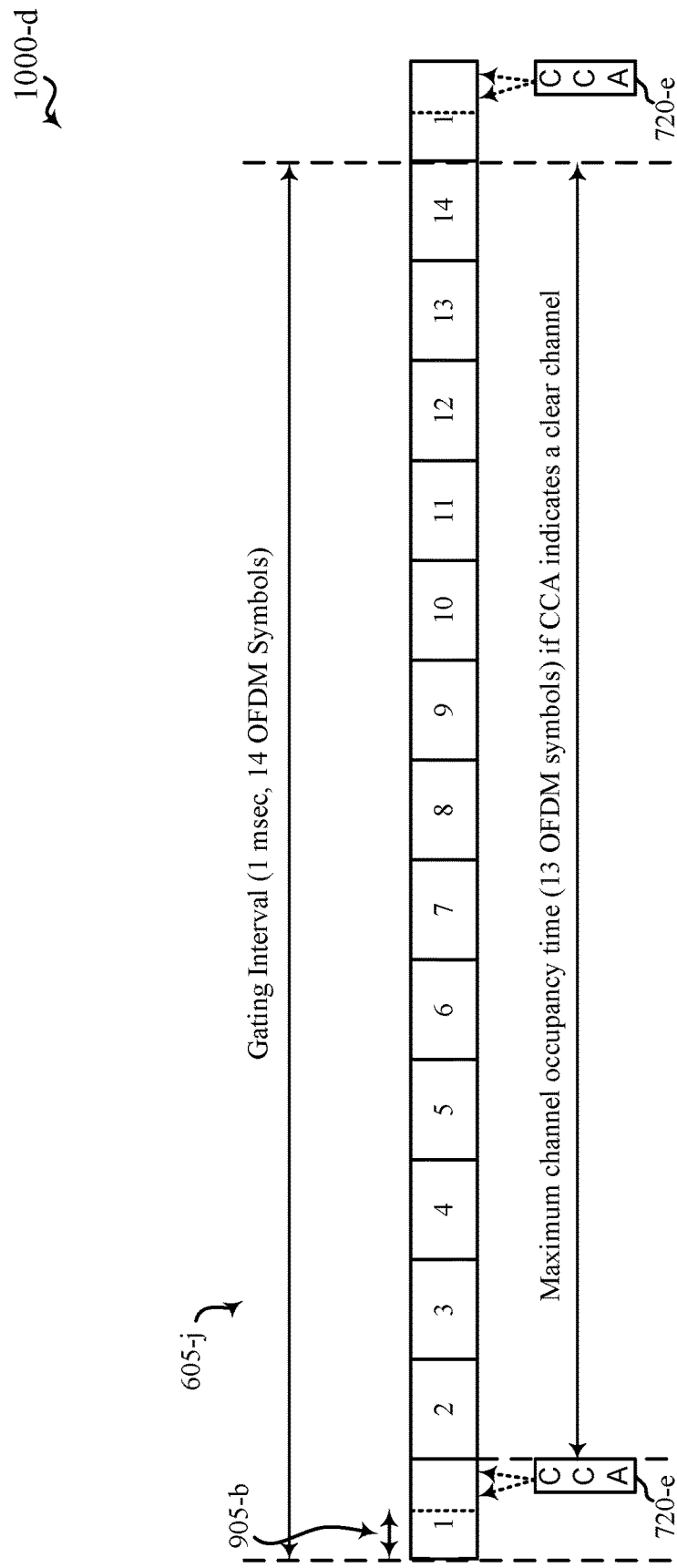
FIG. 10E shows a diagram that illustrates another example of a periodic gating structure waveform with 14 OFDM symbols according to various embodiments.

Because the CCA slots 720-d are positioned at the end of the one millisecond gating interval 605-i or subframe shown in FIG. 10D, the gating interval 605-i is common reference signal (CRS) friendly. An example 1000-d of a one millisecond gating interval 605-j that is UE-specific reference signal (UERS) friendly is shown in FIG. 10E. Similar to the gating interval 605-i, the gating interval 605-j includes 14 OFDM symbols. However, the channel idle time 905-b and CCA slots 720-e are provided in the first OFDM symbol position. A successful CCA performed during a CCA slot 720-e of the current gating interval 605-j thereby enables the unlicensed spectrum to be reserved, and enables a downlink transmission to be made, in the current gating interval. The next transmission interval is therefore included within the current gating interval.

Figure 10F:
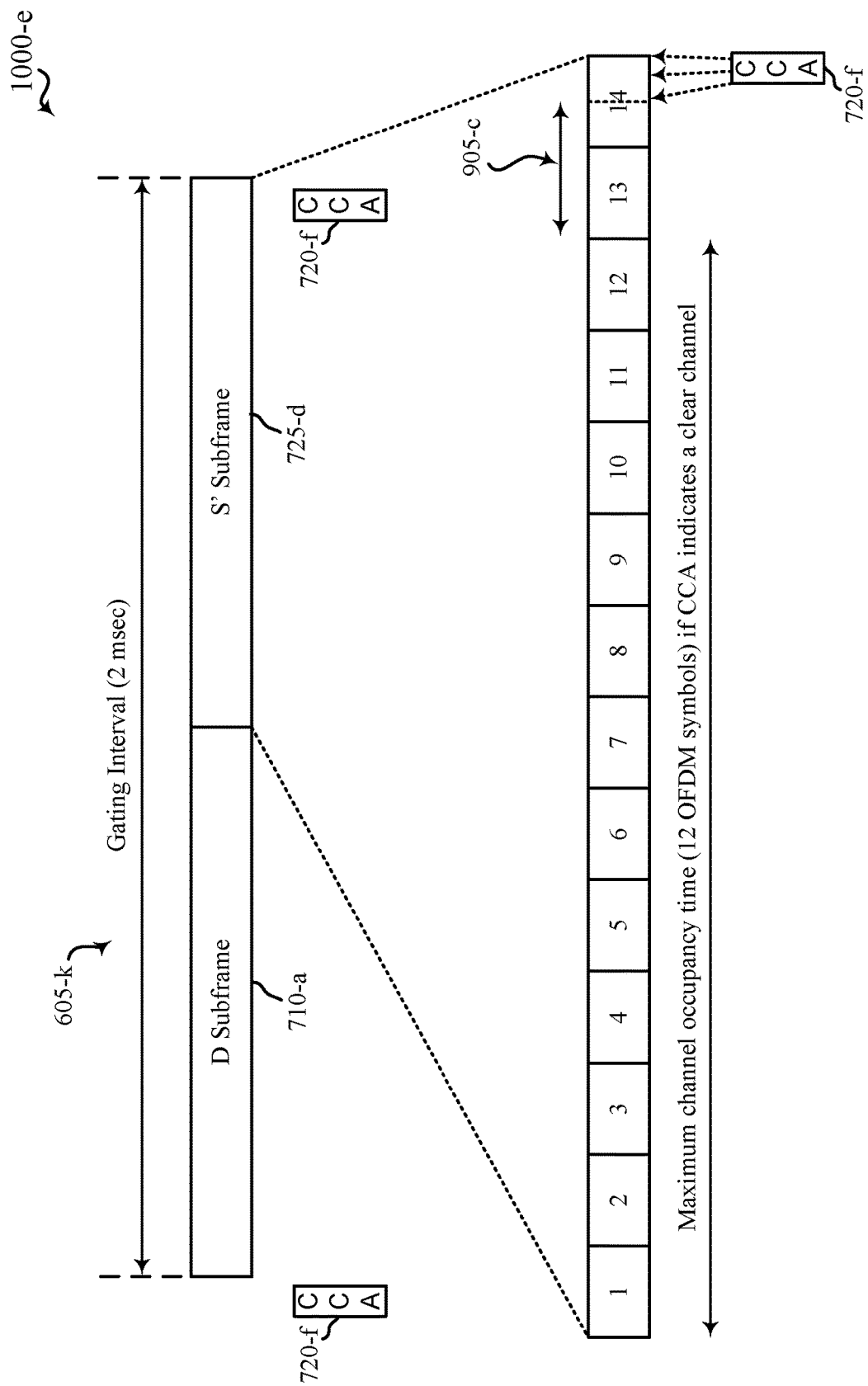
FIG. 10F shows a diagram that illustrates an example of a periodic gating structure waveform with two subframes according to various embodiments.

FIG. 10F provides an example 1000-e of a two millisecond gating interval 605-k. A two millisecond gating interval may be used by the base stations 105, 105-a, and 105-b of FIG. 1, FIG. 2A, and FIG. 2B, respectively. The two millisecond gating interval may used in the system 100 of FIG. 1 and with portions of the system 200 and/or 200-a shown in FIG. 2A and/or FIG. 2B.

In contrast to the one millisecond gating intervals 605-i and 605-j, the two millisecond gating interval 605-k complies with the current LTE specification requirements for maximum channel occupancy time and minimum channel idle time.

As shown, the gating interval 605-k may include a D subframe 710-a and an S' subframe 725-d. However, the S' subframe is configured somewhat differently than previously described S' subframes. More particularly, the first 12 OFDM symbol positions of the S' subframe, as well as the 14 OFDM symbol positions of the preceding D subframe, may be used for a downlink transmission upon performing a successful CCA during a CCA slot 720-f preceding the gating interval 605-k. The channel occupancy time may therefore be 1.857 milliseconds, requiring a channel idle time 905-c of 96 microseconds. The channel idle time 905-c may therefore occupy the 13$^{th}$ OFDM symbol position of the S' subframe and part of the 14$^{th}$ OFDM symbol position of the S' subframe. However, the remaining duration of the 14$^{th}$ OFDM symbol position may be filled, at least in part, by a number of CCA slots 720-f. In some cases, the number of CCA slots 720-f may be three CCA slots 720-f, which provides a slightly greater amount of CCA randomization (dithering) than the one millisecond gating intervals described with reference to FIGS. 10D and 10E.

Figure 10G:
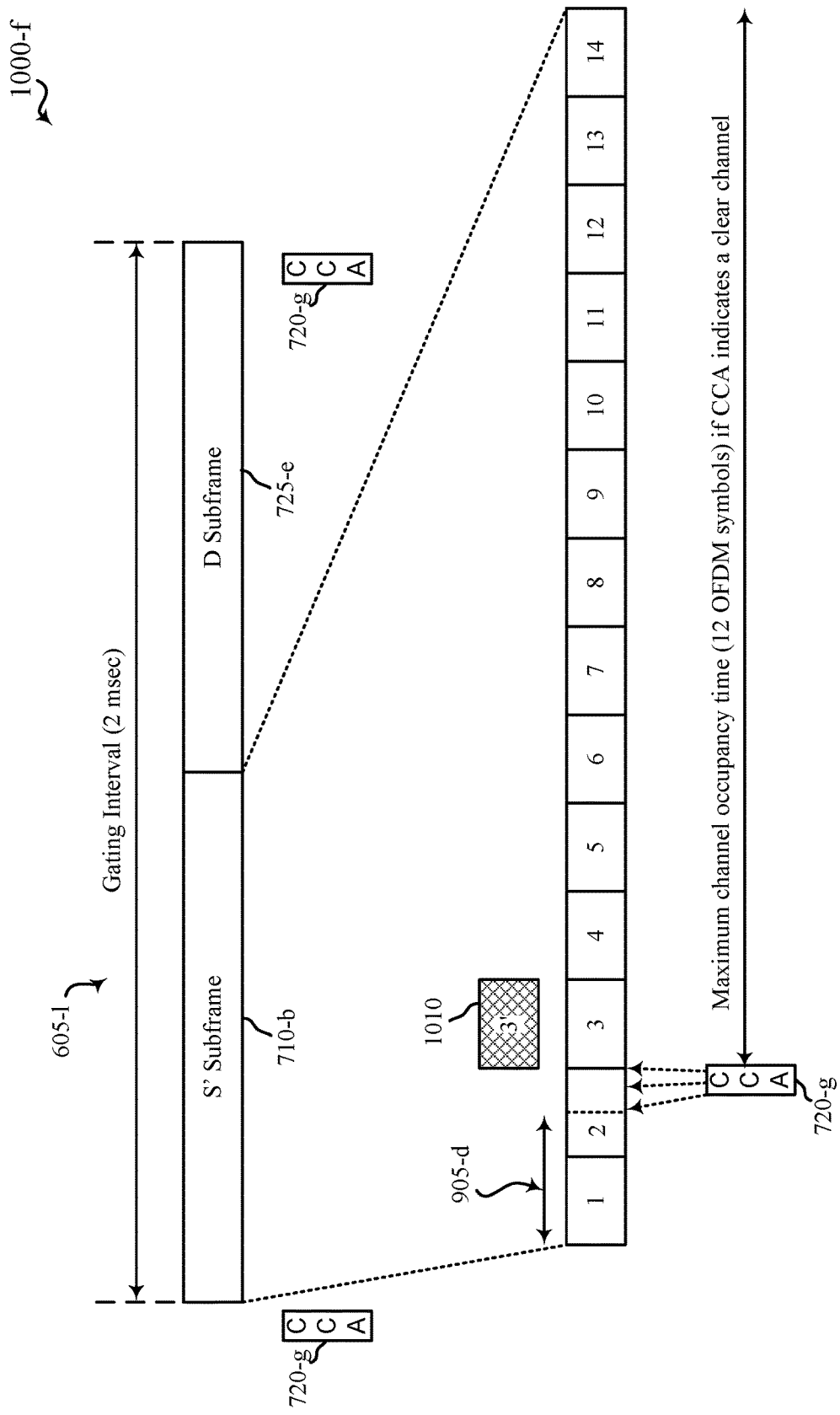
FIG. 10G shows a diagram that illustrates another example of a periodic gating structure waveform with two subframes according to various embodiments.

Because the CCA slots 720-*f* are positioned at the end of the two millisecond gating interval 605-*k* shown in FIG. 10F, the gating interval 605-*k* is CRS friendly. An example 1000-*f* of a two millisecond gating interval 605-1 that is UERS friendly is shown in FIG. 10G. Similar to the gating interval 605-*k*, the gating interval 605-1 includes a D subframe 725-*e* and an S' subframe 710-*b*. However, the temporal order of the subframes is reversed, with the S' subframe 710-*b* occurring first in time and the D subframe 725-*e* occurring later in time. Furthermore, the channel idle time 905-*d* and CCA slots 720-*g* are provided in the first OFDM symbol position of the S' subframe 710-*b*. A successful CCA performed during a CCA slot 720-*g* of the current gating interval 605-1 thereby enables the unlicensed spectrum to be reserved, and enables a downlink transmission to be made, in the current gating interval. The next transmission interval is therefore included within the current gating interval.

Figure 11:
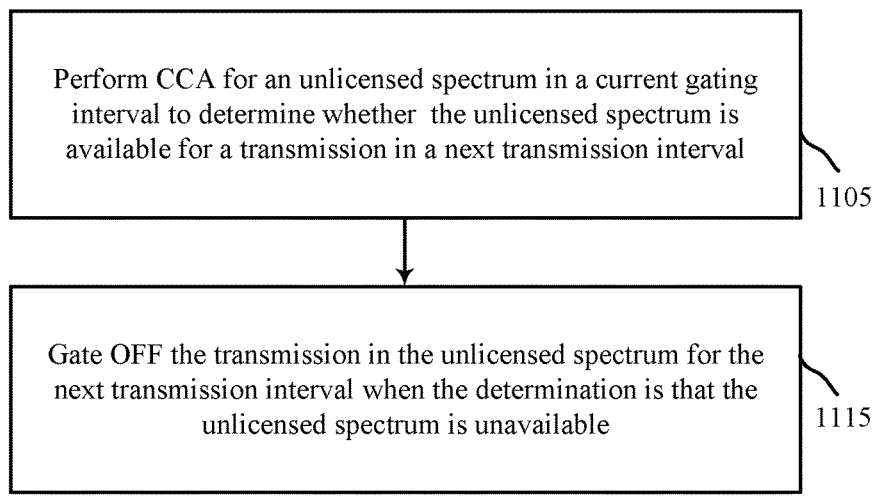
FIG. 11 is a flowchart of an example of a method for gating a periodic structure according to various embodiments.

FIG. 11 is a flow chart illustrating an example of a method 1100 for wireless communications. For clarity, the method 1100 is described below with reference to one of the eNBs 105 shown in FIGS. 1, 2A, and/or 2B. In one implementation, one of the eNBs 105 may execute one or more sets of codes to control the functional elements of the eNB 105 to perform the functions described below.

At block 1105, a CCA is performed for another unlicensed spectrum in a current gating interval to determine whether the unlicensed spectrum is available for a downlink transmission in a next transmission interval. Performing the CCA for the unlicensed spectrum may in some cases involve performing the CCA for one or more channels of the unlicensed spectrum. In some cases, the next transmission interval may be a next gating interval. In other cases, the next transmission interval may be included within the current gating interval. In still other cases, such as cases in which an asynchronous LBT-LBE gating interval is used, the next transmission interval may follow the current gating interval but not be part of a next gating interval.

At block 1110, and when a determination is made that the unlicensed spectrum is unavailable, a downlink transmission in the unlicensed spectrum may be gated OFF for the next transmission interval. Otherwise, when a determination is made that the unlicensed spectrum is available, a downlink transmission in the unlicensed spectrum may be gated ON for the next transmission interval.

In some embodiments of the method 1100, the CCA may be performed during a first subframe or first or second OFDM symbol position of the current gating interval. In other embodiments of the method 1100, the CCA may be performed during a last subframe or last OFDM symbol position of the current gating interval.

In some embodiments of the method 1100, performance of the CCA may be synchronized across multiple eNBs, including multiple eNBs operated by a single LTE-U operator or by different LTE-U operators.

Thus, the method 1100 may provide for wireless communications. It should be noted that the method 1100 is just one implementation and that the operations of the method 1100 may be rearranged or otherwise modified such that other implementations are possible.

Figure 12A:
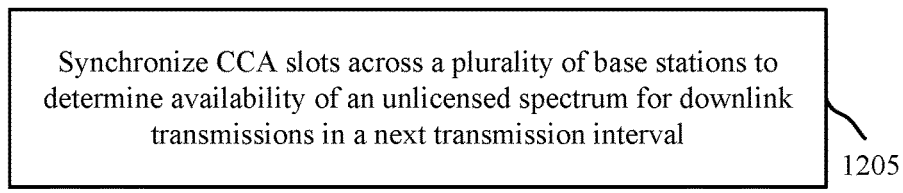
FIG. 12A is a flowchart of an example of a method for synchronizing CAA slots across multiple base stations according to various embodiments.

FIG. 12A is a flow chart illustrating yet another example of a method 1200 for wireless communications. For clarity, the method 1200 is described below with reference to one of the eNBs 105 shown in FIGS. 1, 2A, and/or 2B. In one implementation, one of the eNBs 105 may execute one or more sets of codes to control the functional elements of the eNB 105 to perform the functions described below.

At block 1205, CCA slots may be synchronized across multiple base stations (e.g., LTE-U eNBs 105) to determine an availability of an unlicensed spectrum (or at least one channel of the unlicensed spectrum) for downlink transmissions in a next transmission interval.

In some embodiments, the CCA slots may be located in a first subframe or a first or second OFDM symbol position of a current gating interval. In other embodiments, the CCA slots may be located in a last subframe or last OFDM symbol position of a current gating interval.

In some embodiments, such as embodiments in which a gating interval has a duration of ten milliseconds, the interval between commencement of adjacent CCA slots may be approximately the duration of an OFDM symbol. For purposes of this description, "approximately the duration of the OFDM symbol" includes equal to the duration of an OFDM symbol. An example in which the interval between commencement of adjacent CCA slots may be approximately the duration of an OFDM symbol is shown in FIG. 9B.

Thus, the method 1200 may provide for wireless communications. It should be noted that the method 1200 is just one implementation and that the operations of the method 1200 may be rearranged or otherwise modified such that other implementations are possible.

Figure 12B:
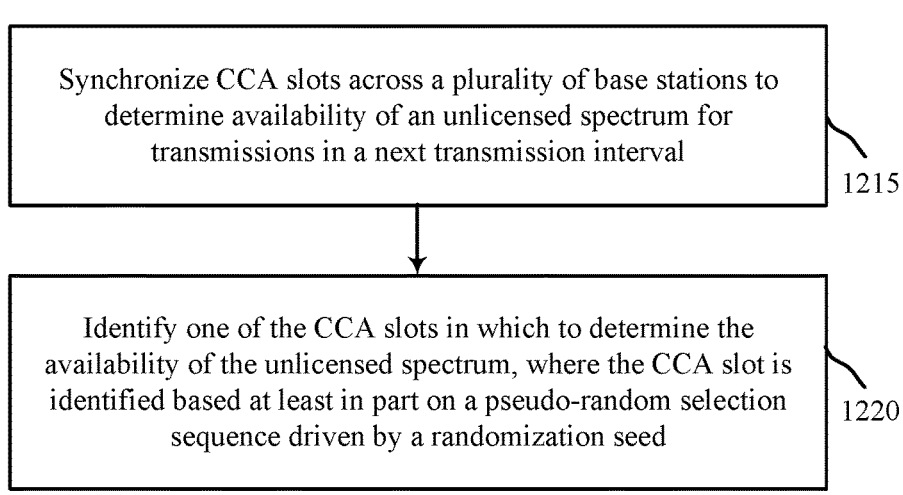
FIG. 12B is a flowchart of another example of a method for synchronizing CAA slots across multiple base stations according to various embodiments.

FIG. 12B is a flow chart illustrating another example of a method 1200-*a* for wireless communications. For clarity, the method 1200-*a* is described below with reference to one of the eNBs 105 shown in FIGS. 1, 2A, and/or 2B. In one implementation, one of the eNBs 105 may execute one or more sets of codes to control the functional elements of the eNB 105 to perform the functions described below.

At block 1215, CCA slots may be synchronized across multiple base stations (e.g., LTE-U eNBs 105) to determine an availability of an unlicensed spectrum (or at least one channel of the unlicensed spectrum) for downlink transmissions in a next transmission interval.

In some embodiments, the CCA slots may be located in a first subframe or a first or second OFDM symbol position of a current gating interval. In other embodiments, the CCA slots may be located in a last subframe or last OFDM symbol position of a current gating interval.

In some embodiments, such as embodiments in which a gating interval has a duration of ten milliseconds, the interval between commencement of adjacent CCA slots may be approximately the duration of an OFDM symbol. An example in which the interval between commencement of adjacent CCA slots may be approximately a duration of an OFDM symbol is shown in FIG. 9B.

At block 1220, one of the CCA slots is identified as a CCA slot in which to determine the availability of unlicensed spectrum. The one of the CCA slots may be identified based at least in part on a pseudo-random selection sequence driven by a randomization seed.

In some embodiments, at least a subset of the multiple base stations may use the same randomization seed for their pseudo-random sequence generation. The subset may be associated with a deployment of base stations by a single operator.

Thus, the method 1200-*a* may provide for wireless communications. It should be noted that the method 1200-*a* is just one implementation and that the operations of the method 1200-*a* may be rearranged or otherwise modified such that other implementations are possible.

Figure 13A:
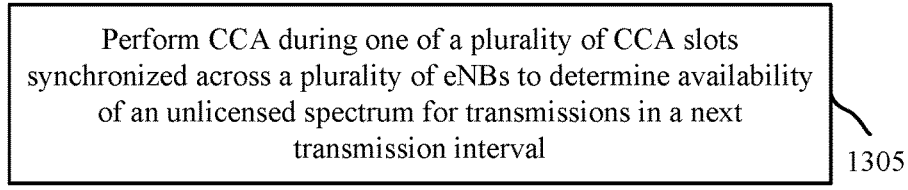
FIG. 13A is a flowchart of an example of a method for performing CAA when the CCA slots are synchronized across multiple base stations according to various embodiments.

FIG. 13A is a flow chart illustrating another example of a method 1300 for wireless communications. For clarity, the method 1300 is described below with reference to one of the eNBs 105 shown in FIGS. 1, 2A, and/or 2B. In one implementation, one of the eNBs 105 may execute one or more sets of codes to control the functional elements of the eNB 105 to perform the functions described below.

At block 1305, a CCA may be performed during one of multiple CCA slots synchronized across multiple eNBs 105 (e.g., LTE-U eNBs) to determine an availability of an unlicensed spectrum (or at least one channel of the unlicensed spectrum) for downlink transmissions in a next transmission interval.

In some embodiments, different eNBs may use different ones of the multiple CCA slots to perform CCA during a gating interval. In other embodiments, two or more eNBs may use the same CCA slot to perform CCA during a gating interval (e.g., when there exists coordination between a subset of eNBs, such as coordination between the eNBs deployed by a single operator).

Thus, the method 1300 may provide for wireless communications. It should be noted that the method 1300 is just one implementation and that the operations of the method 1300 may be rearranged or otherwise modified such that other implementations are possible.

Figure 13B:
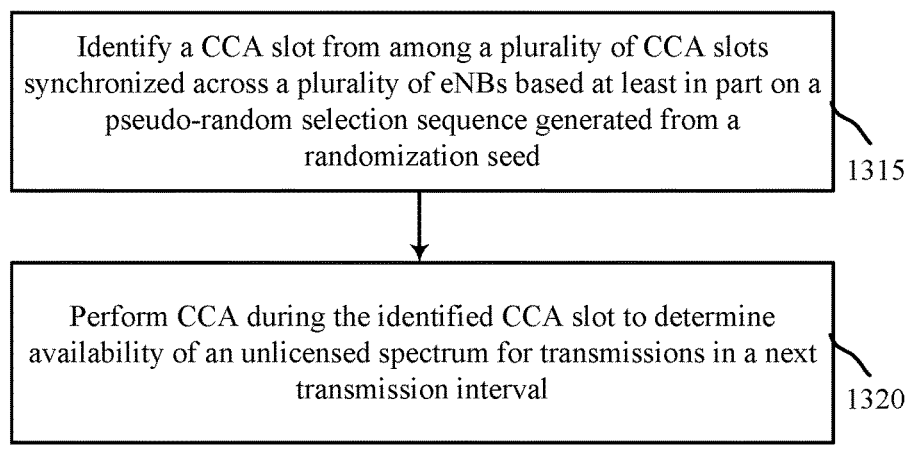
FIG. 13B is a flowchart of another example of a method for performing CAA when the CCA slots are synchronized across multiple base stations according to various embodiments.

FIG. 13B is a flow chart illustrating yet another example of a method 1300-a for wireless communications. For clarity, the method 1300-a is described below with reference to one of the eNBs 105 shown in FIGS. 1, 2A, and/or 2B. In one implementation, one of the eNBs 105 may execute one or more sets of codes to control the functional elements of the eNB 105 to perform the functions described below.

At block 1315, a CCA slot may be identified (e.g., by an eNB) from among multiple CCA slots synchronized across multiple eNBs 105 (e.g., LTE-U eNBs). The slot may be identified based at least in part on a pseudo-random selection sequence generated from a randomization seed. In alternate embodiment, the slot may be identified based at least in part on coordination information exchanged between at least a subset of the eNBs over a backhaul, such as the backhaul 132 or 134 described with reference to FIG. 1.

At block 1320, a CCA may be performed during the identified CCA slot to determine an availability of an unlicensed spectrum (or at least one channel of the unlicensed spectrum) for downlink transmissions in a next transmission interval.

In some embodiments, different eNBs may identify different ones of multiple CCA slots to perform CCA during a gating interval. In other embodiments, two or more eNBs may identify the same CCA slot to perform CCA during a gating interval.

Thus, the method 1300-a may provide for wireless communications. It should be noted that the method 1300-a is just one implementation and that the operations of the method 1300-a may be rearranged or otherwise modified such that other implementations are possible.

Figure 14A:
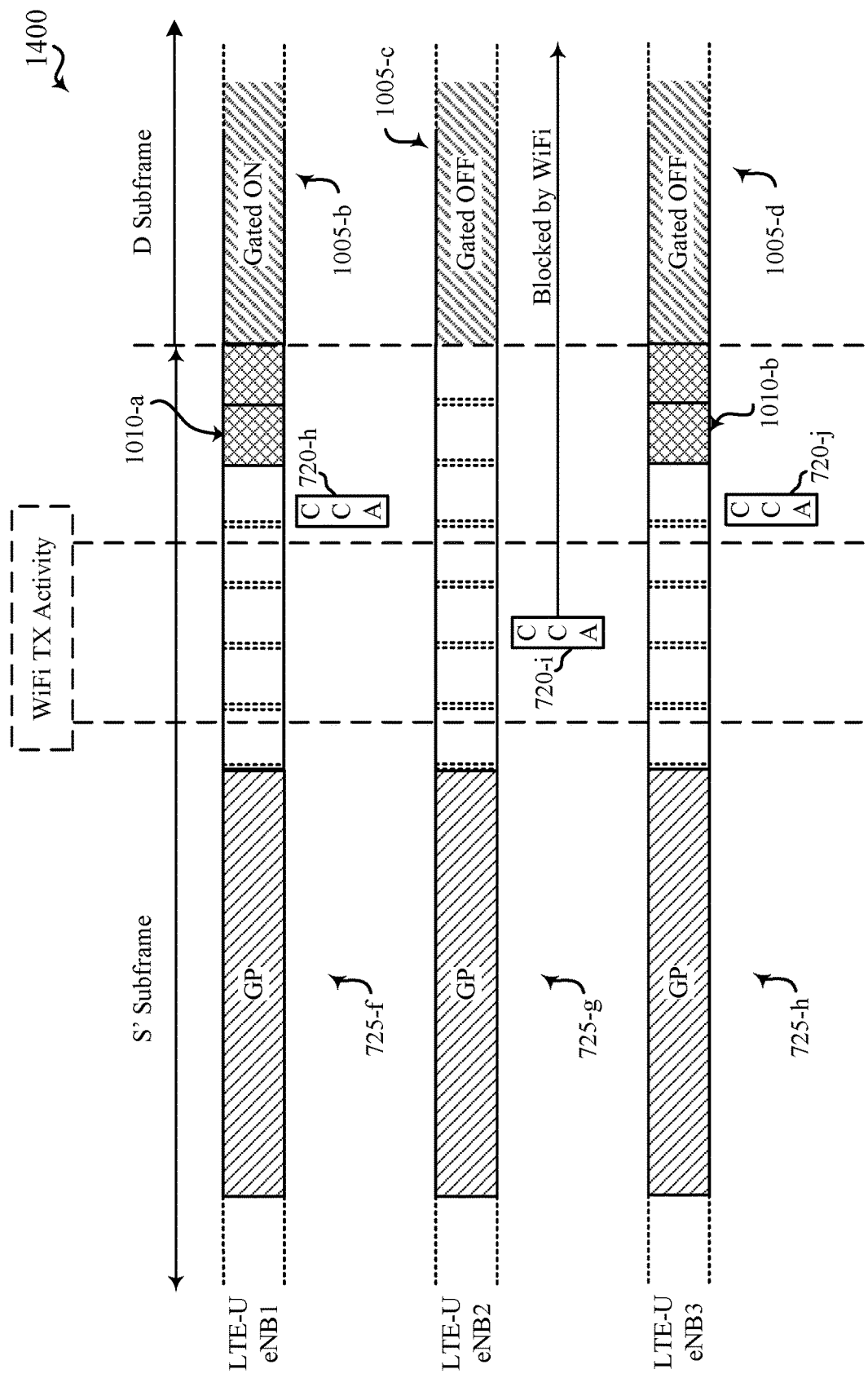
FIG. 14A shows a diagram that illustrates an example of the use of Channel Usage Beacon Signals (CUBS) to reserve a channel in an unlicensed spectrum according to various embodiments.

FIG. 14A provides another example 1400 of how the performance of CCAs for an unlicensed spectrum (or a channel of the unlicensed spectrum) may be synchronized across multiple eNBs 105. Examples of the eNBs 105 may be the base stations 105, 105-a, and 105-b of FIG. 1, FIG. 2A, and FIG. 2B, respectively. The performance of CCAs may in some examples be synchronized across the eNBs 105 used in the system 100 of FIG. 1, or with portions of the system 100 shown in FIG. 2A and FIG. 2B.

FIG. 14A also shows how the unlicensed spectrum may be reserved by one or more of the eNBs 105 following a successful CCA. By way of example, the multiple eNBs 105 may include an LTE-U eNB1, an LTE-U eNB2, and an LTE-U eNB3.

As shown, the boundaries of the current gating intervals of each eNB (e.g., eNB1, eNB2, and eNB3) may be synchronized, thereby providing synchronization of the S' subframes 725-$f$, 725-$g$, 725-$h$ of the eNBs. A CCA period of each S' subframe may include multiple CCA slots 720. Because of a synchronized pseudo-random CCA slot selection processes implemented by each eNB, the eNB2 may select a CCA slot 720-$i$ that occurs at a different time (e.g., different OFDM symbol position) than the CCA slot 720-$h$ selected by eNB1. For example, the eNB1 may select a CCA slot 720-$h$ aligned with the fifth OFDM symbol position of the aligned CCA periods of the S' subframes 725-$f$ and 725-$g$, and the eNB2 may select a CCA slot 720-$i$ aligned with the third OFDM symbol position of the aligned CCA periods. However, when the eNB3 is deployed by the same operator as the eNB1, the eNB3 may synchronize the timing of its CCA slot 720-$j$ with the timing of the CCA slot 720-$h$ selected for eNB1. The operator deploying both eNB1 and eNB3 may then determine which eNB is allowed access to the unlicensed spectrum or coordinate simultaneous access to the unlicensed spectrum by virtue of orthogonal transmissions and/or other transmission mechanisms.

A next transmission interval following the synchronized S' subframes 725-$f$, 725-$g$, 725-$h$ may begin after the CCA periods of the S' subframes 725-$f$, 725-$g$, 725-$h$ and start with a D subframe, as shown. Because the CCA slot 720-$i$ of the eNB2 is scheduled first in time, the eNB2 has a chance to reserve the next transmission interval before the eNB1 and eNB3 have a chance to reserve the next transmission interval. However, because of the pseudo-random CCA slot selection process implemented by each of eNB1, eNB1, and eNB3, the eNB1 or eNB3 may be provided the first chance to reserve a later transmission interval.

By way of example, FIG. 14A shows there is WiFi transmission (Tx) activity that coincides with a portion of the aligned CCA periods of the S' subframes 725-$f$, 725-$g$, 725-$h$. Because of the timing of the CCA slot 720-$i$ selected by the eNB2, the eNB2 may determine as a result of performing its CCA that the unlicensed spectrum is unavailable, and may gate OFF a downlink transmission 1005-$c$ in the unlicensed spectrum for the next transmission interval. A downlink transmission of the eNB2 may therefore be blocked as a result of the WiFi Tx activity occurring during performance of the eNB2's CCA.

During the CCA slots 720-$h$ and 720-$j$, the eNB1 and the eNB3 may each perform their respective CCA. Because of the timing of the CCA slots 720-$h$, 720-$j$ selected by the eNB1 and the eNB3, each of the eNB1 and the eNB3 may determine as a result of performing their CCA that the unlicensed spectrum is available (e.g., because the WiFi Tx activity does not occur during the CCA slots 720-$h$, 720-$i$, and because the eNB2 was not able to reserve the next transmission interval at an earlier time). The eNB1 and the eNB3 may therefore each reserve the next transmission interval and gate ON a downlink transmission 1005-$b$, 1005-$d$ in the unlicensed spectrum for the next transmission interval.

An eNB may reserve the next transmission interval by transmitting one or more signals before the next transmission interval to reserve the unlicensed spectrum during the next transmission interval. For example, after determining that the unlicensed spectrum is available (e.g., by performing a successful CCA), the eNB1 may fill each of the CCA slots following its performance of a successful CCA with CUBS 1010-*a*. The CUBS 1010-*a* may include one or more signals that are detectable by other devices to let the other devices know the unlicensed spectrum (or at least a channel thereof) has been reserved for use by another device (e.g., by the eNB1). The CUBS 1010-*a* may be detected by both LTE and WiFi devices. Unlike most LTE signals, which begin at a subframe boundary, the CUBS 1010-*a* may begin at an OFDM symbol boundary.

In some cases, the CUBS 1010-*a* may include a placeholder signal transmitted for the purpose of reserving the unlicensed spectrum. In other cases, the CUBS 1010-*a* may include, for example, at least one pilot signal for one or both of time-frequency synchronization and channel quality estimation over the unlicensed spectrum. The pilot signal(s) may be used by one or more UEs 115 to make channel quality measurements on different resource elements, so that a channel quality may be reported to the eNB1. The eNB1 may then receive the report of channel quality from the UE 115 in response to the CUBS 1010-*a*, and allocate resource elements for transmissions from the eNB1 to the UE 115 to provide fractional resource reuse among multiple UEs 115, to avoid interference among the multiple UEs 115.

In some embodiments, the CUBS 1010-*a* may be transmitted repetitively, with the transmission of each signal starting at a boundary of one of the multiple CCA slots.

In some embodiments, it may be ensured that at least one OFDM symbol position worth of CUBS is transmitted following a successful CCA, to assist in time/frequency synchronization between a transmitting LTE-U eNB and a receiving UE.

In some embodiments, and when there is a duration of more than two OFDM symbols between a successful CCA and the start of a next transmission interval, the third and subsequent CUBS transmissions may be modified to carry downlink data and control information from the transmitting LTE-U eNB to a receiving UE.

In some embodiments, the CUBS 1010-*a* may be modeled after the downlink pilot time slot (DwPTS) structure defined in the current LTE specification.

In some embodiments, the CUBS 1010-*a* may include a wideband waveform that carries a signature sequence determined by the DeploymentID of the transmitting LTE-U eNB. The signature sequence may be a known sequence having low information content, and hence be IC-friendly for LTE-U receiver nodes. The wideband waveform may in some cases be transmitted at full transmit power, to overcome the transmit power spectral density (Tx-PSD) and minimum bandwidth (min-BW) constraints, as well as silence other nodes (e.g., WiFi nodes).

The eNB3 may likewise fill each of the CCA slots following its performance of a successful CCA with CUBS 1010-*b*, and may receive a report of channel quality from a different one of the UEs 115.

Figure 14B:
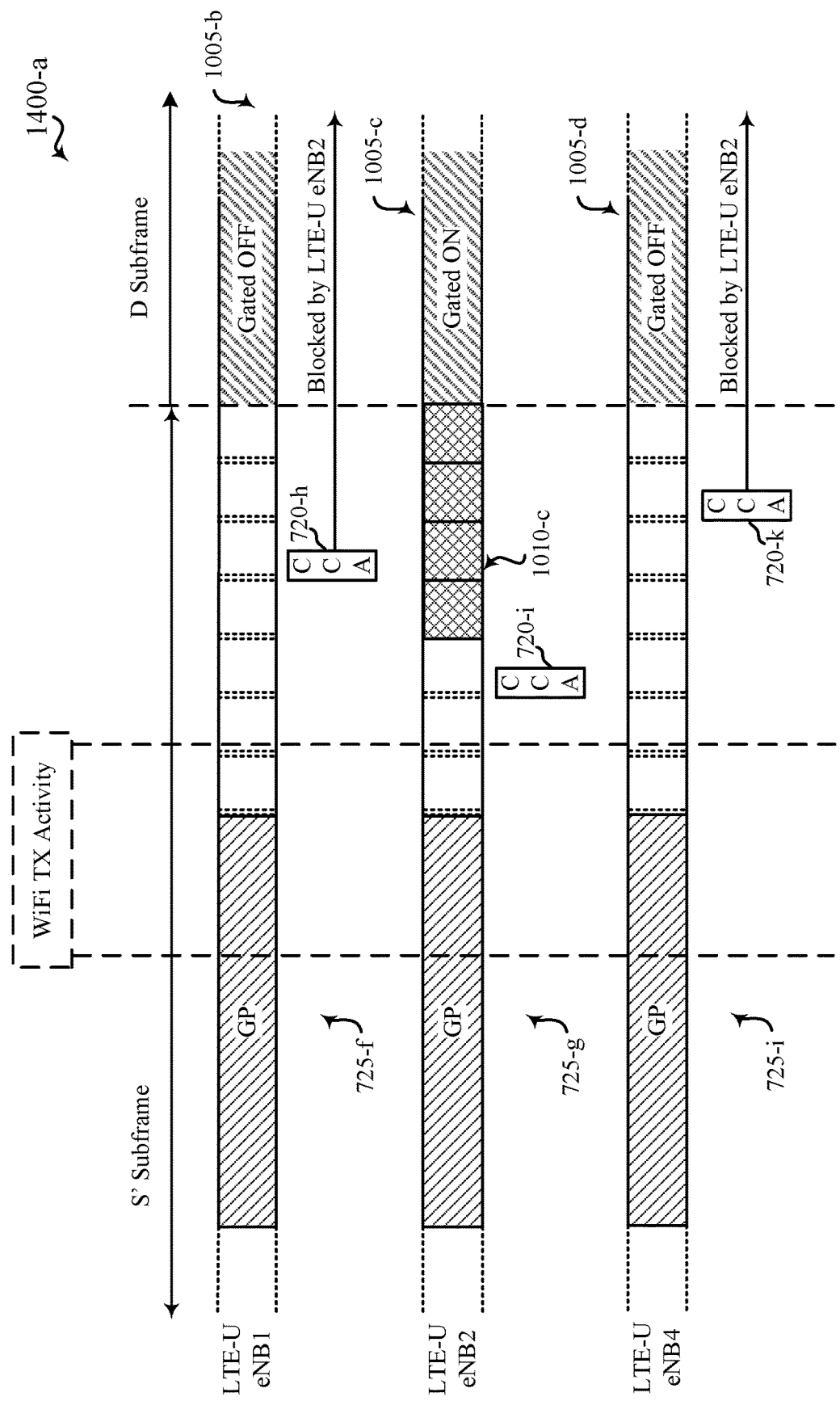
FIG. 14B shows a diagram that illustrates another example of the use of CUBS to reserve a channel in an unlicensed spectrum according to various embodiments.

FIG. 14B provides yet another example 1400-*a* of how the performance of CCAs for an unlicensed spectrum (or a channel of the unlicensed spectrum) may be synchronized across multiple eNBs 105. Examples of the eNBs 105 may be the base stations 105, 105-*a*, and 105-*b* of FIG. 1, FIG. 2A, and FIG. 2B, respectively. The performance of CCAs may in some examples be synchronized across the eNBs 105 used in the system 100 of FIG. 1, or with portions of the system 100 shown in FIG. 2A and FIG. 2B.

FIG. 14B also shows how the unlicensed spectrum may be reserved by one of the eNBs 105 following a successful CCA. By way of example, the multiple eNBs 105 may include an LTE-U eNB1, an LTE-U eNB2, and an LTE-U eNB4.

As shown, the boundaries of the current gating intervals of each eNB (e.g., eNB1, eNB2, and eNB4) may be synchronized, thereby providing synchronization of the S' subframes 725-*f*, 725-*g*, 725-*i* of the eNBs. A CCA period of each S' subframe may include multiple CCA slots 720. Because of a synchronized pseudo-random CCA slot selection processes implemented by each eNB, the eNB2 may select a CCA slot 720-*i* that occurs at a different time (e.g., different OFDM symbol position) than the CCA slot 720-*h* selected by eNB1. For example, the eNB1 may select a CCA slot 720-*h* aligned with the fifth OFDM symbol position of the aligned CCA periods of the S' subframes 725-*f* and 725-*g*, and the eNB2 may select a CCA slot 720-*i* aligned with the third OFDM symbol position of the aligned CCA periods. Likewise, the eNB4 may select a CCA slot 720-*k* that occurs at a different time than the CCA slots 720-*h*, 720-*i* selected by each of the eNB1 and the eNB2 (e.g., because the eNB4 may not be deployed by the same operator as the eNB1, as was the case with the eNB3 described with reference to FIG. 14A). For example, the eNB4 may select a CCA slot 720-*k* aligned with the sixth OFDM symbol position of the aligned CCA periods.

A next transmission interval following the synchronized S' subframes 725-*f*, 725-*g*, 725-*i* may begin after the CCA periods of the S' subframes 725-*f*, 725-*g*, 725-*i* and start with a D subframe, as shown. Because the CCA slot 720-*i* of the eNB2 is scheduled first in time, the eNB2 has a chance to reserve the next transmission interval before the eNB1 and eNB4 have a chance to reserve the next transmission interval. However, because of the pseudo-random CCA slot selection process implemented by each of the eNB1, the eNB2, and the eNB4, the eNB1 or the eNB4 may be provided the first chance to reserve a later transmission interval.

By way of example, FIG. 14B shows there is WiFi transmission (Tx) activity that coincides with a portion of the aligned CCA periods of the S' subframes 725-*f*, 725-*g*, 725-*i*. However, because the WiFi Tx activity does not coincide with the timing of the CCA slot 720-*i* selected by the eNB2, the eNB2 may determine as a result of performing its CCA that the unlicensed spectrum is available, and may gate ON a downlink transmission 1005-*c* in the unlicensed spectrum for the next transmission interval. Also, and following its successful CCA, the eNB2 may fill the subsequent CCA slots with CUBS 1010-*c*, thereby reserving the next transmission interval for its own use.

During the CCA slots 720-*h* and 720-*k*, the eNB1 and the eNB4 may each perform their respective CCA. However, because the eNB2 has already begun to transmit CUBS 1010-*c*, the eNB1 and the eNB4 determine that the unlicensed spectrum is unavailable. Stated another way, the eNB1 and the eNB4 are blocked from the unlicensed spectrum by virtue of the eNB2 already having reserved the unlicensed spectrum.

Figure 14C:
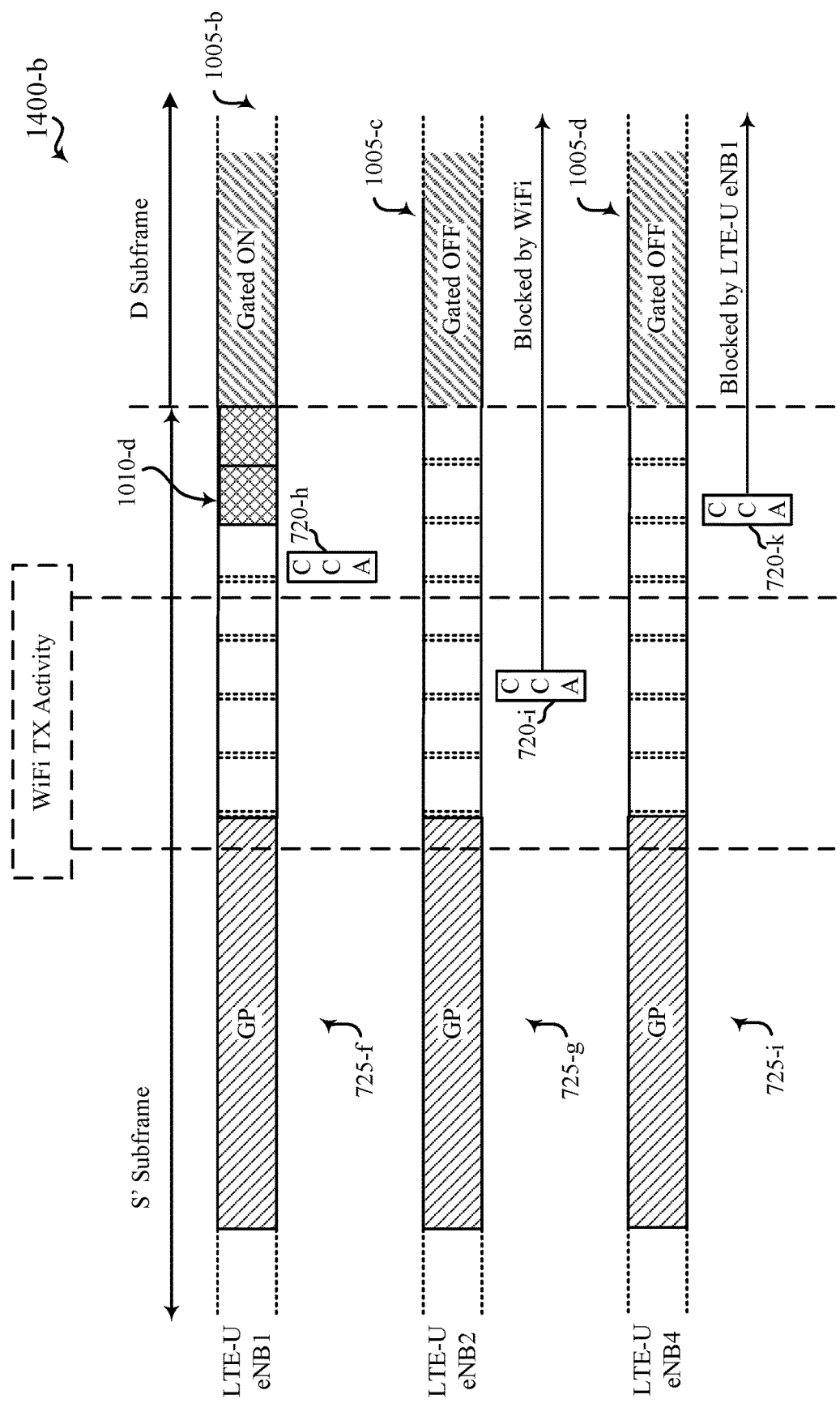
FIG. 14C shows a diagram that illustrates yet another example of the use of CUBS to reserve a channel in an unlicensed spectrum according to various embodiments.

FIG. 14C provides yet another example 1400-*b* of how the performance of CCAs for an unlicensed spectrum (or a channel of the unlicensed spectrum) may be synchronized across multiple eNBs 105. Examples of the eNBs 105 may be the base stations 105, 105-*a*, and 105-*b* of FIG. 1, FIG. 2A, and FIG. 2B, respectively. The performance of CCAs may in some examples be synchronized across the eNBs 506 used in the system 100 of FIG. 1, or with portions of the system 100 shown in FIG. 2A and FIG. 2B.

FIG. 14C also shows how the unlicensed spectrum may be reserved by one of the eNBs 105 following a successful CCA. By way of example, the multiple eNBs 105 may include an LTE-U eNB1, an LTE-U eNB2, and an LTE-U eNB4.

As shown, the boundaries of the current gating intervals of each eNB (e.g., eNB1, eNB2, and eNB4) may be synchronized, thereby providing synchronization of the S' subframes 725-$f$, 725-$g$, 725-$i$ of the eNBs. A CCA period of each S' subframe may include multiple CCA slots 720. Because of a synchronized pseudo-random CCA slot selection processes implemented by each eNB, the eNB2 may select a CCA slot 720-$i$ that occurs at a different time (e.g., different OFDM symbol position) than the CCA slot 720-$h$ selected by eNB1. For example, the eNB1 may select a CCA slot 720-$h$ aligned with the fifth OFDM symbol position of the aligned CCA periods of the S' subframes 725-$f$ and 725-$g$, and the eNB2 may select a CCA slot 720-$i$ aligned with the third OFDM symbol position of the aligned CCA periods. Likewise, the eNB4 may select a CCA slot 720-$k$ that occurs at a different time than the CCA slots 720-$h$, 720-$i$ selected by each of the eNB1 and the eNB2 (e.g., because the eNB3 may not be deployed by the same operator as the eNB1, as was the case in the example described with reference to FIG. 14A). For example, the eNB4 may select a CCA slot 720-$k$ aligned with the sixth OFDM symbol position of the aligned CCA periods.

A next transmission interval following the synchronized S' subframes 725-$f$, 725-$g$, 725-$i$ may begin after the CCA periods of the S' subframes 725-$f$, 725-$g$, 725-$i$ and start with a D subframe, as shown. Because the CCA slot 720-$i$ of the eNB2 is scheduled first in time, the eNB2 has a chance to reserve the next transmission interval before the eNB1 and eNB4 have a chance to reserve the next transmission interval. However, because of the pseudo-random CCA slot selection process implemented by each of the eNB1, the eNB2, and the eNB4, the eNB1 or the eNB4 may be provided the first chance to reserve a later transmission interval.

By way of example, FIG. 14C shows there is WiFi transmission (Tx) activity that coincides with a portion of the aligned CCA periods of the S' subframes 725-$f$, 725-$g$, 725-$i$. Because of the timing of the CCA slot 720-$i$ selected by the eNB2, the eNB2 may determine as a result of performing its CCA that the unlicensed spectrum is unavailable, and may gate OFF a downlink transmission 1005-$c$ in the unlicensed spectrum for the next transmission interval. A downlink transmission of the eNB2 may therefore be blocked as a result of the WiFi Tx activity occurring during performance of the eNB2's CCA.

During the CCA slot 720-$h$, the eNB1 may perform its CCA and determine that the unlicensed spectrum is available (e.g., because the WiFi Tx activity does not occur during the CCA slot 720-$h$, and because the eNB2 was not able to reserve the next transmission interval at an earlier time). The eNB1 may therefore reserve the next transmission interval and gate ON a downlink transmission 1005-$b$ in the unlicensed spectrum for the next transmission interval. Also, and following its successful CCA, the eNB1 may fill the subsequent CCA slots with CUBS 1010-$d$, thereby reserving the next transmission interval for its own use.

During the CCA slot 720-$k$, the eNB4 may perform its CCA and detect the CUBS 1010-$d$. As a result, the eNB4 may determine that the unlicensed spectrum is unavailable and gate OFF a downlink transmission 1005-$d$ in the unlicensed spectrum. Stated another way, the eNB4 is blocked from the unlicensed spectrum by virtue of the eNB1 already having reserved the unlicensed spectrum.

In FIGS. 14A, 14B, and 14C, CUBS 1010 are transmitted prior to a next transmission interval, to reserve unlicensed spectrum for an LTE-U eNB's use during the next transmission interval. However, in some embodiments, CUBS 1010 may be transmitted at the beginning of an active transmission interval to provide, for example, time/frequency synchronization for an LTE-U eNB and UE that are in communication during the active transmission interval.

In some embodiments, CUBS may be transmitted for less than the duration an OFDM symbol. Transmissions of CUBS for less than an OFDM symbol may be referred to as partial CUBS (PCUBS). By way of example, and in the context of the one or two millisecond gating intervals described with reference to FIGS. 10D, 10E, 10F, and 10G, PCUBS may be transmitted between the performance of a successful CCA and the start of a next OFDM symbol boundary. In some embodiments, PCUBS may be obtained from a full symbol CUBS by puncturing three out of every four tones and truncating the CUBS to a desired duration. Alternately, PCUBS may be formed by a physical layer convergence procedure (PLCP) preamble and header based on the IEEE 802.11g/n standard (which can silence at least standard compliant WiFi nodes).

Figure 15:
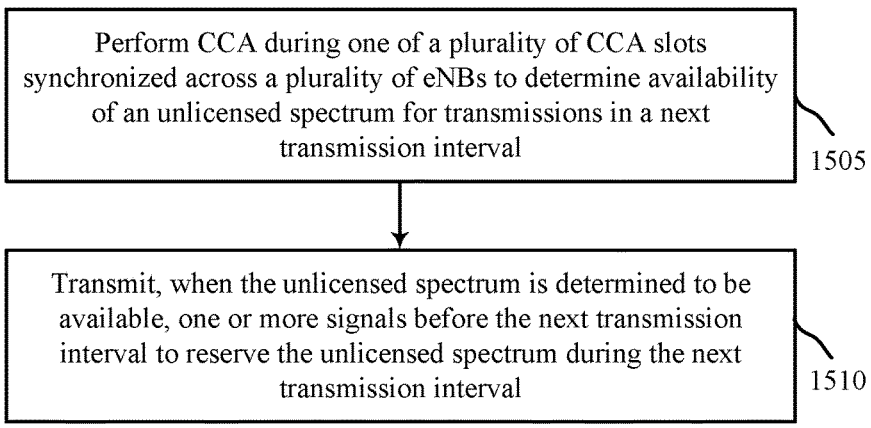
FIG. 15 is a flowchart of an example of a method for transmitting signals to reserve an unlicensed spectrum according to various embodiments.

FIG. 15 is a flow chart illustrating an example of a method 1500 for wireless communications. For clarity, the method 1500 is described below with reference to one of the eNBs 105 shown in FIGS. 1, 2A, and/or 2B. In one implementation, one of the eNBs 105 may execute one or more sets of codes to control the functional elements of the eNB 105 to perform the functions described below.

At block 1505, a CCA may be performed during one of multiple CCA slots synchronized across multiple eNBs 105 (e.g., LTE-U eNBs) to determine an availability of an unlicensed spectrum (or at least one channel of the unlicensed spectrum) for downlink transmissions in a next transmission interval.

In some embodiments, different eNBs may use different ones of the multiple CCA slots to perform CCA during a gating interval. In other embodiments, two or more eNBs may use the same CCA slot to perform CCA during a gating interval (e.g., when there exists coordination between a subset of eNBs, such as coordination between the eNBs deployed by a single operator).

At block 1510, and when the unlicensed spectrum is available (e.g., when it is determined by performing a successful CCA that the unlicensed spectrum is available), one or more signals may be transmitted before the next transmission interval to reserve the unlicensed spectrum during the next transmission level. In some cases, the one or more signals may include CUBS 1010, as described with reference to FIG. 14A, 14B, and/or 14C.

In some embodiments, the one or more signals transmitted before the next transmission interval may include at least one pilot signal for one or both of time-frequency synchronization and channel quality estimation over the unlicensed spectrum. The pilot signal(s) may be used by one or more UEs 115 to make channel quality measurements on different resource elements, so that a channel quality may be reported to the eNB 105 that transmitted the one or more signals. The eNB 105 may then receive the report of channel quality from the UE 115 in response to the pilot signal(s) and allocate resource elements for transmissions from the eNB 105 to the UE 115 to provide fractional resource reuse among multiple UEs 115, to avoid interference among the multiple UEs 115.

Thus, the method 1500 may provide for wireless communications. It should be noted that the method 1500 is just one implementation and that the operations of the method

1500 may be rearranged or otherwise modified such that other implementations are possible.

When gating access to an unlicensed spectrum, gating intervals may force an LTE-U eNB to be silent for several LTE radio frames. Because of this, an LTE-U eNB that relies on conventional LTE reporting of feedback information (e.g., channel state information (CSI)) may not have up-to-date channel quality indicator (CQI) information before scheduling a downlink transmission. An LTE-U eNB that relies on conventional LTE reporting of feedback information may also fail to receive hybrid automatic repeat requests (HARQ) in a timely fashion. Mechanisms that take gating intervals of an unlicensed spectrum into account, and report CSI and HARQ over gated OFF transmission intervals of a downlink in the unlicensed spectrum, may therefore be used to improve the LTE-U eNB's CQI and HARQ processing. Examples of such mechanisms are described with reference to FIGS. 16, 17A, and 17B.

Figure 16:
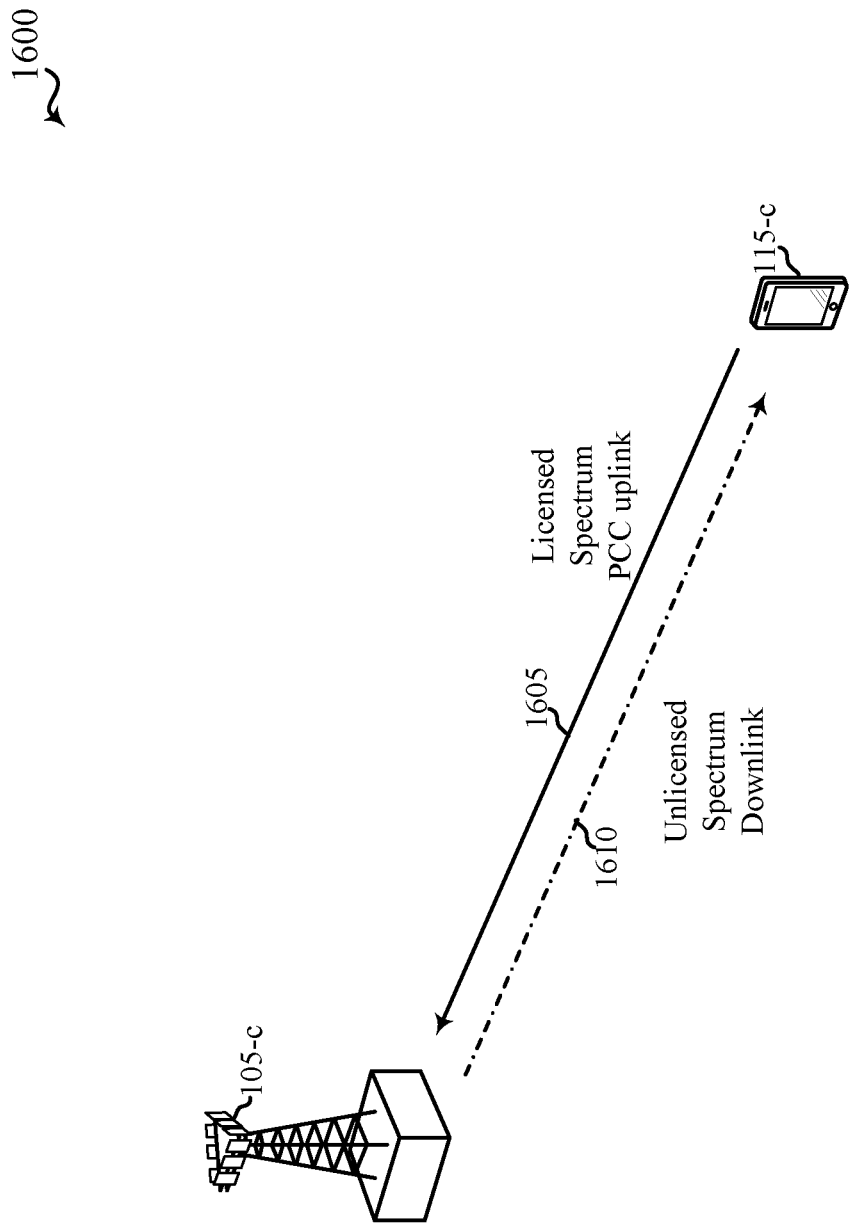
FIG. 16 shows a diagram that illustrates an example of feedback information being sent in a licensed spectrum to address signals transmitted in an unlicensed spectrum according to various embodiments.

FIG. 16 is a diagram 1600 illustrating communications between an eNB 105-*c* and a UE 115-*c*. The eNB 105-*c* may be an example of the base stations 105, 105-*a*, and 105-*b* of FIG. 1, FIG. 2A, and FIG. 2B, respectively. The UE115-*c* may be an example of the UEs 115, 115-*a*, and 115-*b* of FIG. 1, FIG. 2A, and FIG. 2B, respectively. The eNB 105-*c* and the UE 115-*c* may used in the system 100 of FIG. 1 and with portions of the system 100 shown in FIG. 2A and FIG. 2B.

The eNB 105-*c* may communicate with the UE 115-*c* via a downlink 1610 in an unlicensed spectrum, and the UE 115-*c* may communicate with the eNB 105-*c* via a primary component carrier (PCC) uplink 1605 in a licensed spectrum. The UE 115-*c* may transmit feedback information to the eNB 105-*c* via the PCC uplink 1605, and the eNB 105-*c* may receive the feedback information from the UE 115-*c* via the PCC uplink 1605. In some cases, the feedback information may address (or pertain to) signals transmitted from the eNB 105-*c* to the UE 115-*c* via the downlink 1610. Transmitting feedback information for the unlicensed spectrum via the licensed spectrum may improve the reliability of feedback information for the unlicensed spectrum.

The feedback information may in some cases include feedback information for at least one transmission interval gated from the downlink 1610.

In some embodiments, the feedback information may include channel state information (CSI), such as CSI for the downlink 1610. For at least one transmission interval during which the eNB 105-*c* gated OFF transmissions for the downlink 1610, the CSI may include long-term CSI. However, for at least one transmission interval during which the eNB 105-*c* gated ON transmissions for the downlink, the CSI may include short-term CSI. The long-term CSI may include, for example, radio resource management (RRM) information that captures the details of the channel interference environment (e.g., information identifying each source of dominant interference, whether it be a WiFi, station (STA), and/or LTE-U eNB, for example; information identifying the average strength and/or spatial characteristics of each interfering signal; etc.). The short-term CSI may include, for example, a CQI, a rank indicator (RI), and/or a pre-coding matrix indicator. In some cases, the CSI may be sent from a UE 115 to an eNB 115, via the PCC uplink 1605, in a second subframe following the start of downlink transmissions in a current transmission interval in the unlicensed spectrum.

In some embodiments, the feedback information may include HARQ feedback information, such as HARQ feedback information for the downlink 1610. In one example of HARQ transmission, HARQ may ignore transmission intervals where downlink transmissions were gated OFF. In another example of HARQ transmission, HARQ may be used for transmission intervals where downlink transmissions are gated ON, and a simple automated repeat request (ARQ) may be used for transmission intervals where downlink transmissions are gated OFF. Both examples may retain almost full HARQ functionality in the context of a single LTE-U deployment with no WiFi interference. However, in the presence of WiFi interference or multiple LTE-U deployments (e.g., deployments by different operators), the second example may be forced to predominantly use ARQ, in which case CSI may become the main tool for link adaptation. Asynchronous HARQ may be transmitted in a manner that is unaffected by gating of the unlicensed spectrum.

When a downlink transmission is not acknowledged (NAK'd), a best effort HARQ retransmission may be made via the downlink 1610. However, after a timeout period, the NAK'd packet may be recovered through radio link control (RLC) retransmissions via the downlink 1610 or a PCC downlink.

The eNB 105-*c* may in some cases use both the long-term CSI and the short-term CSI to select a modulation and coding scheme (MCS) for the downlink 1610 in the unlicensed spectrum. The HARQ may then be used to fine-tune the served spectral efficient of the downlink 1610 in real-time.

FIG. 17A is a flow chart illustrating an example of another method 1700 for wireless communications. For clarity, the method 1700 is described below with reference to one of the eNBs 105 shown in FIGS. 1, 2A, and/or 2B. In one implementation, one of the eNBs 105 may execute one or more sets of codes to control the functional elements of the eNB 105 to perform the functions described below.

At block 1705, feedback information is received (e.g., by an eNB 105) from a UE 115 via a PCC uplink in a licensed spectrum. The feedback information may include information that addresses (or pertains to) signals transmitted to the UE 115 via a downlink in an unlicensed spectrum.

The feedback information may in some cases include feedback information for at least one transmission interval gated from the downlink 1610.

In some embodiments, the feedback information may include channel state information (CSI), such as CSI for the downlink 1610. For at least one transmission interval during which the eNB 105-*c* gated OFF transmissions for the downlink 1610, the CSI may include long-term CSI. However, for at least one transmission interval during which the eNB 105-*c* gated ON transmissions for the downlink, the CSI may include short-term CSI. The long-term CSI may include, for example, radio resource management (RRM) information that captures the details of the channel interference environment (e.g., information identifying each source of dominant interference, whether it be a WiFi, station (STA), and/or LTE-U eNB, for example; information identifying the average strength and/or spatial characteristics of each interfering signal; etc.). The short-term CSI may include, for example, a CQI, a rank indicator (RI), and/or a pre-coding matrix indicator. In some cases, the CSI may be sent from a UE 115 to an eNB 115, via the PCC uplink 1605, in a second subframe following the start of downlink transmissions in a current transmission interval in the unlicensed spectrum.

In some embodiments, the feedback information may include HARQ feedback information, such as HARQ feedback information for the downlink 1610. In one example of HARQ transmission, HARQ may ignore transmission intervals where downlink transmissions were gated OFF. In another example of HARQ transmission, HARQ may be used for transmission intervals where downlink transmissions are gated ON, and a simple automated repeat request (ARQ) may be used for transmission intervals where downlink transmissions are gated OFF. Both examples may retain almost full HARQ functionality in the context of a single LTE-U deployment with no WiFi interference. However, in the presence of WiFi interference or multiple LTE-U deployments (e.g., deployments by different operators), the second example may be forced to predominantly use ARQ, in which case CSI may become the main tool for link adaptation. Asynchronous HARQ may be transmitted in a manner that is unaffected by gating of the unlicensed spectrum.

When a downlink transmission is not acknowledged (NAK'd), a best effort HARQ retransmission may be made via the downlink 1610. However, after a timeout period, the NAK'd packet may be recovered through radio link control (RLC) retransmissions via the downlink 1610 or a PCC downlink.

The eNB 105-c may in some cases use both the long-term CSI and the short-term CSI to select a modulation and coding scheme (MCS) for the downlink 1610 in the unlicensed spectrum. The HARQ may then be used to fine-tune the served spectral efficient of the downlink 1610 in real-time.

Thus, the method 1700 may provide for wireless communications. It should be noted that the method 1700 is just one implementation and that the operations of the method 1700 may be rearranged or otherwise modified such that other implementations are possible.

FIG. 17B is a flow chart illustrating an example of a method 1700-a for wireless communications. For clarity, the method 1700-a is described below with reference to one of the UEs 115 shown in FIGS. 1, 2A, and/or 2B. In one implementation, one of the UEs 115 may execute one or more sets of codes to control the functional elements of the UE 115 to perform the functions described below.

At block 1715, feedback information may be transmitted (e.g., from a UE 115) to an eNB 105 via a PCC uplink in a licensed spectrum. The feedback information may include information that addresses (or pertains to) signals transmitted to the UE 115 via a downlink in an unlicensed spectrum.

The feedback information may in some cases include feedback information for at least one transmission interval gated from the downlink 1610.

In some embodiments, the feedback information may include channel state information (CSI), such as CSI for the downlink 1610. For at least one transmission interval during which the eNB 105-c gated OFF transmissions for the downlink 1610, the CSI may include long-term CSI. However, for at least one transmission interval during which the eNB 105-c gated ON transmissions for the downlink, the CSI may include short-term CSI. The long-term CSI may include, for example, radio resource management (RRM) information that captures the details of the channel interference environment (e.g., information identifying each source of dominant interference, whether it be a WiFi, station (STA), and/or LTE-U eNB, for example; information identifying the average strength and/or spatial characteristics of each interfering signal; etc.). The short-term CSI may include, for example, a CQI, a rank indicator (RI), and/or a pre-coding matrix indicator. In some cases, the CSI may be sent from a UE 115 to an eNB 115, via the PCC uplink 1605, in a second subframe following the start of downlink transmissions in a current transmission interval in the unlicensed spectrum.

In some embodiments, the feedback information may include HARQ feedback information, such as HARQ feedback information for the downlink 1610. In one example of HARQ transmission, HARQ may ignore transmission intervals where downlink transmissions were gated OFF. In another example of HARQ transmission, HARQ may be used for transmission intervals where downlink transmissions are gated ON, and a simple automated repeat request (ARQ) may be used for transmission intervals where downlink transmissions are gated OFF. Both examples may retain almost full HARQ functionality in the context of a single LTE-U deployment with no WiFi interference. However, in the presence of WiFi interference or multiple LTE-U deployments (e.g., deployments by different operators), the second example may be forced to predominantly use ARQ, in which case CSI may become the main tool for link adaptation. Asynchronous HARQ may be transmitted in a manner that is unaffected by gating of the unlicensed spectrum.

When a downlink transmission is not acknowledged (NAK'd), a best effort HARQ retransmission may be made via the downlink 1610. However, after a timeout period, the NAK'd packet may be recovered through radio link control (RLC) retransmissions via the downlink 1610 or a PCC downlink.

The eNB 105-c may in some cases use both the long-term CSI and the short-term CSI to select a modulation and coding scheme (MCS) for the downlink 1610 in the unlicensed spectrum. The HARQ may then be used to fine-tune the served spectral efficient of the downlink 1610 in real-time.

Thus, the method 1700-a may provide for wireless communications. It should be noted that the method 1700-a is just one implementation and that the operations of the method 1700-a may be rearranged or otherwise modified such that other implementations are possible.

Figure 18A:
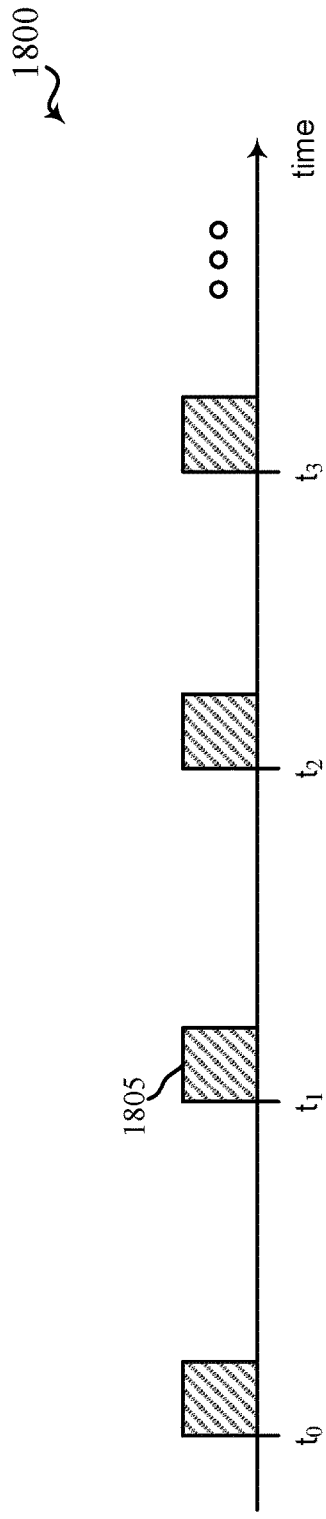
FIG. 18A shows a diagram that illustrates an example of LTE-U beacon signal broadcasting in an unlicensed spectrum according to various embodiments.

Turning next to FIG. 18A, a diagram 1800 illustrates an example of LTE-U beacon signal broadcasting in an unlicensed spectrum according to various embodiments. The LTE-U beacon signal (or discovery beacons) 1805 may be transmitted or broadcast by an eNB that supports LTE-U. Examples of such an eNB may be the base stations 105, 105-a, and 105-b of FIG. 1, FIG. 2A, and FIG. 2B, respectively. The broadcasting may be performed in connection with a system or network like the system 100 of FIG. 1 and the portions of the system 100 of FIG. 2A and FIG. 2B.

The transmissions may occur when the eNB is in an active state or when the eNB is in a dormant or inactive state. The beacon signals 1805 may be transmitted at a low duty cycle (e.g., 1 or 2 subframes every 100 milliseconds) and may span up to about 5 Megahertz (MHz) in bandwidth. Because of their low duty cycle, the beacon signals 1805 may be transmitted without the need for a listen-before-talk (LBT) scheme. Accordingly, the beacon signals 1805 may be transmitted (e.g., broadcast) at predetermined times. In the example shown in FIG. 18A, beacon signals 1805 may be transmitted at least at times $t_0$, $t_1$, $t_2$, and $t_3$. The timing of these transmissions may be periodic. In some cases the transmissions may not need to be periodic as long as the times are scheduled (e.g., predetermined) and the schedule may be known to the devices or entities listening for the beacon signals 1805. The beacon signals 1805 may be used by other eNBs and/or by UEs (e.g., UEs 115) for dormant/active eNB discovery and for coarse time-frequency tracking.

Figure 18B:
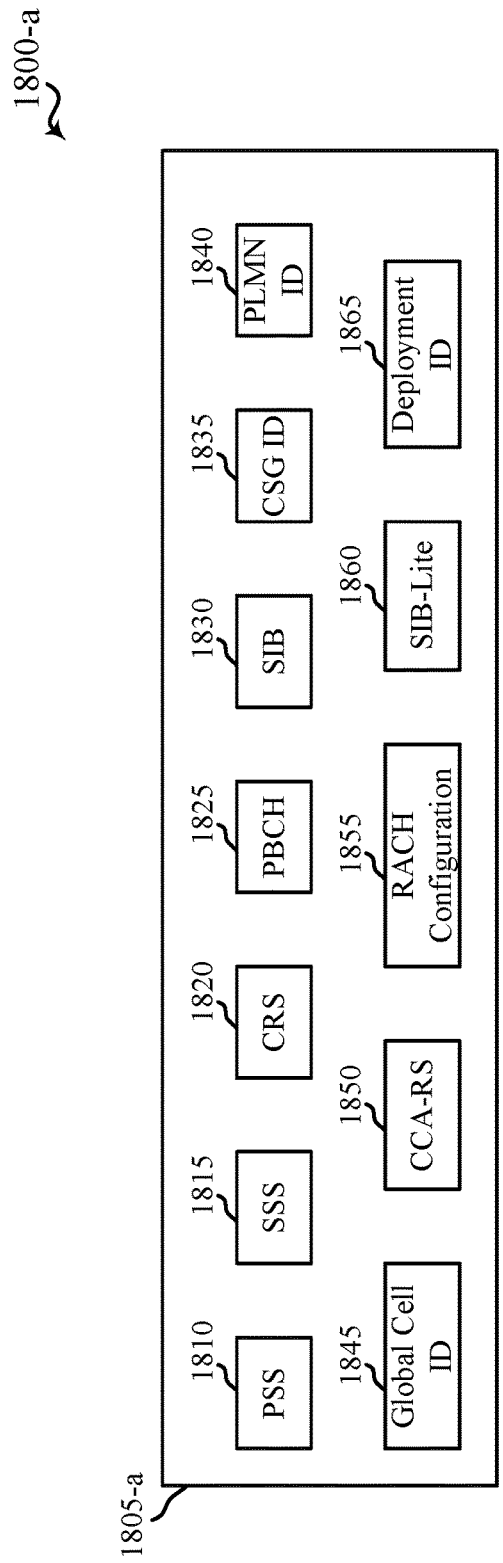
FIG. 18B shows a diagram that illustrates an example of a payload in an LTE-U beacon signal according to various embodiments.

FIG. 18B shows a diagram 1800-a that illustrates an example of a payload in an LTE beacon signal according to various embodiments. The beacon signal 1805-a shown in FIG. 18B may be an example of the beacon signals 1805 of FIG. 18A. Accordingly, the beacon signal 1805-a may be transmitted or broadcast by an eNB that supports LTE-U (LTE-U eNB). Examples of such an eNB may be the base stations 105, 105-a, and 105-b of FIG. 1, FIG. 2A, and FIG. 2B, respectively.

A payload of the beacon signal 1805-a may include multiple fields of information or attributes associated with an eNB. For example, the beacon signal 1805-a may include one or more of a primary synchronization signal (PSS) field 1810, a secondary synchronization signal (SSS) field 1815, a cell-specific reference signal (CRS) field 1820, a physical broadcast channel (PBCH) field 1825, a system information block (SIB) field 1830, a closed subscriber group identity (CSG-ID) field 1835, a public land mobile network identifier (PLMN ID) field 1840, a global cell ID (GCI) field 1845, a clear channel assessment randomization seed (CCA-RS) field 1850, a random access channel (RACH) configuration field 1855, a light- or lite-version of an SIB (SIB-lite) field 1860, and a deployment ID field 1865. In some embodiments, the SIB-lite field 1860 may include the GCI field 1845 and the CSG-ID field 1835. The GCI field 1845 may include the PLMN ID field 1840. The payload contents shown in FIG. 18B need not be exhaustive. Other information or attributes associated with an eNB may be included to enable the use of LTE-based communications in an unlicensed spectrum. For example, the payload of the beacon signal 1805-a may include a periodic gating structure configuration for use in gating ON/OFF a next gating or transmission interval. Moreover, some of the fields shown need not be transmitted in some cases and some of the fields may be combined.

The combination of information on the PLMN ID field 1840 and in the CSG-ID field 1835 may be used to identify an LTE-U deployment configuration (e.g., an eNB deployment configuration) for the LTE-U deployment (e.g., an eNB deployment) associated with a given eNB. For example, LTE-U eNBs deployed by different cellular operators may have different PLMN IDs. Some PLMN IDs may be reserved for non-operator deployment of LTE-U. For example, an LTE-U eNB deployed by a non-operator/enterprise may use a reserved PLMN ID together with a unique CSG-ID.

FIG. 19A shows a flowchart of a method 1900 for broadcasting LTE beacon signals in an unlicensed spectrum according to various embodiments. The method 1900 may be implemented using, for example, the base stations or eNBs 105, 105-a, and 105-b of FIG. 1, FIG. 2A, and FIG. 2B, respectively; and/or the system 100 of FIG. 1 and the portions of the system 100 of FIG. 2A and FIG. 2B. In one implementation, one of the eNBs 105 may execute one or more sets of codes to control the functional elements of the eNB 105 to perform the functions described below.

At block 1905, beacon signals (e.g., beacon signals 1805) may be broadcast in an unlicensed spectrum at predetermined times from an eNB, where the beacon signals include downlink signals that identify the eNB and at least one associated attribute of the eNB. The beacon signals may in some cases be received at a UE (or at a plurality of UEs). In some embodiments, a UE may use the beacon signals to make a coarse timing adjustment to communicate in the unlicensed spectrum at the UE.

In some embodiments of the method 1900, the at least one associated attribute of the eNB may include at least attribute of the eNB. In some embodiments, the at least one associated attribute of the eNB may include an eNB deployment configuration for an eNB deployment with which the eNB is associated. In some embodiments, the at least one associated attribute of the eNB may include an eNB deployment configuration for an eNB deployment with which the eNB is associated, wherein downlink signals from eNBs in the eNB deployment are synchronized and concurrently transmitted by the eNBs of the eNB deployment in the unlicensed spectrum and in a licensed spectrum. In some embodiments, the eNBs in the eNB deployment are each deployed by a same operator.

In some embodiments of the method 1900, the at least one associated attribute of the eNB may include a RACH configuration associated with the eNB. In these embodiments, the beacon signals may also include a paging message for at least one UE. Upon receiving a beacon signal broadcast in the unlicensed spectrum, a UE may respond to the paging message using the RACH configuration.

In some embodiments of the method 1900, broadcasting the beacon signals includes broadcasting the beacon signals at a duty cycle below 5% (e.g., 1-2%), with a maximum broadcasting interval of approximately once every 50 milliseconds. In some embodiments, the beacon signals include one or more of a PSS, an SSS, a CRS, a PBCH, a GCI, a CSG-ID, a PLMN ID, a deployment ID, a periodic gating structure configuration, a CCA-RS, a RACH configuration, an SIB, and an SIB-lite. The beacon signals may include information that identifies the eNB as being active or dormant.

FIG. 19B shows a flowchart of a method 1900-a for broadcasting LTE beacon signals in an unlicensed spectrum according to various embodiments. The method 1900-a, like the method 1900 above, may be implemented using, for example, the base stations or eNBs 105, 105-a, and 105-b of FIG. 1, FIG. 2A, and FIG. 2B, respectively; and/or the system 100 of FIG. 1 and the portions of the system 100 of FIG. 2A and FIG. 2B. In one implementation, one of the eNBs 105 may execute one or more sets of codes to control the functional elements of the eNB 105 to perform the functions described below.

At block 1915, an eNB deployment is identified in which downlink signals from the deployed eNBs are synchronized and concurrently transmitted by the deployed eNBs in an unlicensed spectrum and in a licensed spectrum.

At block 1920, beacons signals (e.g., beacon signals 1805) may be broadcast in an unlicensed spectrum at predetermined times from one or more of the deployed eNBs, where the beacon signals include the identified eNB deployment.

Figure 20:
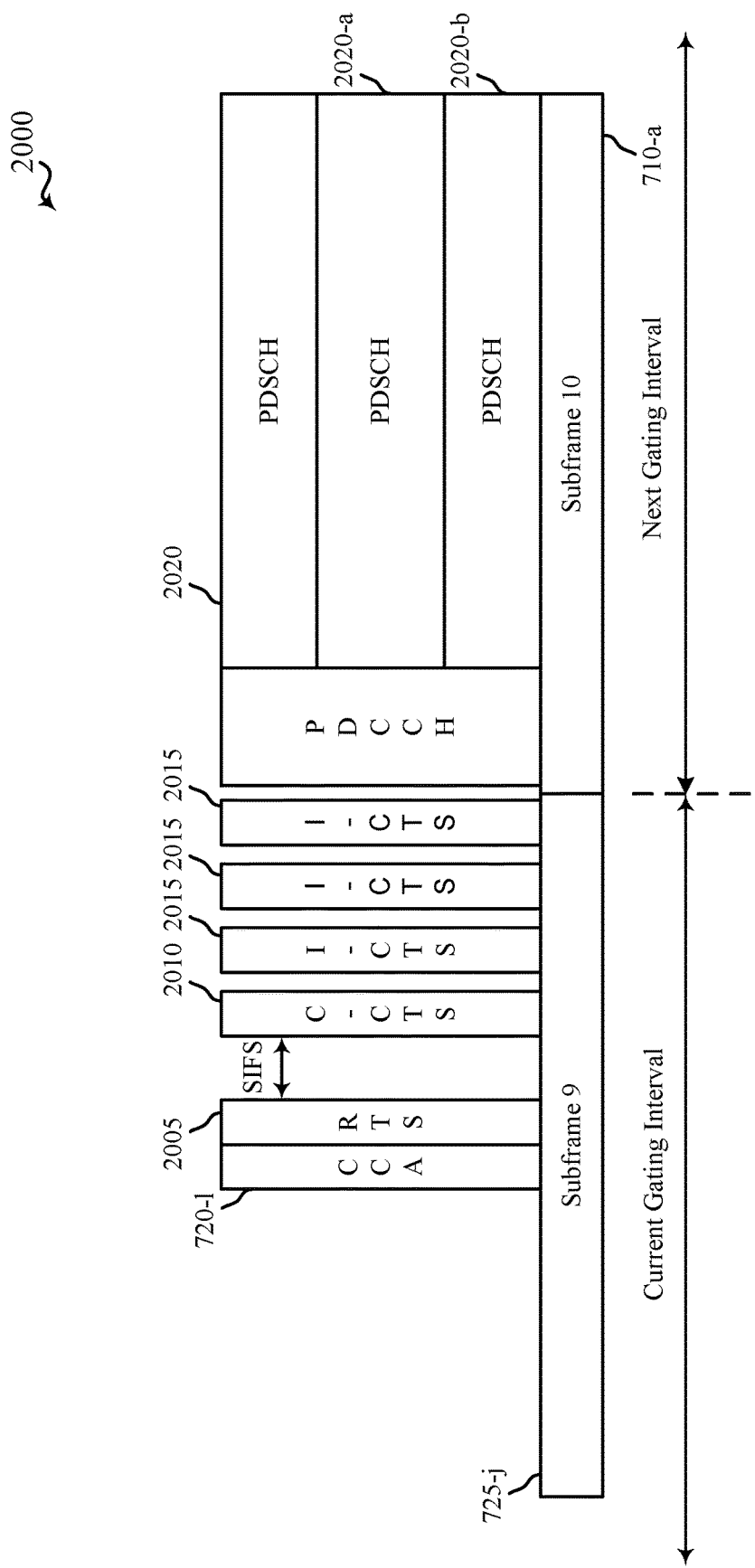
FIG. 20 shows a diagram that illustrates an example of request-to-send (RTS) and clear-to-send (CTS) signals in an unlicensed spectrum according to various embodiments.

Turning next to FIG. 20, a diagram 2000 is shown that illustrates an example of request-to-send (RTS) and clear-to-send (CTS) signals in an unlicensed spectrum according to various embodiments. The RTS signals may be transmitted by an eNB that supports LTE-U (LTE-U eNB). Examples of such an eNB may be the base stations 105, 105-a, and 105-b of FIG. 1, FIG. 2A, and FIG. 2B, respectively. The CTS signals may be transmitted by a UE that supports LTE-U (LTE-U UE). Examples of such a UE may be the UES 115, 115-a, and 115-b of FIG. 1, FIG. 2A. and FIG. 2B, respectively.

An RTS signal 2005 (or RTS 2005) may be generated and transmitted after a CCA 720-1 during a subframe 725-j in a current gating interval. The subframe 725-j may be an example of the subframe 9 (S') 725 of FIG. 7. That is, the subframe 725-j may be a last subframe in the current gating interval. The RTS 2005 may be transmitted when the CCA 720-1 is successful in the middle of the subframe interval.

An LTE-U eNB may use the transmission of the RTS 2005 to hold the channel until the next subframe boundary (or beyond).

The RTS 2005 may be compatible with RTS as defined for IEEE 802.11 standards (e.g., WiFi). A transmitter address (TA) field of the RTS 2005 may include the MAC ID of the transmitting LTE-U eNB. From the MAC ID, other LTE-U nodes (e.g., LTE-U eNBs) of the same deployment may recognize this as a "friendly RTS" and not go silent (may follow LTE-U MAC/enhanced intercell interference coordination (eICIC) procedures instead). A network allocation vector (NAV) field may be used to reserve time slots, as defined in IEEE 802.11 standards. For example, a NAV field may reserve at least a next subframe (1 milliseconds period). However, more typically, a NAV field may reserve at least the next 5 subframes (up to a maximum consistent with listen-before-talk). A receiver address (RA) field of the RTS 2005 may contain multiple hashes of cell radio network temporary identifier (C-RNTI) for a set of UEs served by the LTE-U eNB.

An RTS signal such as the RTS 2005 may be used prior to an UL grant to protect the subsequent UL transmission. In a standalone deployment, such as the one described above with respect to FIG. 2B, an RTS signal may also be sent prior to a physical downlink shared channel (PDSCH) transmission to protect the subsequent UL subframe where HARQ feedback (ACK/NACK) may be sent by a UE (on the same unlicensed spectrum channel). In response to an RTS signal, at least the UEs that are referred to in the RA field of the RTS signal may respond by sending a CTS signal if they are capable of receiving data/signaling from the eNB. Other UEs served by the LTE-U eNB that may wish to send a scheduling request (SR) or a pending CSI report may also respond with a CTS signal. Unlike WiFi, the CTS sent by the LTE-U UEs contain the MAC ID of the serving eNB in their TA field. A NAV field in the CTS may be determined from the corresponding RTS signal.

Returning to FIG. 20, the UEs named/served by the transmitting eNB may send a common CTS signal 2010 (or CTS 2010) a short inter-frame space (SIFS) interval after the RTS 2005. The common CTS 2010 allows the UEs to grab the channel as quickly as possible. In the remaining duration of subframe 9, before the next subframe boundary (with subframe 10), the UEs identified by the RTS 2005 may send individual CTS signals 2015 (or CTSs 2015) staggered in time. The staggering may depend on the order in which the UEs are identified in the RA field of the RTS 2005. A TA field in each of the individual CTSs 2015 may carry a hash of their full identity. The individual CTSs 2015 indicate to the eNB that the UEs are ready to receive data/grant. The use of individual CTSs 2015 enable better scheduling design, more efficient use of the channel by using FDMA among multiple UEs. After subframe 9, which includes the RTS 2005, the common CTS 2010, and the individual CTSs 2015, a next subframe 710-*a* (subframe 10) may include transmissions of PDSCH 2020, 2020-*a*, and 2020-*b*.

Figure 21:
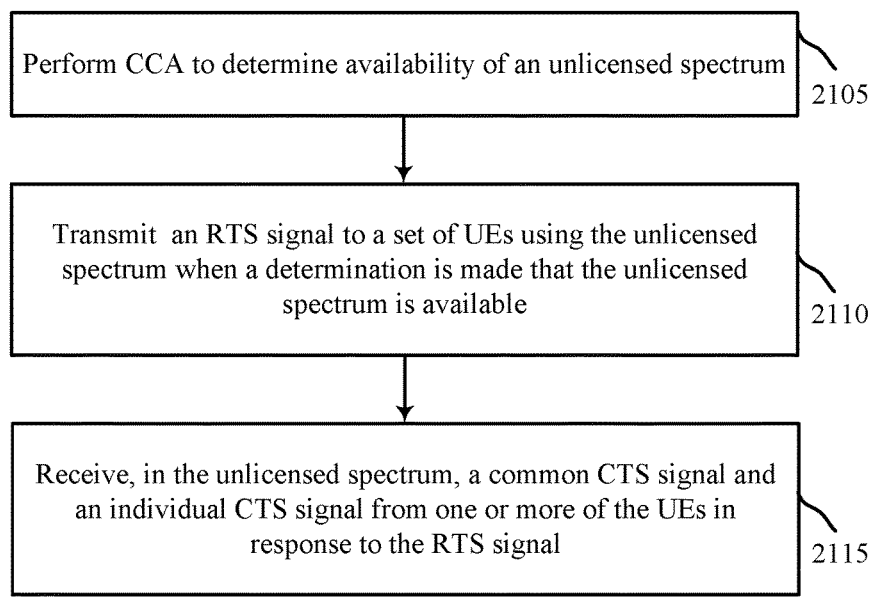
FIG. 21 is a flowchart of an example of a method for transmitting RTS signals and receiving CTS signals in an unlicensed spectrum according to various embodiments.

FIG. 21 shows a flowchart of a method 2100 for transmitting RTS signals and receiving CTS signals in an unlicensed spectrum according to various embodiments. The method 2100 may be implemented using, for example, the base stations or eNBs 105, 105-*a*, and 105-*b* of FIG. 1, FIG. 2A, and FIG. 2B, respectively; and/or the system 100 of FIG. 1 and the portions of the system 100 of FIG. 2A and FIG. 2B. In one implementation, one of the eNBs 105 may execute one or more sets of codes to control the functional elements of the eNB 105 to perform the functions described below.

At block 2105, clear channel assessment (CCA) may be performed to determine the availability of unlicensed spectrum.

At block 2110, an RTS signal (e.g., RTS 2005) may be transmitted to a set of UEs using the unlicensed spectrum when a determination is made that the unlicensed spectrum is available (e.g., CCA is successful).

At block 2115, a common CTS signal (e.g., CTS 2010) and an individual CTS signal (e.g., CTS 2015) may be received from one or more of the UEs in response to the RTS signal.

The RTS signal may be received at the UEs in the set of UEs over the unlicensed spectrum, and the common CTS signal and a respective individual CTS signal may be transmitted from each UE, over the unlicensed spectrum, in response to the RTS signal.

In some embodiments of the method 2100, transmitting the RTS signal includes transmitting the RTS signal prior to an uplink grant to protect a subsequent uplink transmission over the unlicensed spectrum, from the set of UEs. The RTS signal may include a MAC ID of a source (e.g., eNB) of the RTS signal. The MAC ID of the source may include a 48-bit MAC ID, for example. The RTS signal may include a hashed version of the MAC ID of the UEs in the set.

In some embodiments of the method 2100, the common CTS signal may be received a SIFS after the transmission of the RTS signal and the common CTS signal may include a MAC ID of the source of the RTS signal. Each of the individual CTS signals received may include a MAC ID of the source of the RTS signal and a MAC ID of the UE transmitting the individual CTS signal. The individual CTS signals may be received at staggered times.

In some embodiments of the method 2100, the CCA may be performed during a subframe of a current gating interval, the RTS signal may be transmitted after the CCA, and the common CTS and individual CTSs signals may be received before an end of the subframe. In some embodiments, a time associated with the CCA and a time associated with the subsequent transmission of the RTS signal may be randomly staggered among different eNBs to avoid collisions at devices receiving the RTS signal. Moreover, a time associated with the CCA and a time associated with the subsequent transmission of the RTS signal may be mutually staggered to avoid collisions at devices receiving the RTS signal, the staggering being based at least on coordinating signaling exchanged between eNBs.

Figure 22A:
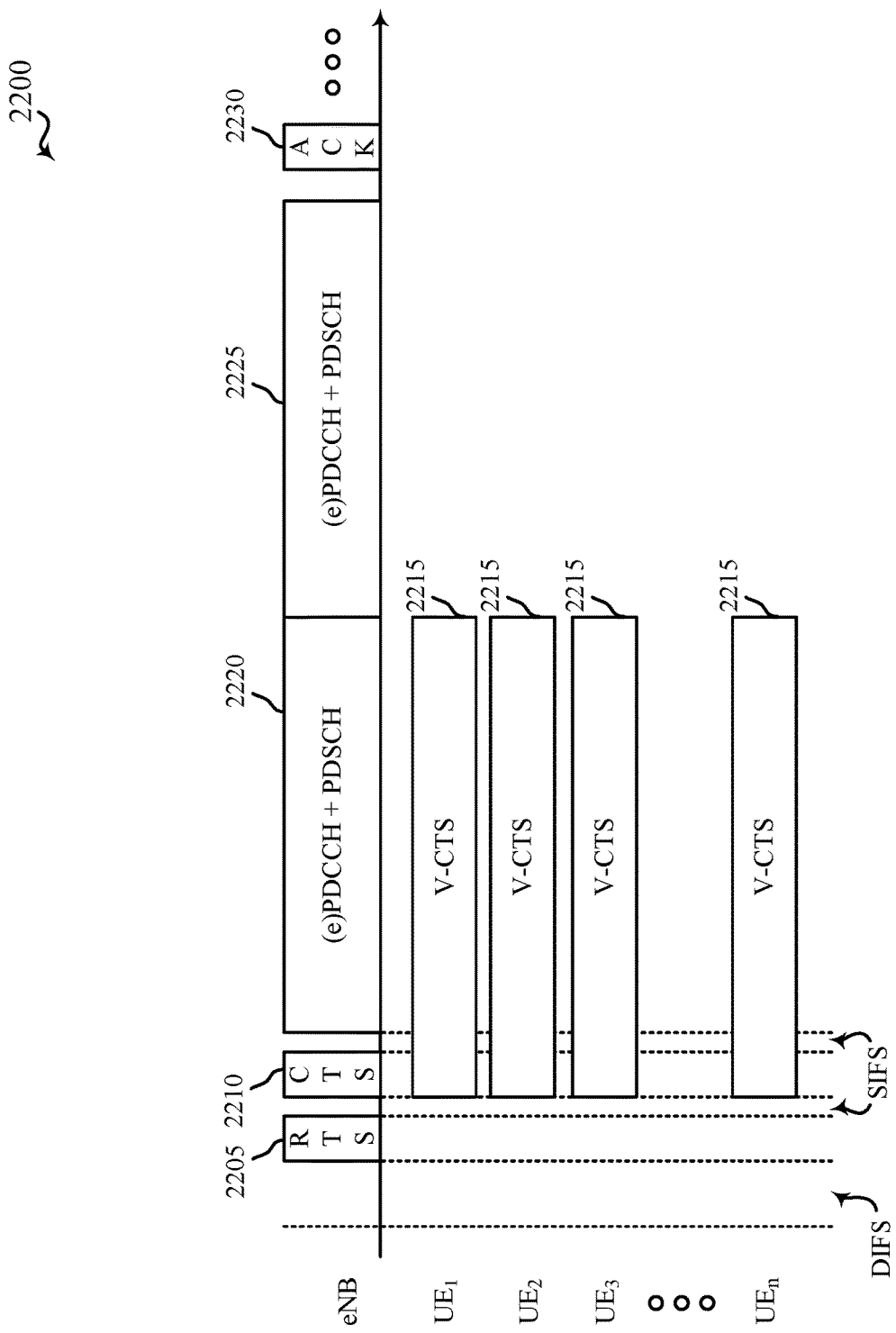
FIG. 22A shows a diagram that illustrates an example of virtual CTS (V-CTS) signals in a licensed spectrum according to various embodiments.

Turning next to FIG. 22A, a diagram 2200 is shown that illustrates an example of virtual CTS (V-CTS) signals in a licensed spectrum according to various embodiments. The V-CTS signals may be transmitted by UEs that support LTE-U (LTE-U UE). Examples of such UEs may be the UES 115, 115-*a*, 115-*b*, and of FIG. 1, FIG. 2A. and FIG. 2B, respectively.

After a DCF interframe space (DIFS) interval, which may include a CCA (e.g., 4 milliseconds) occurring whenever media frees up, an eNB (e.g., base station 105) may send an RTS signal 2205 (or RTS 2205) in an unlicensed spectrum addressing all UEs (e.g., $UE_1, \ldots, UE_n$) of interest with NAV. After a SIFS interval, the eNB sends a CTS-to-self in the unlicensed spectrum. The eNB may immediately schedule downlink traffic based on current knowledge for the rest of the subframe and continue scheduling and ACK 2230. The scheduling may be performed using the physical downlink control channel (PDCCH) and the PDSCH in signals 2220 and 2225. The UEs addressed by the RTS 2205 may send back, in a licensed spectrum, V-CTS signals 2215 (or V-CTSs 2215) with updated measurements (e.g., RTS/CTS measurements) for the eNB to improve future scheduling. In this scenario, the CTS signaling takes place virtually or out-of-band (out of the unlicensed spectrum) by concurrently using the licensed spectrum in LTE-U.

Figure 22B:
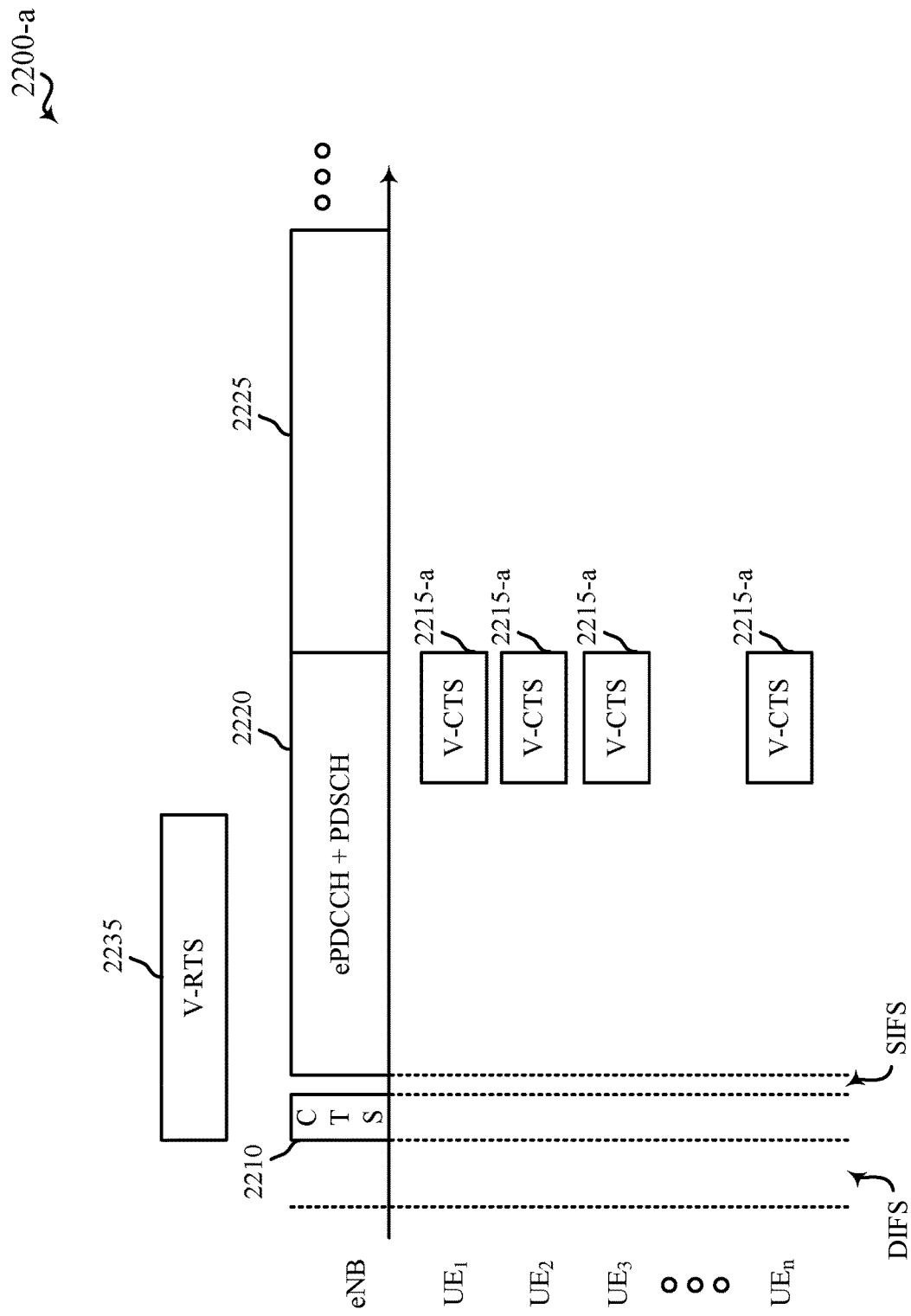
FIG. 22B shows a diagram that illustrates an example of a virtual RTS (V-RTS) signal and virtual V-CTS signals in a licensed spectrum according to various embodiments.

Turning next to FIG. 22B, a diagram 2200-a is shown that illustrates an example of virtual RTS (V-RTS) signals in a licensed spectrum according to various embodiments. The V-RTS signals may be transmitted by eNBs that support LTE-U (LTE-U eNB). Examples of such eNBs may be the base stations 105, 105-a, and 105-b of FIG. 1, FIG. 2A. and FIG. 2B, respectively.

After a DIFS interval, which may include a CCA (e.g., 4 milliseconds) occurring whenever media frees up, an eNB (e.g., base station 105) may poll the UEs of interest (e.g., $UE_1, \ldots, UE_n$) on a primary cell (PCell) when the media or channel is sensed to be free or available. The eNB need only send a CTS-to-self signal 2210 (or CTS-to-self 2210) on an unlicensed spectrum to save overhead. The eNB sends a V-RTS signal 2235 (or V-RTS 2235) using a licensed spectrum and the UEs addressed by the V-RTS 2235 may respond by each sending a V-CTS 2215-a also in the licensed spectrum. In this scenario, all the signaling needed for RTS and CTS takes place virtually or out-of-band (out of the unlicensed spectrum) by concurrently using the licensed spectrum in LTE-U. Like the scenario in FIG. 22A, the eNB may proceed to send scheduling information using signals 2220 and 2225 (e.g., PDCCH and PDSCH).

Figure 23:
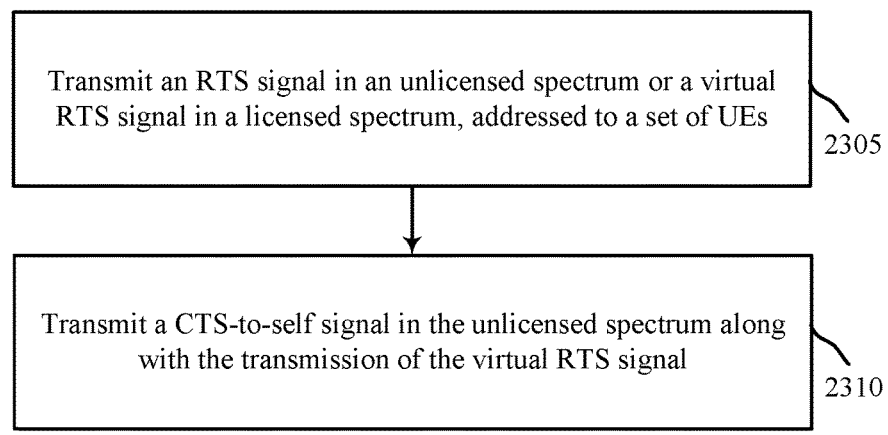
FIG. 23 is a flowchart of an example of a method for transmitting an RTS signal or a V-RTS signal according to various embodiments.

FIG. 23 shows a flowchart of a method 2300 for transmitting an RTS signal or a V-RTS signal according to various embodiments. The method 2300 may be implemented using, for example, the base stations or eNBs 105, 105-a, and 105-b of FIG. 1, FIG. 2A, and FIG. 2B, respectively; and/or the system 100 of FIG. 1 and the portions of the system 100 of FIG. 2A and FIG. 2B. In one implementation, one of the eNBs 105 may execute one or more sets of codes to control the functional elements of the eNB 105 to perform the functions described below.

At block 2305, an RTS signal (e.g., RTS 2205) may be transmitted in an unlicensed spectrum or a V-RTS signal (e.g., RTS 2235) may be transmitted in a licensed spectrum, addressed to a set of UEs (e.g., $UE_1, \ldots, UE_n$).

At block 2310, a CTS-to-self signal may be transmitted in an unlicensed spectrum along with the transmission of the V-RTS signal.

The RTS signal or the V-RTS signal may be received at the UEs in the set of UEs over the unlicensed spectrum.

In some embodiments of the method 2300, a V-CTS signal may be received in the licensed spectrum for each of the UEs in the set in response to the RTS signal or the V-RTS signal. The V-CTS signal may include measurements made by the respective UE for use in future scheduling. In some embodiments, traffic may be scheduled after receiving the V-CTS signals based on current channel knowledge for a remainder of a subframe. The RTS signal may be transmitted in the downlink primary component carrier.

Figure 24:
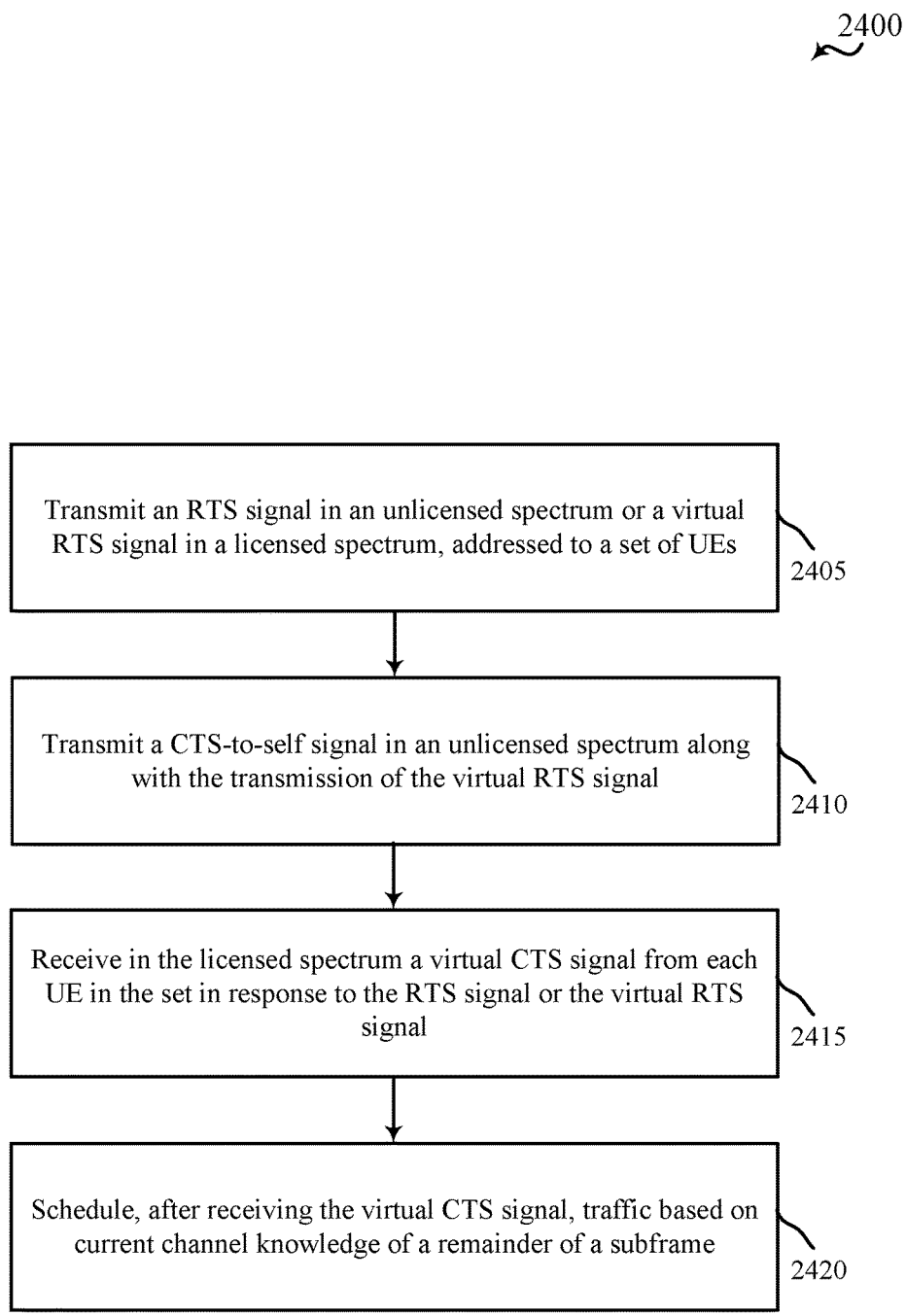
FIG. 24 is a flowchart of an example of a method for receiving V-CTS signals in response to an RTS signal or a V-RTS signal according to various embodiments.

FIG. 24 shows a flowchart of a method 2400 for receiving V-CTS signals in response to an RTS signal or a V-RTS signal according to various embodiments. The method 2400 may be implemented using, for example, the base stations or eNBs 105, 105-a, and 105-b of FIG. 1, FIG. 2A, and FIG. 2B, respectively; and/or the system 100 of FIG. 1 and the portions of the system 100 of FIG. 2A and FIG. 2B. In one implementation, one of the eNBs 105 may execute one or more sets of codes to control the functional elements of the eNB 105 to perform the functions described below.

At block 2405, an RTS signal (e.g., RTS 2205) may be transmitted in an unlicensed spectrum or a V-RTS signal (e.g., RTS 2235) may be transmitted in a licensed spectrum, addressed to a set of UEs (e.g., $UE_1, \ldots, UE_n$).

At block 2410, a CTS-to-self signal may be transmitted in an unlicensed spectrum along with the transmission of the V-RTS signal.

At block 2415, a V-CTS signal may be received in the licensed spectrum from each of the UEs in the set in response to the RTS signal or the V-RTS signal.

At block 2420, traffic may be scheduled after receiving the V-CTS signals based on current channel knowledge for a remainder of a subframe.

The RTS signal or the V-RTS signal may be received at the UEs in the set of UEs over the unlicensed spectrum, and the V-CTS signal may be transmitted from each UE, over the unlicensed spectrum, in response to the RTS signal or the V-RTS signal.

Figure 25:
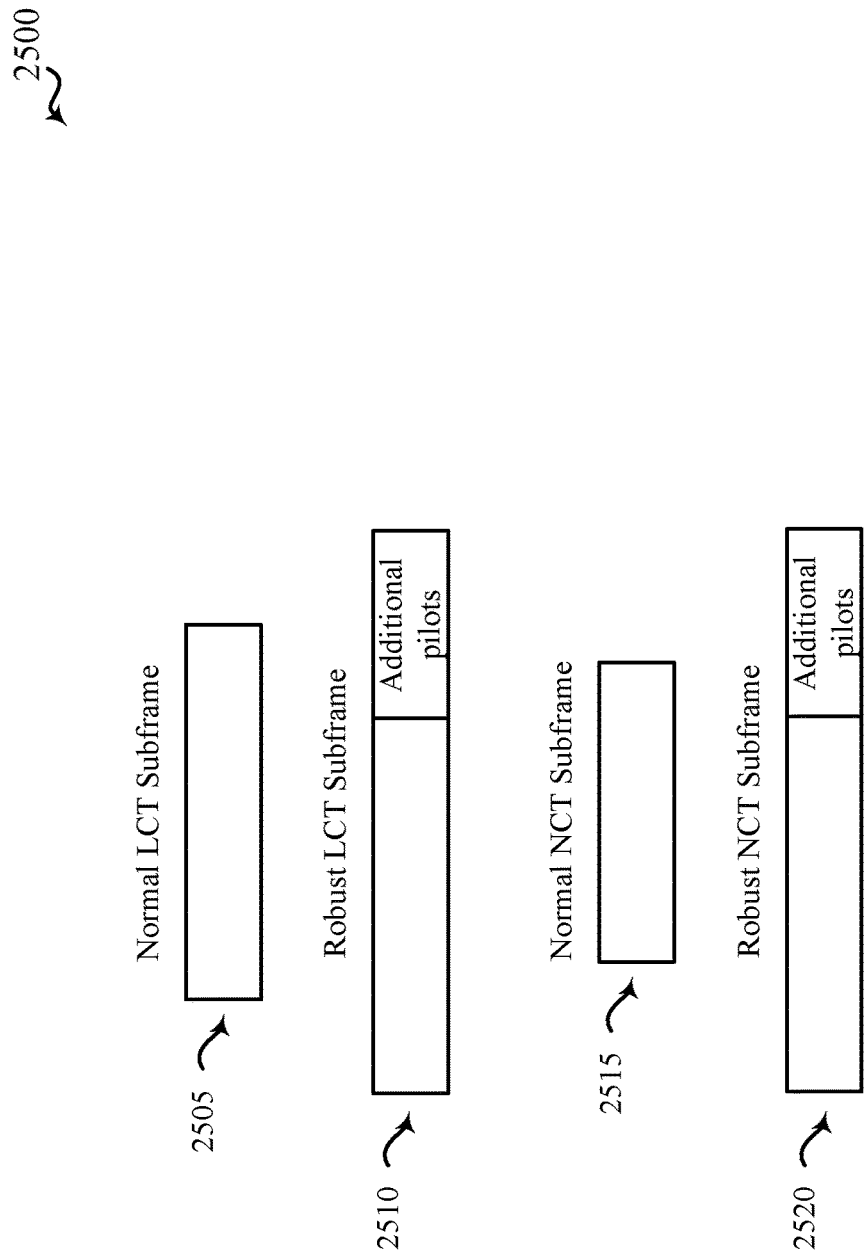
FIG. 25 shows a diagram that illustrates an example of normal and robust subframes in an unlicensed spectrum according to various embodiments.

Turning next to FIG. 25, a diagram 2500 is shown that illustrates examples of normal and robust subframes in an unlicensed spectrum according to various embodiments. The normal and robust subframes may be transmitted by eNBs that support LTE-U (LTE-U eNB). Examples of such eNBs may be the base stations 105, 105-a, and 105-b of FIG. 1, FIG. 2A. and FIG. 2B, respectively. The normal and robust subframes may be used by UEs that support LTE-U (LTE-U UE). Examples of such UEs may be the UEs 115, 115-a, and 115-b of FIG. 1, FIG. 2A. and FIG. 2B, respectively.

A normal legacy carrier type (LCT) subframe 2505 is shown. Normal LCT subframes 2505 may be used for LCT waveforms and may carry time-division multiplexed (TDM) PDCCH and CRS. Also shown is a normal new carrier type (NCT) subframe 2515. Normal NCT subframes 2514 may be used for NCT waveforms but may not include TDM PDCCH and CRS. Instead, a UE may use channel state information-reference signals (CSI-RS) for feedback and UE-RS for demodulation. In addition to the normal LCT and NCT subframes, FIG. 25 shows a robust LCT subframe 2510 and a robust NCT subframe 2520. Robust subframes may differ from the normal ones in that they may include additional pilots (e.g., common pilots, eCRS) in comparison to normal subframes, which may be used to facilitate time-frequency tracking and channel estimation at the UE after a long gated-OFF period of LTE DL transmissions.

For gated LCT waveforms, SYNC subframes (e.g., subframes carrying PSS, SSS, (possibly) PBCH, in addition to other LTE subchannels) may be transmitted in a subframe index=0 (mod 5). The robust LCT subframes 2510 may be transmitted for the first X subframes after a gated-OFF period that is greater than Y subframes. The parameters X and Y may vary based on the structure of the subframes and usage rules, for example. Normal LCT subframes 2505 may be transmitted in all other gated-ON periods.

For gated NCT waveforms, SYNC subframes may be transmitted in a subframe index=0 (mod 5). The robust NCT subframes 2520 may be transmitted for the first X subframes after a gated-OFF period that is greater than Y subframes. The parameters X and Y may vary based on the structure of the subframes and usage rules, for example. Normal NCT subframes 2515 may be transmitted in all other gated-ON periods.

Figure 26:
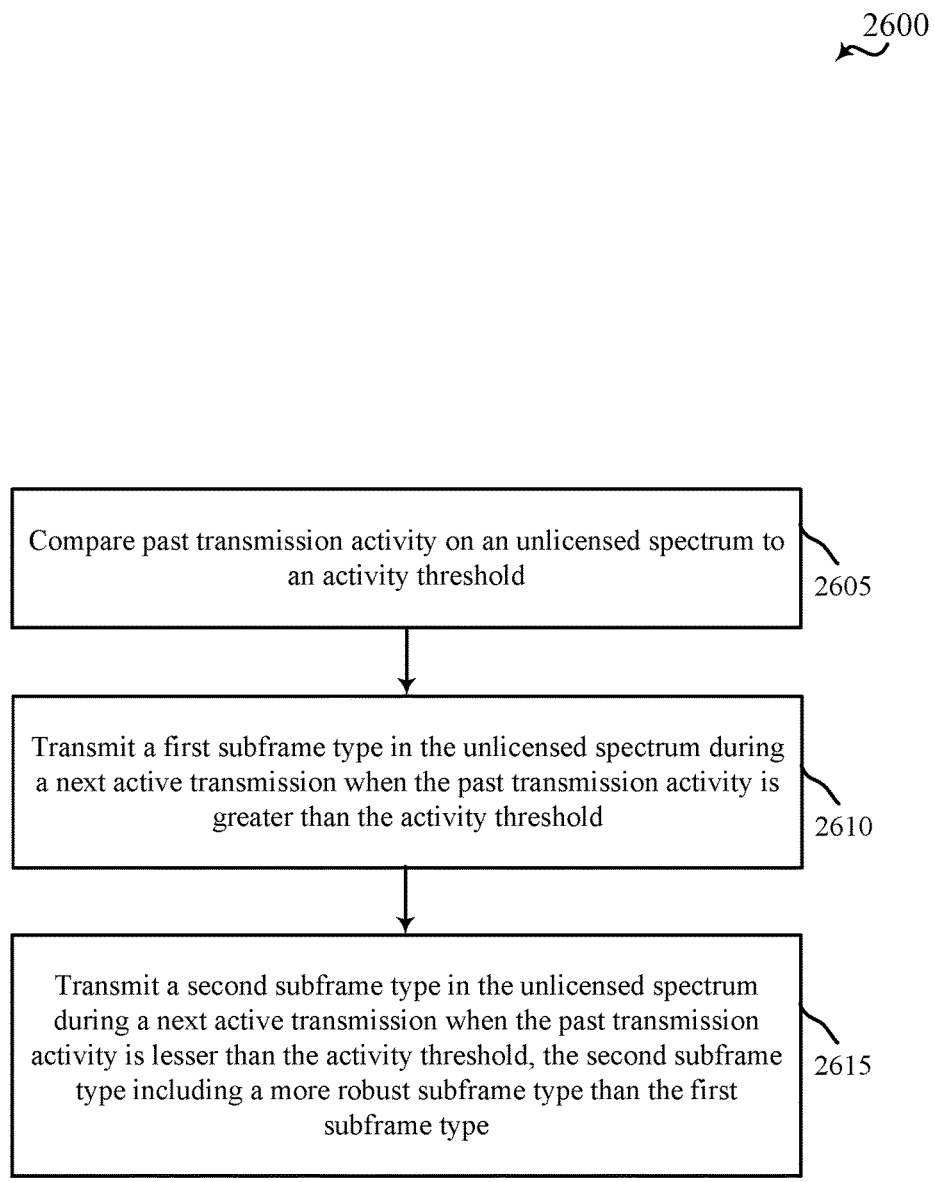
FIG. 26 is a flowchart of an example of a method for transmitting normal or robust subframes in an unlicensed spectrum based on past transmission activity according to various embodiments.

FIG. 26 shows a flowchart of a method 2600 for transmitting normal or robust subframes in an unlicensed spectrum according to various embodiments. The method 2600 may be implemented using, for example, the base stations or eNBs 105, 105-a, and 105-b of FIG. 1, FIG. 2A, and FIG. 2B, respectively; and/or the system 100 of FIG. 1 and the portions of the system 100 of FIG. 2A and FIG. 2B.

At block 2605, past transmission activity on an unlicensed spectrum may be compared to an activity threshold (e.g., a number of gated-ON periods in the unlicensed spectrum over a time period, a duration of a number of gated-ON periods in the unlicensed spectrum over a time period, and/or a number of SYNC subframes transmitted in the unlicensed spectrum over a time period).

At block 2610, a first subframe type (e.g., normal LCT/NCT subframes) may be transmitted in the unlicensed spectrum during a next active transmission when the past transmission activity is greater than the activity threshold.

At block 2615, a second subframe type (e.g., robust LCT/NCT subframes) may be transmitted in the unlicensed spectrum during a next active transmission when the past transmission activity is lesser than the activity threshold. The second subframe type may include a more robust subframe type than the first subframe type.

In some embodiments of the method 2600, the first subframe type may include an LCT subframe. In some embodiments, the first subframe type may include an NCT subframe. In some embodiments, the second subframe type may include an LCT subframe with additional common pilots for tracking and channel estimation. In some embodiments, the second subframe type may include an NCT subframe with additional common pilots for tracking and channel estimation. The method may include transmitting the first subframe type in the unlicensed spectrum after a predetermined number of transmissions of the second subframe type is identified.

Figure 27:
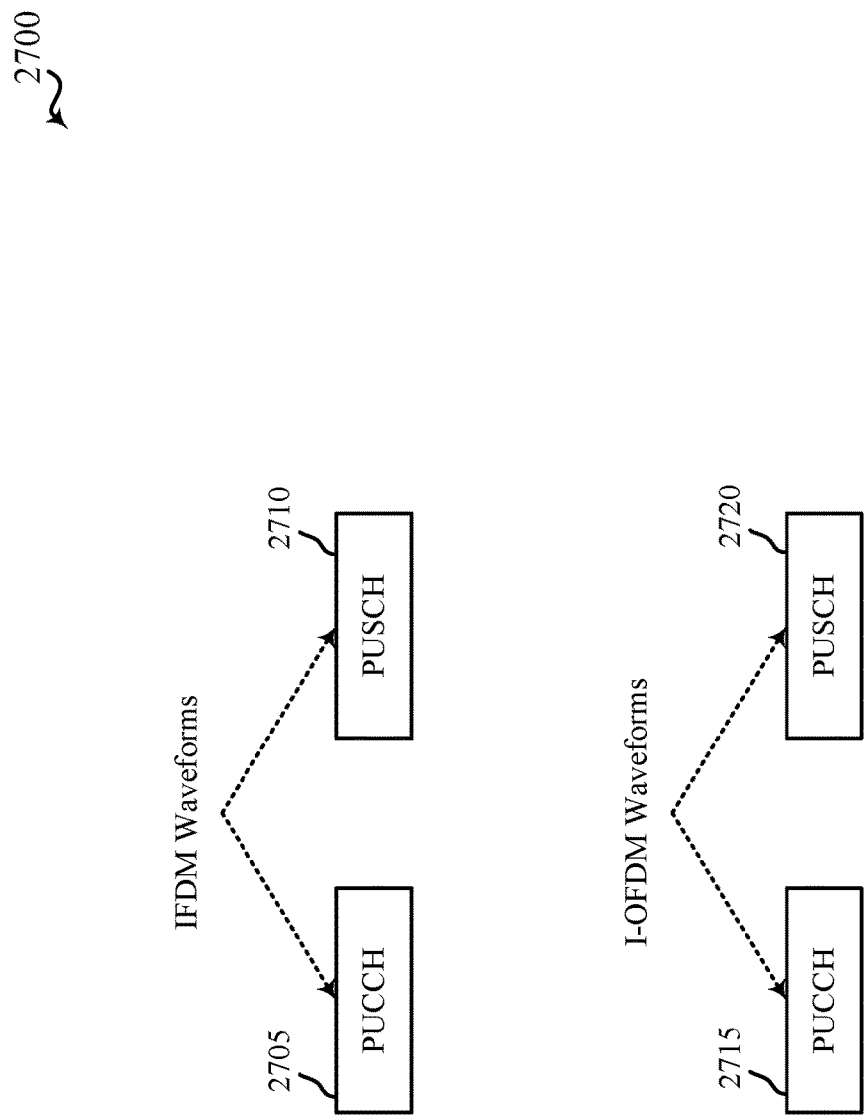
FIG. 27 shows a diagram that illustrates an example of Physical Uplink Control Channel (PUCCH) signals and Physical Uplink Shared Channel (PUSCH) signals for an unlicensed spectrum according to various embodiments.

Turning next to FIG. 27, a diagram 2700 is shown that illustrates examples of Physical Uplink Control Channel (PUCCH) signals and Physical Uplink Shared Channel (PUSCH) signals for an unlicensed spectrum according to various embodiments. The PUCCH and PUSCH signals may be handled by eNBs that support LTE-U (LTE-U eNB). Examples of such eNBs may be the base stations 105, 105-*a*, and 105-*b* of FIG. 1, FIG. 2A. and FIG. 2B, respectively. The PUCCH and PUSCH signals may be handled by UEs that support LTE-U (LTE-U UE). Examples of such UEs may be the UEs 115, 115-*a*, and 115-*b* of FIG. 1, FIG. 2A. and FIG. 2B, respectively.

PUCCH and PUSCH signals are typically based on localized frequency division multiplexing (LFDM) waveforms that occupy a set of subcarriers where a different modulation symbol is sent for each subcarrier or some precoding is done before sending the frequency domain waveform. When using these waveforms, small amounts of data available to be sent result in a small portion of the spectrum being occupied. Because of limitations in transmit power spectral density (TX-PSD), when occupying a small part of the bandwidth a small amount of power is transmitted. To get away from that, there may be a need to occupy pretty much the entire waveform. But if most of the waveform is occupied and does not leave any subcarriers unused, it may not be possible to multiplex different users for a given amount of bandwidth. One approach to address this issue is to have each transmitter interleave its signals so they occupy every 1-out-of-every-Nth subcarrier (e.g., 1-out-of-10, 1-out-of-12), thereby leaving many subcarriers in the middle unoccupied. This approach may increase the nominal bandwidth occupancy to enable sending the waveform with a higher power (but still with low enough PSD to meet regulations). Interleaved frequency division multiplexing (IFDM) and interleaved orthogonal frequency division multiplexing (I-OFDM) signals may be used that occupy 1-out-of-Nth subcarrier in order to send signals confined to those subcarriers. In FIG. 25, IFDM waveforms are shown to generate PUCCH signals 2705 and PUSCH signals 2710 for transmission in an unlicensed spectrum. Similarly, I-OFDM waveforms are shown to generate PUCCH signals 2715 and PUSCH signals 2720 for transmission in an unlicensed spectrum.

Figure 28:
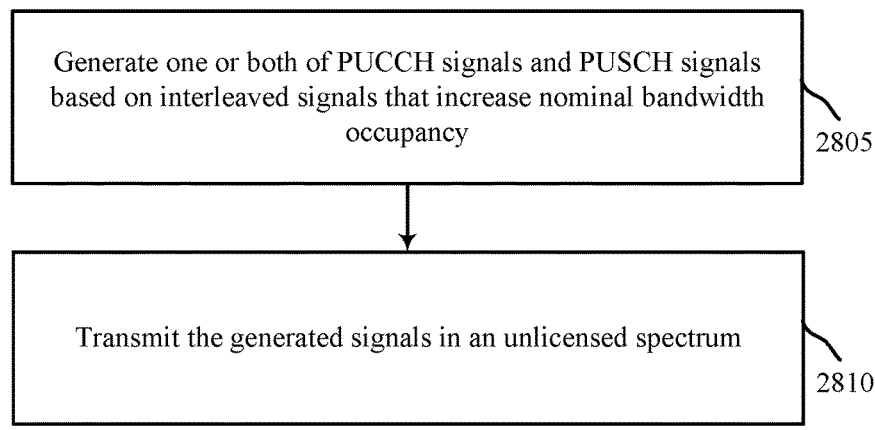
FIG. 28 is a flowchart of an example of a method for generating PUCCH and/or PUSCH signals for an unlicensed spectrum according to various embodiments.

FIG. 28 shows a flowchart of a method 2800 for generating PUCCH and/or PUSCH signals for an unlicensed spectrum according to various embodiments. The method 2800 may be implemented using, for example, the base stations or eNBs 105, 105-*a*, and 105-*b* of FIG. 1, FIG. 2A, and FIG. 2B, respectively; the UEs 115, 115-*a*, and 115-*b* of FIG. 1, FIG. 2A. and FIG. 2B, respectively; and/or the system 100 of FIG. 1 and the portions of the system 100 of FIG. 2A and FIG. 2B. In one implementation, one of the eNBs 105 or one of the UEs 115 may execute one or more sets of codes to control the functional elements of the eNB 105 or the UE 115 to perform the functions described below.

At block 2805, one or both of PUCCH signals and PUSCH signals may be generated based on interleaved signals that increase nominal bandwidth occupancy in an unlicensed spectrum.

At block 2810, the generated signals may be transmitted (e.g., by an eNB) in the unlicensed spectrum. In some embodiments, the interleaved signals may include IFDM signals. In some embodiments, the interleaved signals may include I-OFDM signals.

One or both of the generated signals may be received in the unlicensed spectrum by, for example, a UE.

Figure 29:
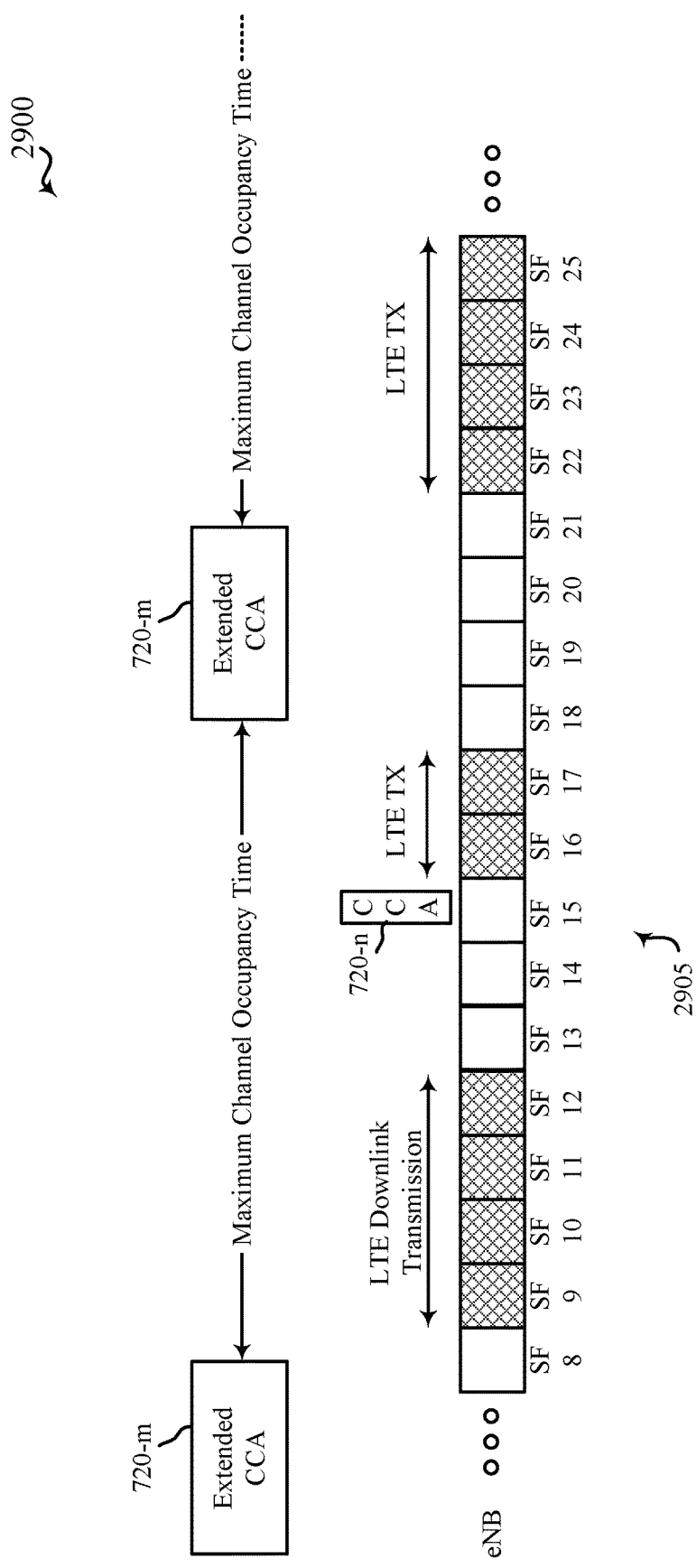
FIG. 29 shows a diagram that illustrates an example of load-based gating in an unlicensed spectrum according to various embodiments.

Turning next to FIG. 29, a diagram 2900 is shown that illustrates an example of load-based gating in an unlicensed spectrum according to various embodiments. The load-based gating may be performed by eNBs that support LTE-U (LTE-U eNB). Examples of such eNBs may be the base stations 105, 105-*a*, and 105-*b* of FIG. 1, FIG. 2A. and FIG. 2B, respectively.

The listen-before-talk (LBT) techniques described above may be used in frame-based equipment (FBE). However, other LBT techniques are also available that are based on load-based equipment (LBE). The LBT-FBE techniques rely in part on gating that preserves the 10 milliseconds radio frame structure of LTE. The use of shorter gating structures (1 milliseconds, 2 milliseconds), while allowing for periodic gating, tend not to preserve the LTE frame structure. Using LBT-LBE may provide the potential benefit of retaining the subframe structure of LTE PHY channels without the need for symbol puncturing at the beginning or end. However, time-reuse among different LTE-U nodes may no longer be assured on the same deployment because each eNB uses its own random back-off time for extended CCA. Therefore, for LBT-LBE, the CCA may be similar to the CCA for LBT-FBE, but extended CCA (which is not used in LBT-FBE), may be based on randomly selecting an integer N (e.g., $1 \leq N \leq q$), and waiting for N CCA durations where the channel is clear.

The transmission at different subframes (SFs) in a subframe sequence transmitted in an unlicensed spectrum channel may be based on results from extended CCAs and from CCA. Extended CCA may be based on a parameter $4 \leq q \leq 32$, whose value is advertised by the vendor. When the channel has had a long break, CCA may need to be performed. If CCA finds a clear channel, then it may be possible to start transmitting right away. If not, extended CCA may be performed before transmission. Once transmission begins, it may continue for at most $(13/32) \times q$ msc (referred to as the maximum channel occupancy time), before another extended CCA may need to be performed. Upon a successful reception (from another node), ACK/NACK transmission may begin immediately (without) CCA, provided that the last successful CCA/extended CCA was performed less than a maximum channel occupancy time before.

Returning to the example of FIG. 29, the CCA time may be set to 25 µs and q=24, so that the maximum channel occupancy time is approximately 9.75 milliseconds. The minimum idle time for extended CCA is approximately between 25 µs and 0.6 milliseconds. CUBS may be used to fill the gap as described above. In this example, extended CCA 720-*m* is performed at subframe (SF) 8 in a sequence 2905. The maximum channel occupancy time is such that a next extended CCA 720-*m* need not be performed until SF18. LTE downlink transmissions may take place during SFs 9-12 as a result of the channel being free after the first extended CCA 720-*m*. Since there is a transmission gap after SF 12, a CCA 720-*n* may be performed at SF 15 for additional transmissions within the maximum channel occupancy time. As a result of the CCA 720-*n*, LTE transmissions may take place at SFs 16 and 17. As noted above, a second extended CCA 720-*m* may occur after the maximum channel occupancy time, which in this example leads to additional LTE transmissions in SFs 22-25.

Figure 30:
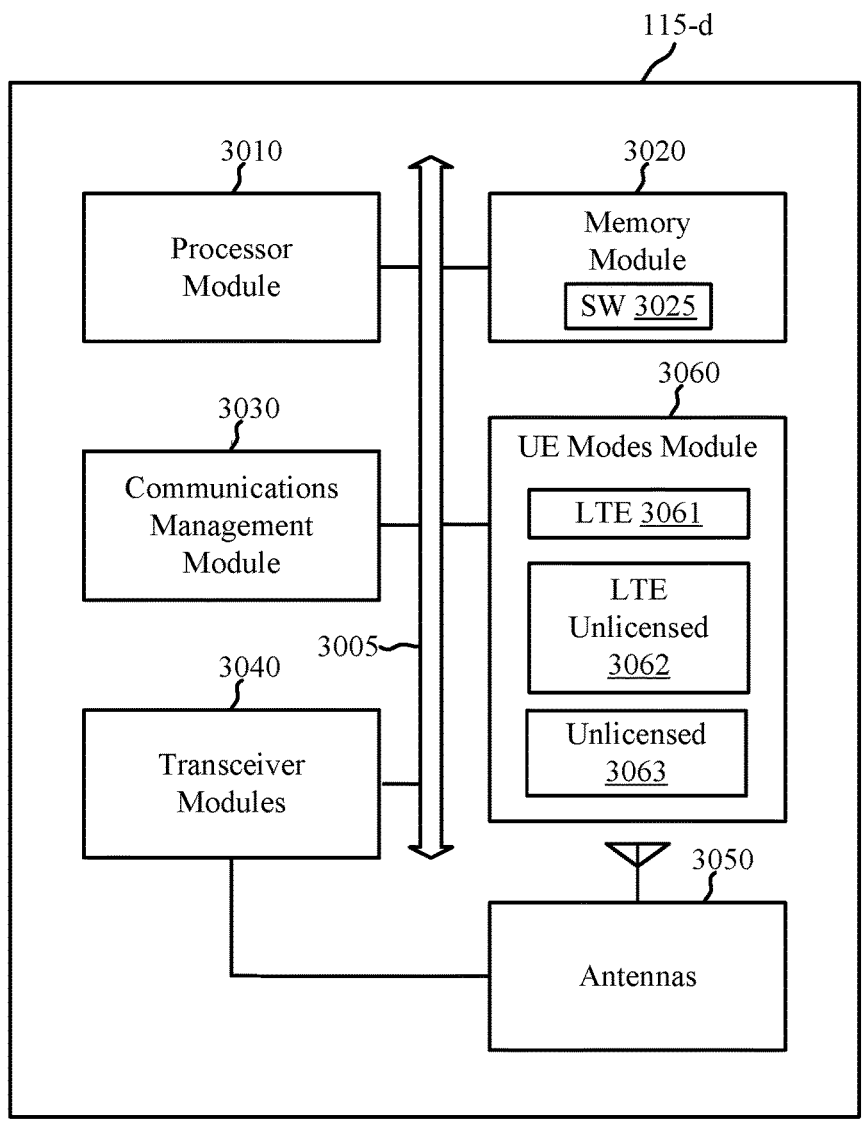
FIG. 30 shows a block diagram that illustrates an example of a UE architecture according to various embodiments.

Turning to FIG. 30, a diagram 3000 is shown that illustrates a UE 115-*d* configured for LTE-U. The UE 115-*d* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 115-*d* may have an internal power supply (not shown), such as a small battery, to facilitate mobile operation. The station UE 115-*d* may be an example of the UEs 115, 115-*a*, 115-*b*, and 115-*c* of FIG. 1, FIG. 2A, FIG. 2B, and FIG. 16, respectively. The UE 115-*d* may be configured to implement at least some of the features and functions described above with respect to FIGS. 1-29.

The UE 115-*d* may include a processor module 3010, a memory module 3020, a transceiver module 3040, antennas 3050, and an UE modes module 3060. Each of these components may be in communication with each other, directly or indirectly, over one or more buses 3005.

The memory module 3020 may include random access memory (RAM) and read-only memory (ROM). The memory module 3020 may store computer-readable, computer-executable software (SW) code 3025 containing instructions that are configured to, when executed, cause the processor module 3010 to perform various functions described herein for using LTE-based communications in an unlicensed spectrum. Alternatively, the software code 3025 may not be directly executable by the processor module 3010 but be configured to cause the computer (e.g., when compiled and executed) to perform functions described herein.

The processor module 3010 may include an intelligent hardware device, e.g., a central processing unit (CPU), a microcontroller, an application-specific integrated circuit (ASIC), etc. The processor module 3010 may process information received through the transceiver module 3040 and/or to be sent to the transceiver module 3040 for transmission through the antennas 3050. The processor module 3010 may handle, alone or in connection with the UE modes module 3060, various aspects of using LTE-based communications in an unlicensedspectrum.

The transceiver module 3040 may be configured to communicate bi-directionally with base stations (e.g., base stations 105). The transceiver module 3040 may be implemented as one or more transmitter modules and one or more separate receiver modules. The transceiver module 3040 may support communications in a licensed spectrum (e.g., LTE) and in an unlicensed spectrum (e.g., LTE-U). The transceiver module 3040 may include a modem configured to modulate the packets and provide the modulated packets to the antennas 3050 for transmission, and to demodulate packets received from the antennas 3050. While the UE 115-*d* may include a single antenna, there may be embodiments in which the UE 115-*d* may include multiple antennas 3050.

According to the architecture of FIG. 30, the UE 115-*d* may further include a communications management module 3030. The communications management module 3030 may manage communications with various access points. The communications management module 3030 may be a component of the UE 115-*d* in communication with some or all of the other components of the UE 115-*d* over the one or more buses 3005. Alternatively, functionality of the communications management module 3030 may be implemented as a component of the transceiver module 3040, as a computer program product, and/or as one or more controller elements of the processor module 3010.

The UE modes module 3060 may be configured to perform and/or control some or all of the functions or aspects described in FIGS. 1-29 related to using LTE-based communications in an unlicensed spectrum. For example, the UE modes module 3060 may be configured to support a supplemental downlink mode, a carrier aggregation mode, and/or a standalone mode of operation in an unlicensed spectrum. The UE modes module 3060 may include an LTE module 3061 configured to handle LTE communications, an LTE unlicensed module 3062 configured to handle LTE-U communications, and an unlicensed module 3063 configured to handle communications other than LTE-U in an unlicensed spectrum. The UE modes module 3060, or portions of it, may be a processor. Moreover, some or all of the functionality of the UE modes module 3060 may be performed by the processor module 3010 and/or in connection with the processor 3010.

Figure 31:
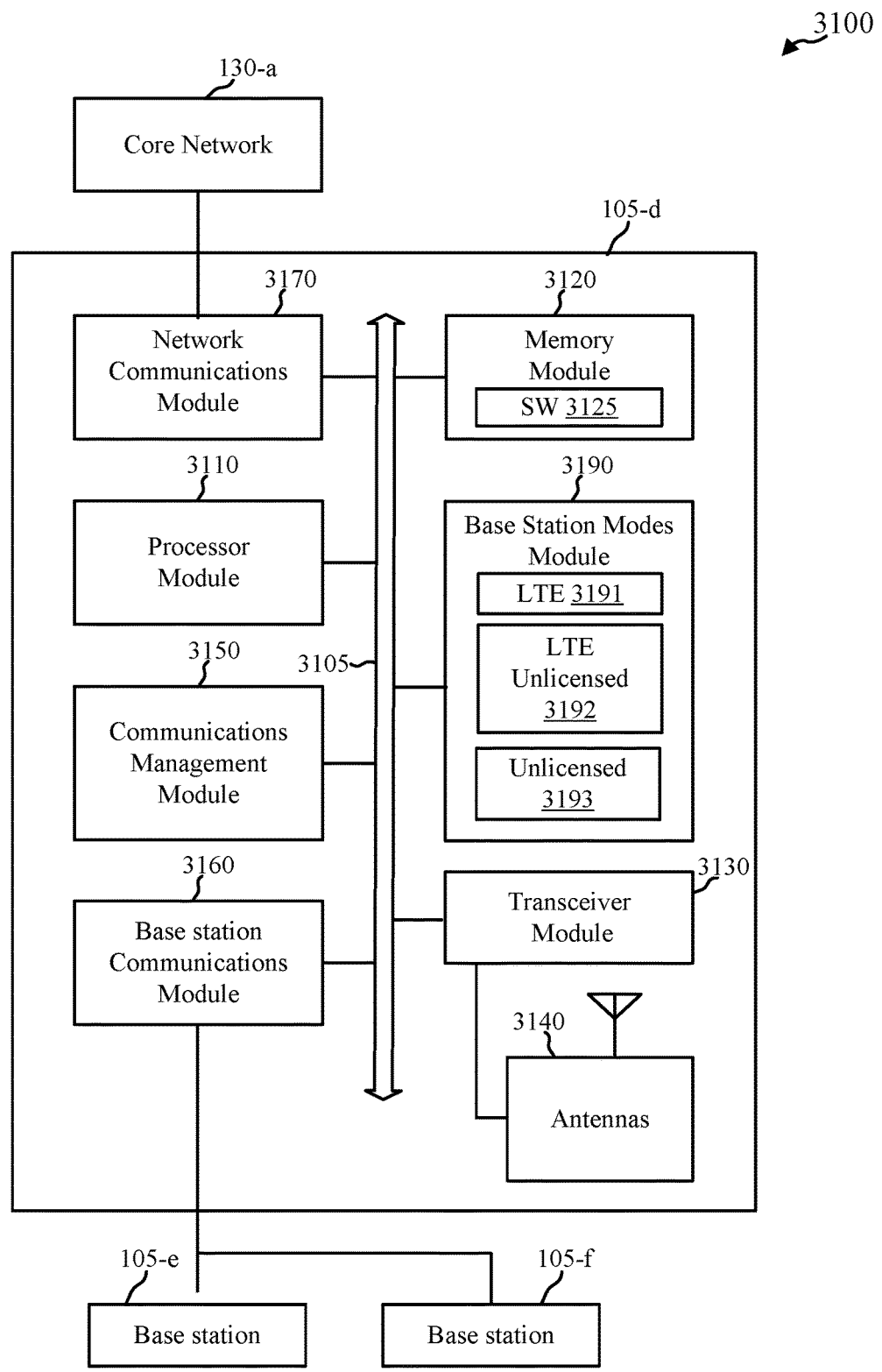
FIG. 31 shows a block diagram that illustrates an example of a base station architecture according to various embodiments.

Turning to FIG. 31, a diagram 3100 is shown that illustrates a base station or eNB 105-*d* configured for LTE-U. In some embodiments, the base station 105-*d* may be an example of the base stations 105, 105-*a*, 105-*b*, and 105-*c* of FIG. 1, FIG. 2A, FIG. 2B, and FIG. 16, respectively. The base station 105-*d* may be configured to implement at least some of the features and functions described above with respect to FIGS. 1-29. The base station 105-*d* may include a processor module 3110, a memory module 3120, a transceiver module 3130, antennas 3140, and a base station modes module 3190. The base station 105-*d* may also include one or both of a base station communications module 3160 and a network communications module 3170. Each of these components may be in communication with each other, directly or indirectly, over one or more buses 3105.

The memory module 3120 may include RAM and ROM. The memory module 3120 may also store computer-readable, computer-executable software (SW) code 3125 containing instructions that are configured to, when executed, cause the processor module 3110 to perform various functions described herein for using LTE-based communications in an unlicensed spectrum. Alternatively, the software code 3125 may not be directly executable by the processor module 3110 but be configured to cause the computer, e.g., when compiled and executed, to perform functions described herein.

The processor module 3110 may include an intelligent hardware device, e.g., a CPU, a microcontroller, an ASIC, etc. The processor module 3110 may process information received through the transceiver module 3130, the base station communications module 3160, and/or the network communications module 3170. The processor module 3110 may also process information to be sent to the transceiver module 3130 for transmission through the antennas 3140, to the base station communications module 3160, and/or to the network communications module 3170. The processor module 3110 may handle, alone or in connection with the base station modes module 3190, various aspects of using LTE-based communications in an unlicensed spectrum.

The transceiver module 3130 may include a modem configured to modulate the packets and provide the modulated packets to the antennas 3140 for transmission, and to demodulate packets received from the antennas 3140. The transceiver module 3130 may be implemented as one or more transmitter modules and one or more separate receiver modules. The transceiver module 3130 may support communications in a licensed spectrum (e.g., LTE) and in an unlicensed spectrum (e.g., LTE-U). The transceiver module 3130 may be configured to communicate bi-directionally, via the antennas 3140, with one or more UEs 115 as illustrated in FIG. 1, FIG. 2A, FIG. 2B, and FIG. 16, for example. The base station 105-d may typically include multiple antennas 3140 (e.g., an antenna array). The base station 105-d may communicate with a core network 130-a through the network communications module 3170. The core network 130-a may be an example of the core network 130 of FIG. 1. The base station 105-d may communicate with other base stations, such as the base station 105-e and the base station 105-f, using the base station communications module 3160.

According to the architecture of FIG. 31, the base station 105-d may further include a communications management module 3150. The communications management module 3150 may manage communications with stations and/or other devices. The communications management module 3150 may be in communication with some or all of the other components of the base station 105-d via the bus or buses 3105. Alternatively, functionality of the communications management module 3150 may be implemented as a component of the transceiver module 3130, as a computer program product, and/or as one or more controller elements of the processor module 3110.

The base station modes module 3190 may be configured to perform and/or control some or all of the functions or aspects described in FIGS. 1-29 related to using LTE-based communications in an unlicensed spectrum. For example, the base station modes module 3190 may be configured to support a supplemental downlink mode, a carrier aggregation mode, and/or a standalone mode of operation in an unlicensed spectrum. The base station modes module 3190 may include an LTE module 3191 configured to handle LTE communications, an LTE unlicensed module 3192 configured to handle LTE-U communications, and an unlicensed module 3193 configured to handle communications other than LTE-U in an unlicensed spectrum. The base station modes module 3190, or portions of it, may be a processor. Moreover, some or all of the functionality of the base station modes module 3190 may be performed by the processor module 3110 and/or in connection with the processor module 3110.

Figure 32:
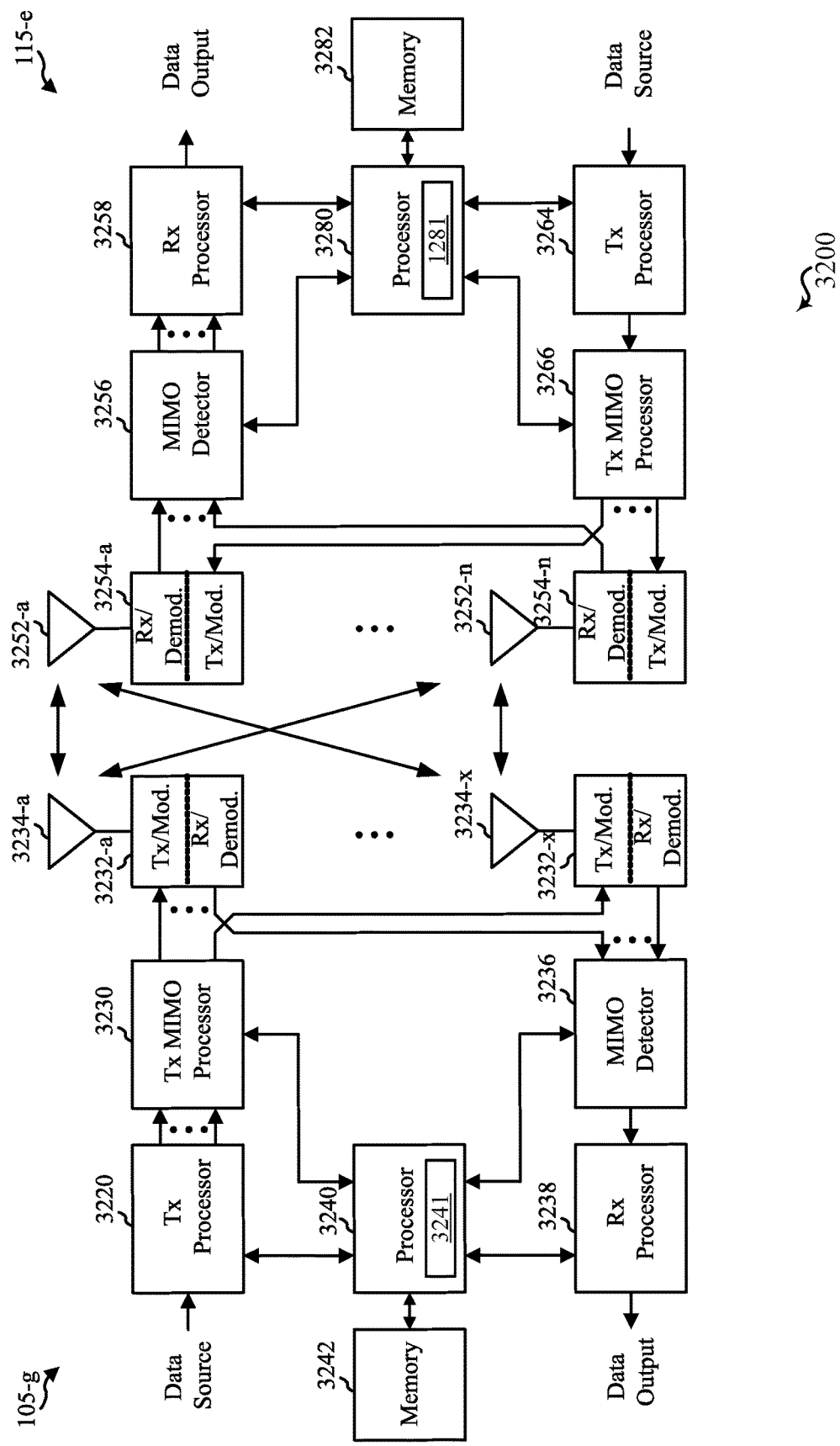
FIG. 32 shows a block diagram that illustrates an example of a multiple-input multiple-output (MIMO) communications system according to various embodiments.

Turning next to FIG. 32, a block diagram of a multiple-input multiple-output (MIMO) communication system 3200 is shown including a base station 105-g and a user equipment or UE 115-e. The base station 105-g and the UE 115-e may support LTE-based communications using an unlicensed spectrum (LTE-U). The base station 105-g may be an example of the base stations 105, 105-a, 105-b, and 105-c of FIG. 1, FIG. 2A, FIG. 2B, and FIG. 16, while the UE 115-e may be an example of the UE 115, 115-a, 115-b, and 115-c of FIG. 1, FIG. 2A, FIG. 2B, and FIG. 16. The system 3200 may illustrate aspects of the system 100 of FIG. 1 and aspects of the portions of the system 100 shown in FIG. 2A and FIG. 2B.

The base station 105-g may be equipped with antennas 3234-a through 3234-x, and the UE 115-e may be equipped with antennas 3252-a through 3252-n. In the system 3200, the base station 105-g may be able to send data over multiple communication links at the same time. Each communication link may be called a "layer" and the "rank" of the communication link may indicate the number of layers used for communication. For example, in a 2×2 MIMO system where base station 800 transmits two "layers," the rank of the communication link between the base station 105-g and the UE 115-e is two.

At the base station 105-g, a transmit (Tx) processor 3220 may receive data from a data source. The transmit processor 3220 may process the data. The transmit processor 3220 may also generate reference symbols, and a cell-specific reference signal. A transmit (Tx) MIMO processor 3230 may perform spatial processing (e.g., precoding) on data symbols, control symbols, and/or reference symbols, if applicable, and may provide output symbol streams to the transmit modulators 3232-a through 3232-x. Each modulator 3232 may process a respective output symbol stream (e.g., for OFDM, etc.) to obtain an output sample stream. Each modulator 3232 may further process (e.g., convert to analog, amplify, filter, and upconvert) the output sample stream to obtain a downlink (DL) signal. In one example, DL signals from modulators 3232-a through 3232-x may be transmitted via the antennas 3234-a through 3234-x, respectively.

At the UE 115-e, the antennas 3252-a through 3252-n may receive the DL signals from the base station 105-g and may provide the received signals to the demodulators 3254-a through 3254-n, respectively. Each demodulator 3254 may condition (e.g., filter, amplify, downconvert, and digitize) a respective received signal to obtain input samples. Each demodulator 3254 may further process the input samples (e.g., for OFDM, etc.) to obtain received symbols. A MIMO detector 3256 may obtain received symbols from all the demodulators 3254-a through 3254-n, perform MIMO detection on the received symbols if applicable, and provide detected symbols. A receive (Rx) processor 3258 may process (e.g., demodulate, deinterleave, and decode) the detected symbols, providing decoded data for the UE 115-e to a data output, and provide decoded control information to a processor 3280, or memory 3282. The processor 3280 may include a module or function 3281 that may perform various functions related to using LTE-based communications in an unlicensed spectrum. For example, the module or function 3281 may perform some or all of the functions described above with reference to the FIGS. 1-29.

On the uplink (UL), at the UE 115-e, a transmit (Tx) processor 3264 may receive and process data from a data source. The transmit processor 3264 may also generate reference symbols for a reference signal. The symbols from the transmit processor 3264 may be precoded by a transmit (Tx) MIMO processor 3266 if applicable, further processed by the demodulators 3254-a through 3254-n (e.g., for SC-FDMA, etc.), and be transmitted to the base station 105-g in accordance with the transmission parameters received from the base station 105-g. At the base station 105-g, the UL signals from the UE 115-e may be received by the antennas 3234, processed by the demodulators 3232, detected by a MIMO detector 3236 if applicable, and further processed by a receive processor. The receive (Rx) processor 3238 may provide decoded data to a data output and to the processor 3240. The processor 3240 may include a module or function 3241 that may perform various aspects related to using LTE-based communications in an unlicensed spectrum. For example, the module or function 3241 may perform some or all of the functions described above with reference to FIGS. 1-29.

The components of the base station 105-g may, individually or collectively, be implemented with one or more Application Specific Integrated Circuits (ASICs) adapted to perform some or all of the applicable functions in hardware. Each of the noted modules may be a means for performing one or more functions related to operation of the system 3200. Similarly, the components of the UE 115-e may, individually or collectively, be implemented with one or more Application Specific Integrated Circuits (ASICs) adapted to perform some or all of the applicable functions in hardware. Each of the noted components may be a means for performing one or more functions related to operation of the system 3200.

It should be noted that the various methods described in flowcharts are just one implementation and that the operations of those methods may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:
1. A method for wireless communications, comprising:
synchronizing, in an aligned clear channel assessment (CCA) period comprising a plurality of Orthogonal Frequency-Division Multiplexing (OFDM) symbol positions, CCA slots to determine availability of a shared spectrum for transmissions in a next transmission interval, wherein a first CCA slot of the CCA slots is aligned with a first OFDM symbol position of the plurality of OFDM symbol positions and a second CCA slot of the CCA slots is aligned with a second OFDM symbol position of the OFDM symbol positions.

2. The method of claim 1, wherein the transmissions comprise downlink transmissions.

3. The method of claim 1, wherein the CCA slots are located in a first or last subframe of a current gating interval.

4. The method of claim 1, wherein the first OFDM symbol position and the second OFDM symbol position are nonadjacent.

5. The method of claim 1, wherein an interval between commencement of adjacent CCA slots is approximately a duration of an OFDM symbol.

6. The method of claim 1, further comprising identifying one of the CCA slots in which to determine the availability of the shared spectrum, wherein the one CCA slot is identified based at least in part on a pseudo-random selection sequence driven by a randomization seed.

7. The method of claim 6, wherein a subset of a plurality of base stations use the same randomization seed for their pseudo-random selection sequence generation, the subset being associated with a deployment of base stations by a single operator.

8. An apparatus for wireless communications, comprising:
a processor;
memory in electronic communication with the processor; and
instructions stored in the memory, the instructions being executable by the processor to:
synchronize, in an aligned clear channel assessment (CCA) period comprising a plurality of Orthogonal Frequency-Division Multiplexing (OFDM) symbol positions, CCA slots to determine availability of a shared unlicensed spectrum for transmissions in a next transmission interval, wherein a first CCA slot of the CCA slots is aligned with a first OFDM symbol position of the plurality of OFDM symbol positions and a second CCA slot of the CCA slots is aligned with a second OFDM symbol position of the OFDM symbol positions.

9. The apparatus of claim 8, wherein the transmissions comprise downlink transmissions.

10. The apparatus of claim 8, wherein the CCA slots are located in a first or last subframe of a current gating interval.

11. The apparatus of claim 8, wherein the first OFDM symbol position and the second OFDM symbol position are nonadjacent.

12. The apparatus of claim 8, wherein an interval between commencement of adjacent CCA slots is approximately a duration of an OFDM symbol.

13. The apparatus of claim 8, wherein the instructions are executable by the processor to identify one of the CCA slots in which to determine the availability of shared spectrum, wherein the one CCA slot is identified based at least in part on a pseudo-random selection sequence driven by a randomization seed.

14. The apparatus of claim 13, wherein a subset of a plurality of base stations use the same randomization seed for their pseudo-random selection sequence generation, the subset being associated with a deployment of base stations by a single operator.

15. A non-transitory computer-readable medium storing instructions executable by a computer, comprising:
instructions for causing the computer to synchronize, in an aligned clear channel assessment (CCA) period comprising a plurality of Orthogonal Frequency-Division Multiplexing (OFDM) symbol positions, CCA slots to determine availability of a shared spectrum for transmissions in a next transmission interval, wherein a first CCA slot of the CCA slots is aligned with a first OFDM symbol position of the plurality of OFDM symbol positions and a second CCA slot of the CCA slots is aligned with a second OFDM symbol position of the OFDM symbol positions.

16. The non-transitory computer-readable medium of claim 15, wherein the transmissions comprise downlink transmissions.

17. The non-transitory computer-readable medium of claim 15, wherein the CCA slots are located in a first or last subframe of a current gating interval.

18. The non-transitory computer-readable medium of claim 15, wherein the first OFDM symbol position and the second OFDM symbol position are nonadjacent.

19. The non-transitory computer-readable medium of claim 15, wherein an interval between commencement of adjacent CCA slots is approximately a duration of an OFDM symbol.

20. The non-transitory computer-readable medium of claim 15, further comprising instructions for causing the computer to identify one of the CCA slots in which to determine the availability of shared spectrum, wherein the one CCA slot is identified based at least in part on a pseudo-random selection sequence driven by a randomization seed.

21. The non-transitory computer-readable medium of claim 20, wherein a subset of a plurality of base stations use the same randomization seed for their pseudo-random selection sequence generation, the subset being associated with a deployment of base stations by a single operator.

22. A method for wireless communications, comprising:
performing, in an aligned clear channel assessment (CCA) period comprising a plurality of Orthogonal Frequency-Division Multiplexing (OFDM) symbol positions, a CCA during one of a plurality of synchronized CCA slots to determine availability of shared spectrum for transmissions in a next transmission interval, wherein a first CCA slot of the synchronized CCA slots is aligned with a first OFDM symbol position of the plurality of OFDM symbol positions and a second CCA slot of the synchronized CCA slots is aligned with a second OFDM symbol position of the OFDM symbol positions.

23. The method of claim 22, wherein the transmissions comprise downlink transmissions.

24. The method of claim 22, wherein a plurality of base stations use the same synchronized CCA slot to perform CCA during a gating interval.

25. The method of claim 22, further comprising identifying the one CCA slot based at least in part on a pseudo-random selection sequence generated from a randomization seed.

26. The method of claim 22, further comprising identifying the one CCA slot based at least in part on coordination information exchanged between a plurality of base stations over a backhaul.

27. The method of claim 22, further comprising transmitting, when the shared spectrum is determined to be available, one or more signals before the next transmission interval to reserve the shared spectrum during the next transmission interval.

28. The method of claim 27, wherein each of the one or more signals starts at a boundary of one of the plurality of synchronized CCA slots.

29. The method of claim 22, wherein the first OFDM symbol position and the second OFDM symbol position are nonadjacent.

30. An apparatus for wireless communications, comprising:
a processor;
memory in electronic communication with the processor; and
instructions stored in the memory, the instructions being executable by the processor to:
perform, in an aligned clear channel assessment (CCA) period comprising a plurality of Orthogonal Frequency-Division Multiplexing (OFDM) symbol positions, a CCA during one of a plurality of synchronized CCA slots to determine availability of shared spectrum for transmissions in a next transmission interval, wherein a first CCA slot of the synchronized CCA slots is aligned with a first OFDM symbol position of the plurality of OFDM symbol positions and a second CCA slot of the synchronized CCA slots is aligned with a second OFDM symbol position of the OFDM symbol positions.

31. The apparatus of claim 30, wherein the transmissions comprise downlink transmissions.

32. The apparatus of claim 30, wherein a plurality of base stations use the same synchronized CCA slot to perform CCA during a gating interval.

33. The apparatus of claim 30, wherein the instructions are further executable by the processor to identify the one CCA slot based at least in part on a pseudo-random selection sequence generated from a randomization seed.

34. The apparatus of claim 30, wherein the instructions are further executable by the processor to identify the one CCA slot based at least in part on coordination information exchanged between a plurality of base stations over a backhaul.

35. The apparatus of claim 30, wherein the instructions are further executable by the processor to transmit, when the shared spectrum is determined to be available, one or more signals before the next transmission interval to reserve the shared spectrum during the next transmission interval.

36. The apparatus of claim 35, wherein each of the one or more signals starts at a boundary of one of the plurality of synchronized CCA slots.

37. The apparatus of claim 30, wherein the first OFDM symbol position and the second OFDM symbol position are nonadjacent.

38. A non-transitory computer-readable medium storing instructions executable by a computer, comprising:
instructions for causing the computer to perform, in an aligned clear channel assessment (CCA) period comprising a plurality of Orthogonal Frequency-Division Multiplexing (OFDM) symbol positions, a CCA during one of a plurality of synchronized CCA slots to determine availability of shared spectrum for transmissions in a next transmission interval, wherein a first CCA slot of the synchronized CCA slots is aligned with a first OFDM symbol position of the plurality of OFDM symbol positions and a second CCA slot of the synchronized CCA slots is aligned with a second OFDM symbol position of the OFDM symbol positions.

39. The non-transitory computer-readable medium of claim 38, wherein the transmissions comprise downlink transmissions.

40. The non-transitory computer-readable medium of claim 38, wherein a plurality of base stations use the same synchronized CCA slot to perform CCA during a gating interval.

41. The non-transitory computer-readable medium of claim 38, further comprising instructions for causing the computer to identify the one CCA slot based at least in part on a pseudo-random selection sequence generated from a randomization seed.

42. The non-transitory computer-readable medium of claim 38, further comprising instructions for causing the computer to identify the one CCA slot based at least in part on coordination information exchanged between a plurality of base stations over a backhaul.

43. The non-transitory computer-readable medium of claim 38, further comprising instructions for causing the computer to transmit, when the shared spectrum is determined to be available, one or more signals before the next transmission interval to reserve the shared spectrum during the next transmission interval.

44. The non-transitory computer-readable medium of claim 43, wherein each of the one or more signals starts at a boundary of one of the plurality of synchronized CCA slots.

45. The non-transitory computer-readable medium of claim 38, wherein the first OFDM symbol position and the second OFDM symbol position are nonadjacent.

* * * * *